United States Patent
Stine

(10) Patent No.: US 7,266,085 B2
(45) Date of Patent: Sep. 4, 2007

(54) ACCESS AND ROUTING PROTOCOL FOR AD HOC NETWORK USING SYNCHRONOUS COLLISION RESOLUTION AND NODE STATE DISSEMINATION

(76) Inventor: John A. Stine, 9322 Eagle Ct., Manassas, VA (US) 20111

(*) Notice: Subject to any disclaimer, the term of this patent is extended or adjusted under 35 U.S.C. 154(b) by 1031 days.

(21) Appl. No.: 10/104,336

(22) Filed: Mar. 21, 2002

(65) Prior Publication Data

US 2003/0033394 A1 Feb. 13, 2003

Related U.S. Application Data

(60) Provisional application No. 60/277,716, filed on Mar. 21, 2001.

(51) Int. Cl.
*H04J 3/14* (2006.01)
*H04B 7/212* (2006.01)
*H04L 12/413* (2006.01)
*H04L 12/43* (2006.01)

(52) U.S. Cl. ............... 370/252; 370/447; 370/461; 370/462; 370/468; 370/348

(58) Field of Classification Search ........ 370/328–329, 370/338, 351, 229, 235, 254–255, 238, 252, 370/345, 347, 348, 445, 447, 458, 461–462, 370/465, 468
See application file for complete search history.

(56) References Cited

U.S. PATENT DOCUMENTS

| | | | |
|---|---|---|---|
| 5,987,011 A | 11/1999 | Toh | |
| 5,987,024 A | 11/1999 | Duch et al. | |
| 6,028,857 A * | 2/2000 | Poor | 370/351 |
| 6,249,515 B1 | 6/2001 | Kim et al. | |
| 6,377,640 B2 | 4/2002 | Trans | |
| 6,385,174 B1 | 5/2002 | Li et al. | |
| 6,665,311 B2 * | 12/2003 | Kondylis et al. | 370/462 |
| 6,788,702 B1 * | 9/2004 | Garcia-Luna-Aceves et al. | 370/458 |
| 6,904,275 B2 * | 6/2005 | Stanforth | 455/343.1 |

(Continued)

OTHER PUBLICATIONS

Shigang Chen; Nahrstedt, K., "An Overview of Quality-of-Service Routing for the Next Generation High-Speed Networks: Problems and Solutions," Network, IEEE vol. 12, Issue 6, Nov./Dec. 1998 pp. 64-79.*

(Continued)

*Primary Examiner*—Chau Nguyen
*Assistant Examiner*—Nittaya Juntima
(74) *Attorney, Agent, or Firm*—Roberts Mardula & Wertheim, LLC

(57) ABSTRACT

An ad hoc network organizes itself to provide communications without need for an a priori designated central control mechanism or base stations. Such self-organization is challenging in a multihop ad hoc network having member nodes that are highly mobile and widely distributed. A Synchronous Collision Resolution (SCR) protocol and a Node State Routing (NSR) protocol are well suited to provide efficient ad hoc network organization. SCR is an access protocol that achieves high capacity collision free access using a signaling approach that creates a random cellular-like network after each signaling period. NSR is a routing protocol that uses the dissemination of node states to predict link availability and to assign metrics to those links for the creation of optimized routes. In use, the present invention provides quality of service and supports energy conservation for the mobile nodes.

26 Claims, 46 Drawing Sheets

U.S. PATENT DOCUMENTS

| | | | |
|---|---|---|---|
| 6,973,039 B2* | 12/2005 | Redi et al. | 370/238 |
| 2002/0013856 A1* | 1/2002 | Garcia-Luna-Aceves et al. | 709/238 |
| 2002/0071395 A1* | 6/2002 | Redi et al. | 370/252 |
| 2006/0114581 A1* | 6/2006 | Gupta et al. | 370/329 |

OTHER PUBLICATIONS

D. Bertsekas and R. Gallagher, *Data Networks*, Prentice Hall, Inc., Upper Saddle River, NJ, 1992, pp. 271-353.

D. Bertsekas and R. Gallagher, *Data Networks*, Prentice Hall, Inc., Upper Saddle River, NJ, 1992, pp. 363-479.

P.Karn, "Maca —A New Channel Access Method for Packet Radio" ARRL/CRRL Amateur Radio 9th Computer Networking Conference, 1990, pp. 134-140.

V. Bharghavan, A. Demers, S. Shenker, and L.Zhang, "Macaw: A Media Access Protocol for Wireless LAN's," Proceedings of the Conference on Communications Architectures, Protocols, and Applications, 1994, pp. 212-225.

Etsi, EN300 652 V 1.2.1, Broadband Radio Access Networks (Bran); High Performance Radio Local Area Network (Hiperlan) Type 1; Functional Specification, Jul. 1998, pp. 1-105.

G. Lauer, "Packet-Radio Routing," Routing in Communications Networks, Ed. M. Steestrup, Prentice-Hall, Inc., Englewood Cliffs, NJ, 1995, pp. 351-396.

E. Royer, and C-K. Toh, "A Review of Current Routing Protocols for Ad Hoc Mobile Wireless Networks," IEEE Personal Communications, Apr. 1999, pp. 46-55.

M. Gerla, G. Pei, X. Hong, and T-W. Chen, Fisheye State Routing Protocol (FSR) for Ad Hoc Networks (Work in progress), draft-ietf-manet-fsr-00.txt, Nov. 17, 2000.

S. Basagini, I. Chlamatac, and V. Syrotiuk, "A Distance Routing Effect Algorithm for Mobility (DREAM)," Proceedings of the 4th Annual IEEE/ACM Conference on Mobile Computing and Networking, 1998, pp. 76-84.

\* cited by examiner

FIGURE 2A
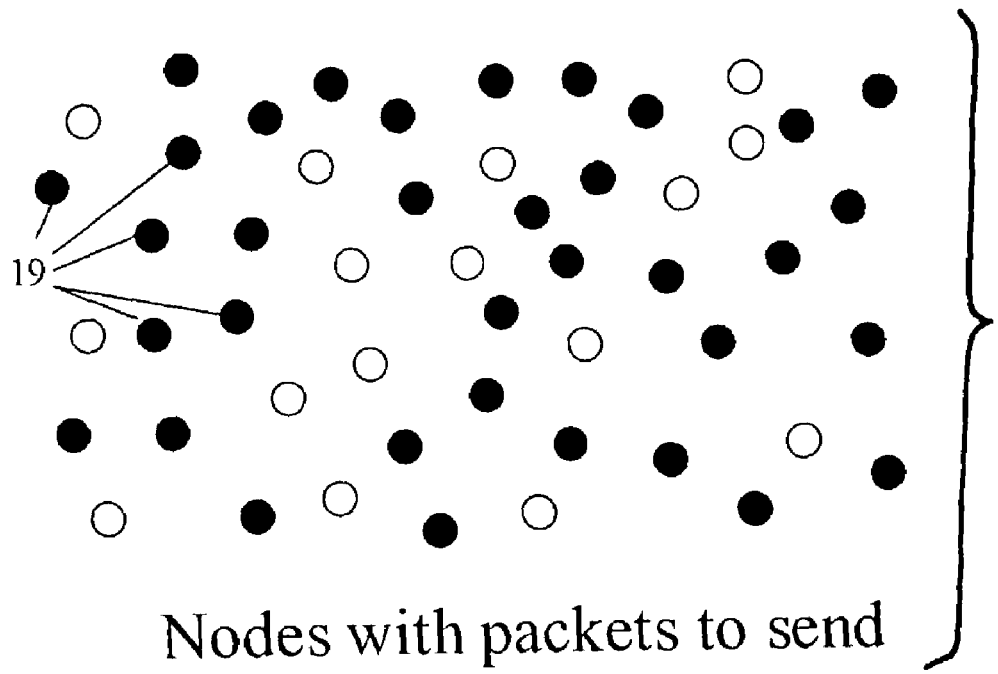
Nodes with packets to send
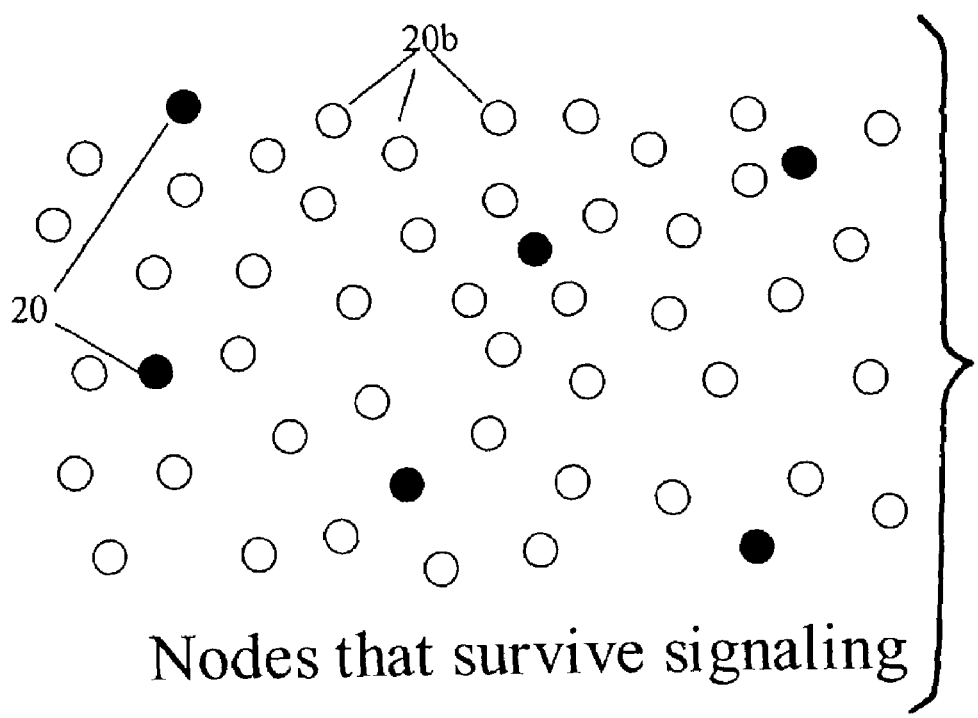
Nodes that survive signaling
FIGURE 2B

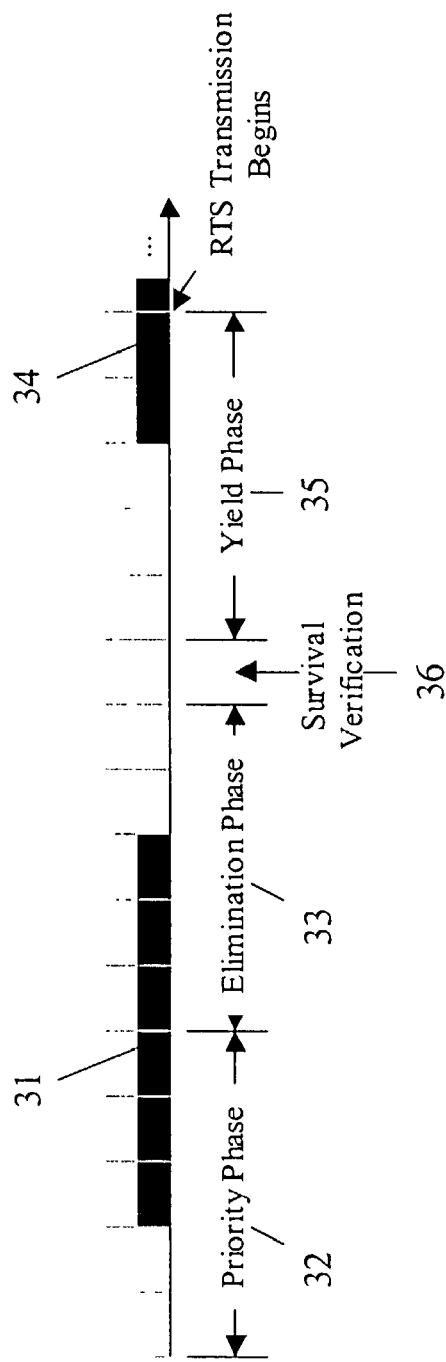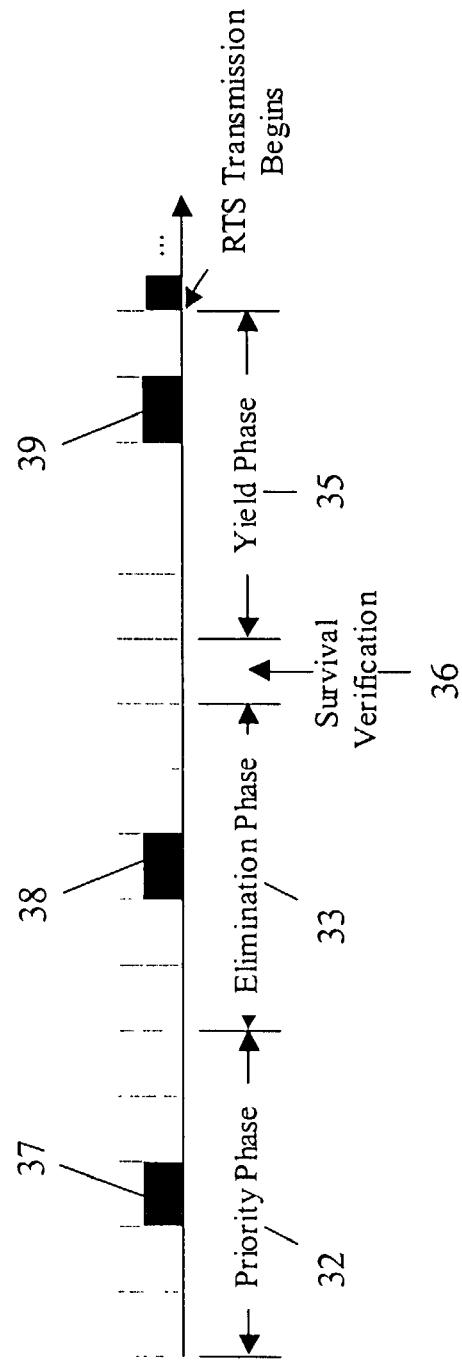

Number of Contenders
First to Assert Phase with *4* Slots

Number of Contenders

First to Assert Phase with *0.98* Listen Probability

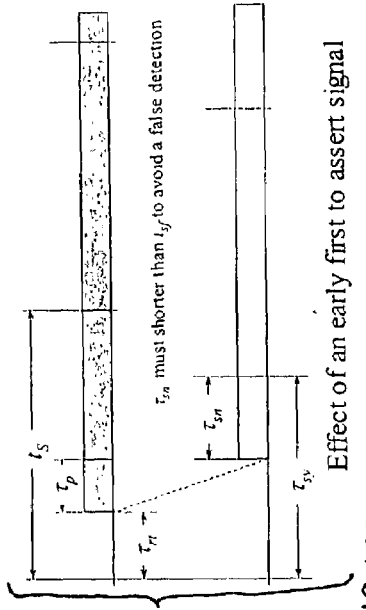
FIG. 17A
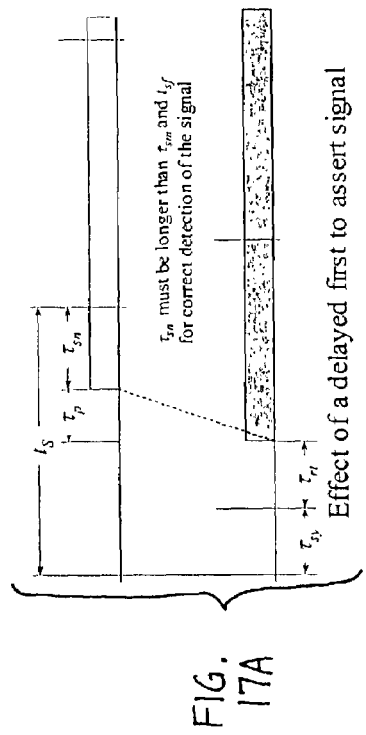
FIG. 17C
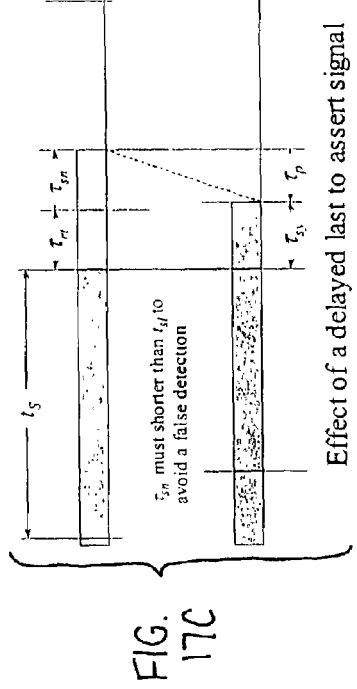
FIG. 17B
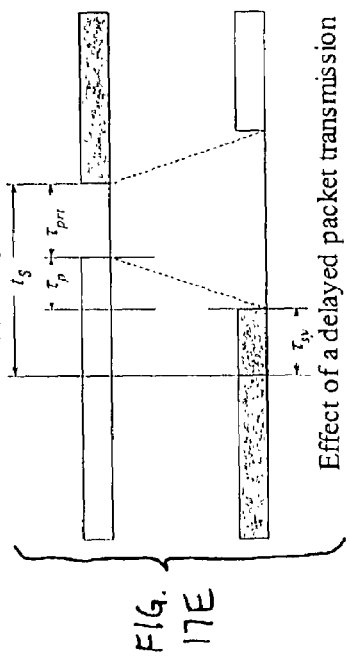
FIG. 17D
FIG. 17E

| ADD | LOC | PE | IN | PD | RF | ES | CI |
|---|---|---|---|---|---|---|---|

| CLS | V | D | DS | PS | DO | DP | TS |
|---|---|---|---|---|---|---|---|

Node state information

| ADD | LOC1 | PE1 | CI1 | CLS1 | V1 | D1 | RF1 |
|---|---|---|---|---|---|---|---|

| ES1 | DS1 | DO1 | DP1 | LOC2 | PE2 | CI2 | CLS2 |
|---|---|---|---|---|---|---|---|

| V2 | D2 | RF2 | ES2 | DS2 | DO2 | DP2 | COST |
|---|---|---|---|---|---|---|---|

Wormhole state information

ADD - Address
CLS - Class
COST - Metric for a wormhole
CI - Channel Identifier
D - Direction
DO - Dozing Offset
DP - Dozing Period
DS - Dozing State
ES - Energy State
IN - Infrastructure
LOC - Location
PE - Path Loss Exponent
PS - P-Supporter Address
RF - Receive Fraction
TS - Timestamp
V - Velocity

FIGURE 19

FIGURE 25A
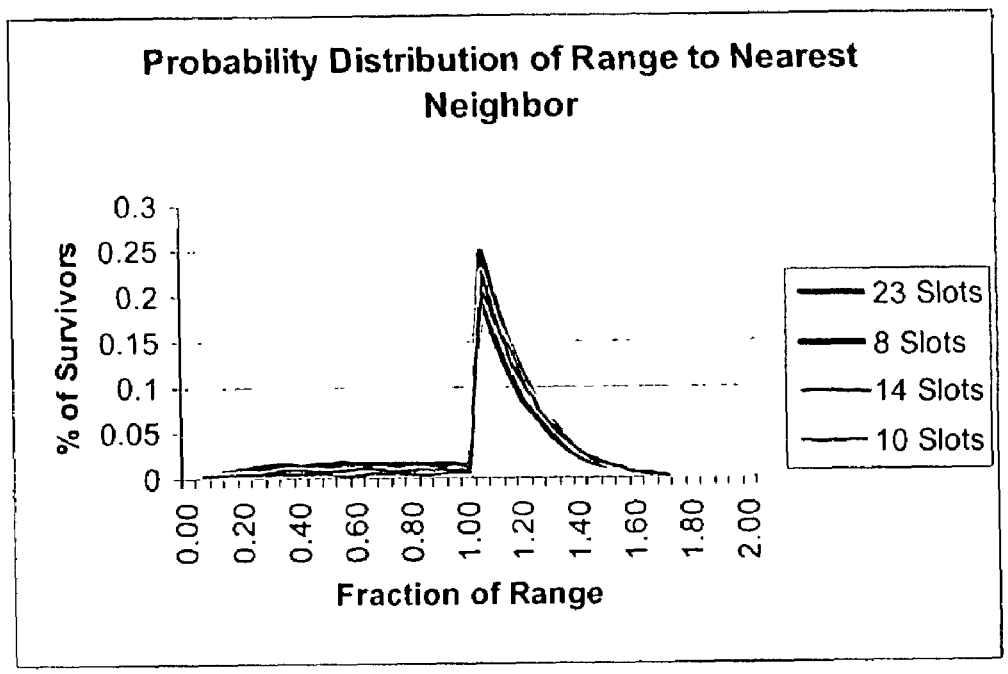
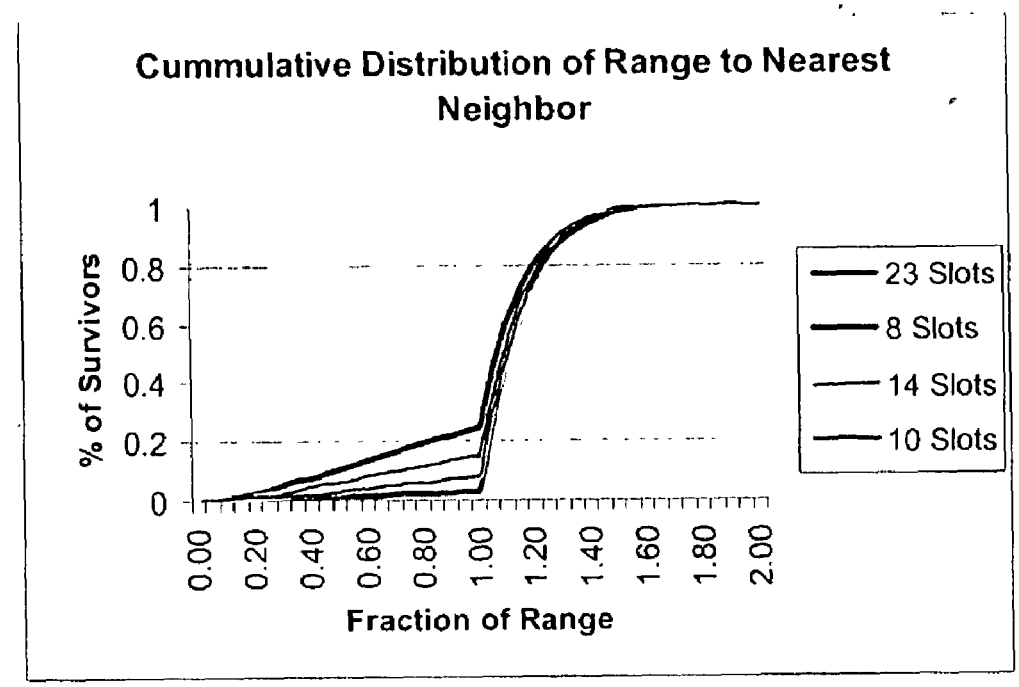
FIGURE 25B

FIGURE 26A
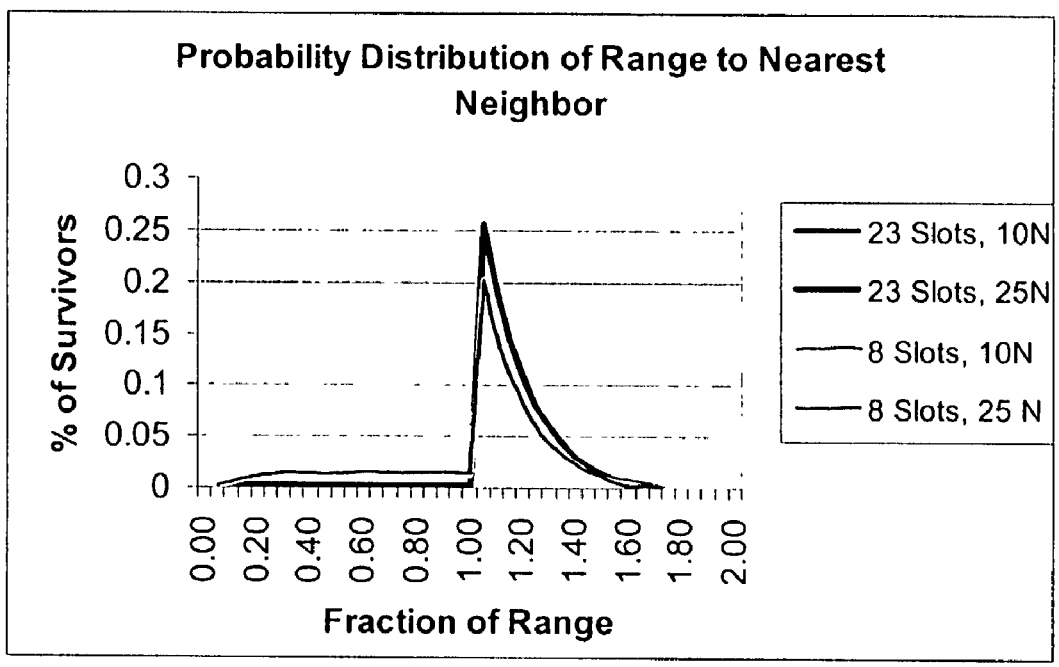
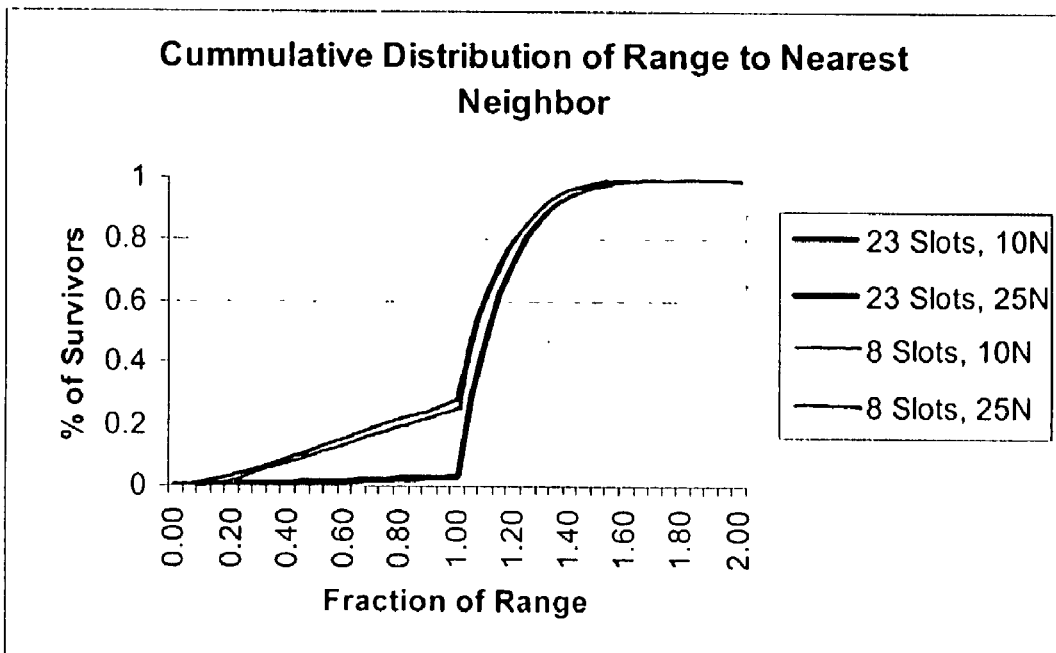
FIGURE 26B

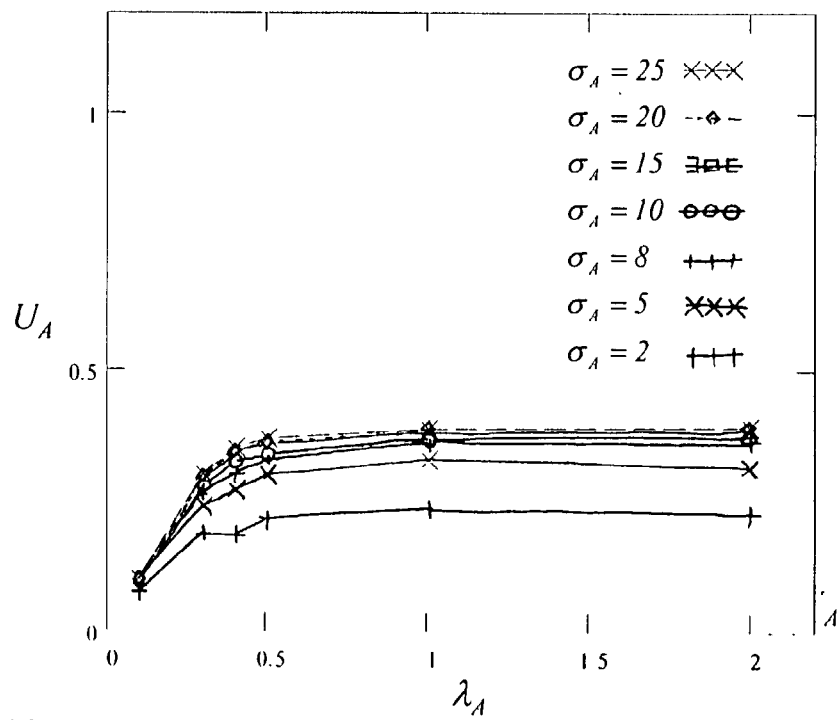
FIGURE 27A  Spatial capacity with $PG = 1$
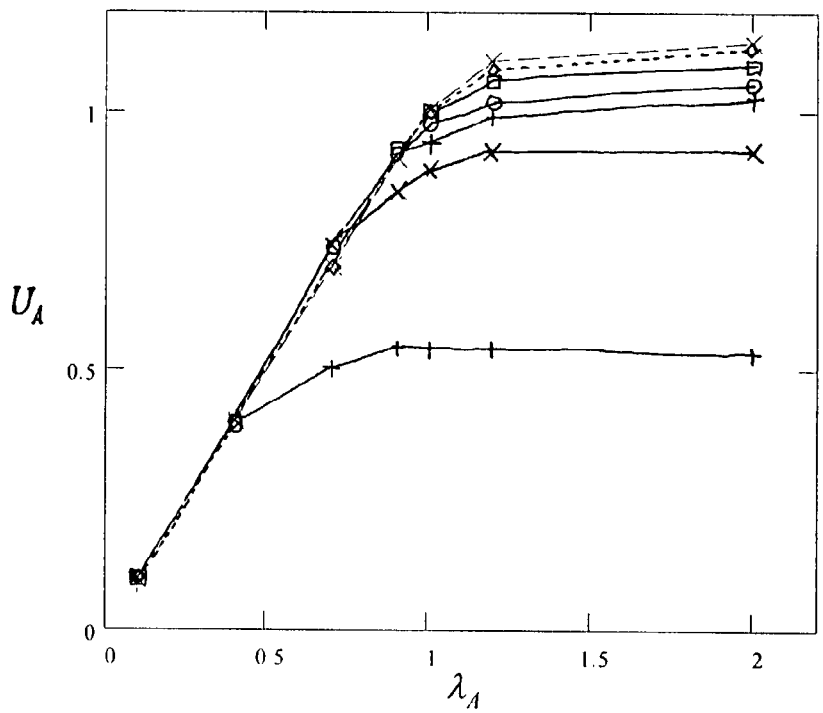
Spatial capacity with $PG = 100$
FIGURE 27B

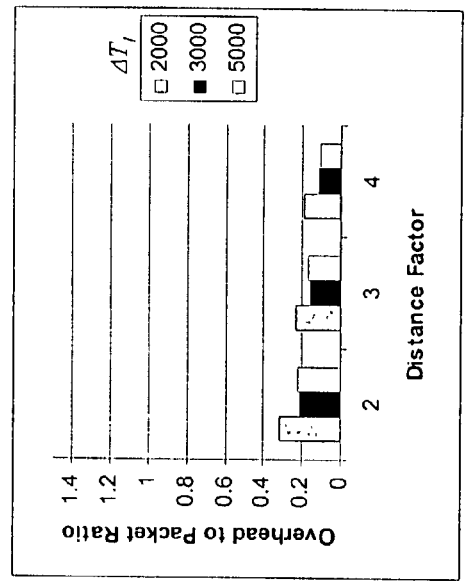
FIG. 28A  Percentage of packets delivered
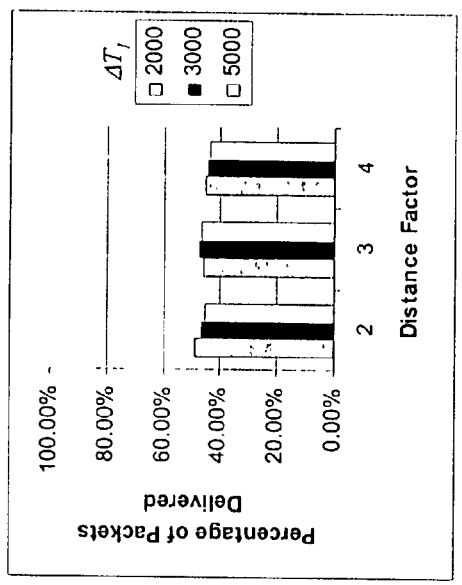
FIG. 28B  Overhead to packet ratio
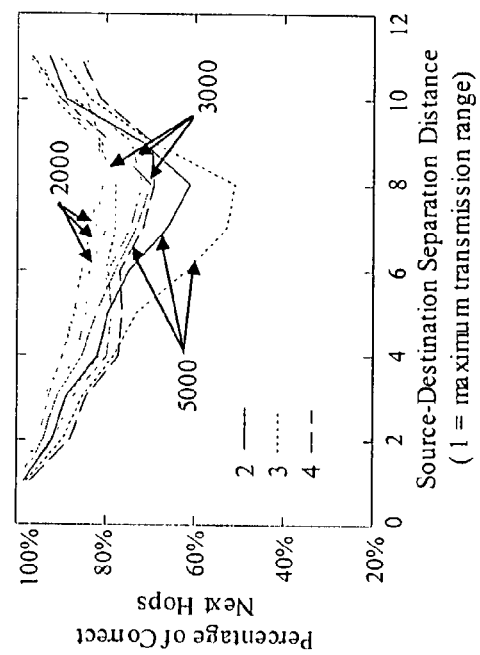
FIG. 28C  Routing table accuracy

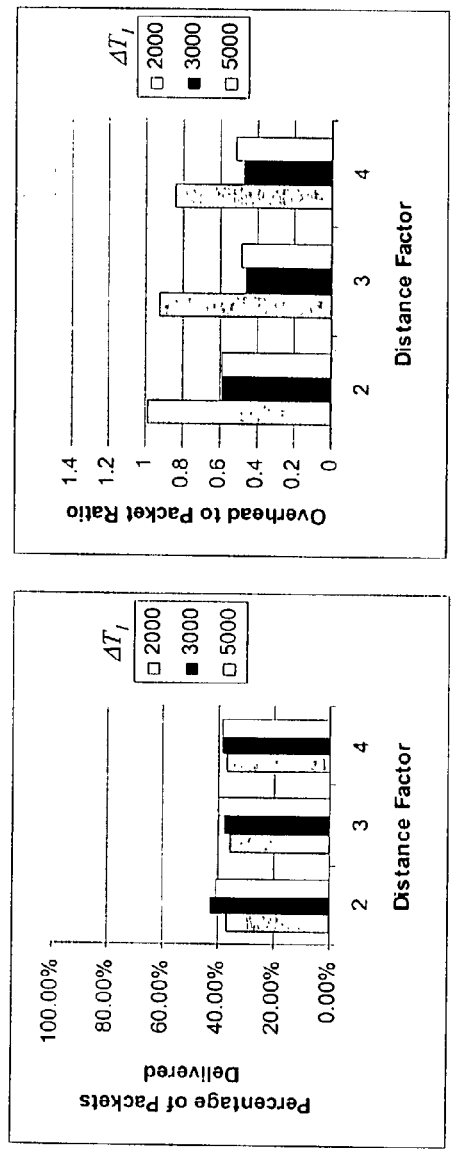
FIG. 29A  Percentage of packets delivered
FIG. 29B  Overhead to packet ratio
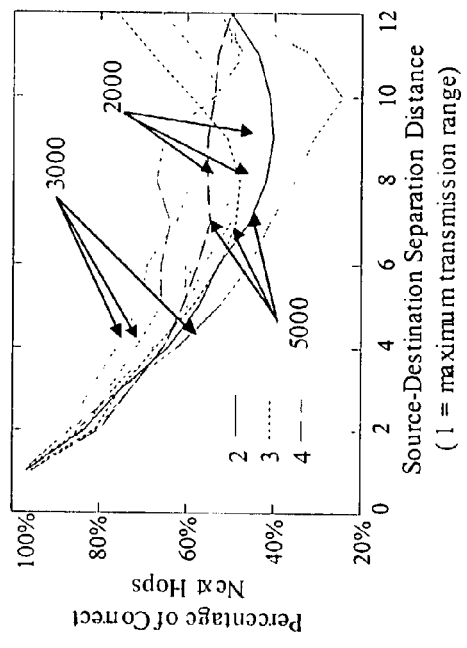
FIG. 29C  Routing table accuracy

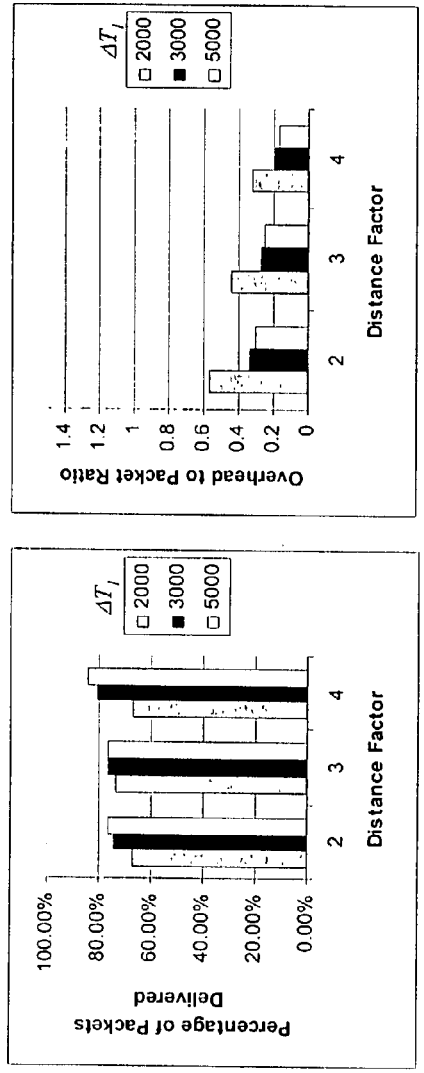
FIG. 30A Percentage of packets delivered
FIG. 30B Overhead to packet ratio
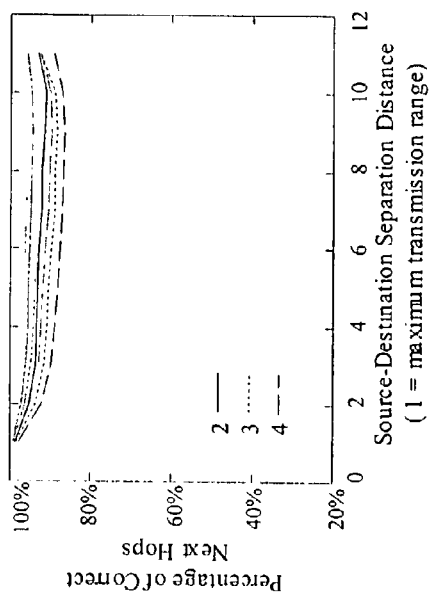
FIG. 30C Routing table accuracy

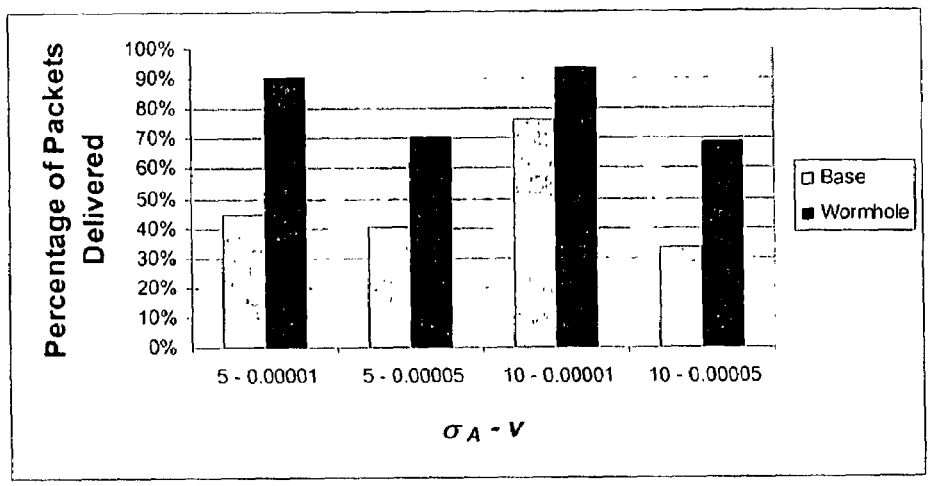
FIG. 33A    Percentage of packets delivered
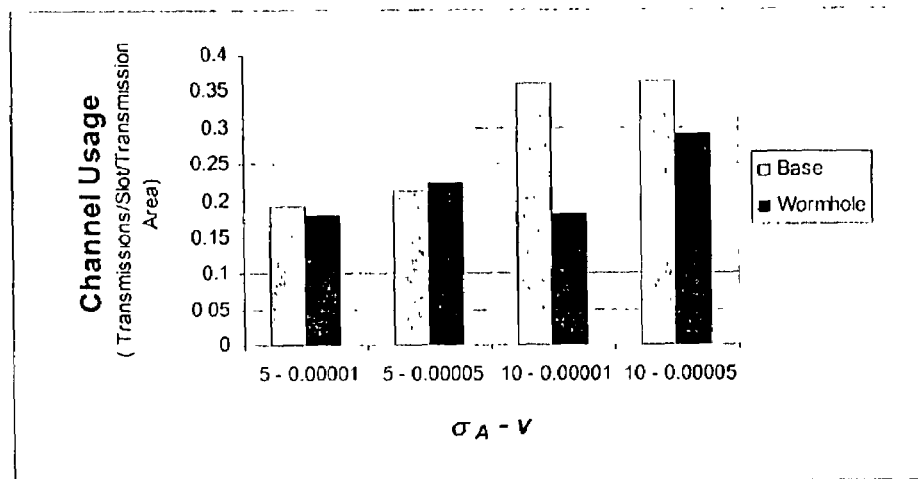
FIG. 33B    Channel Usage
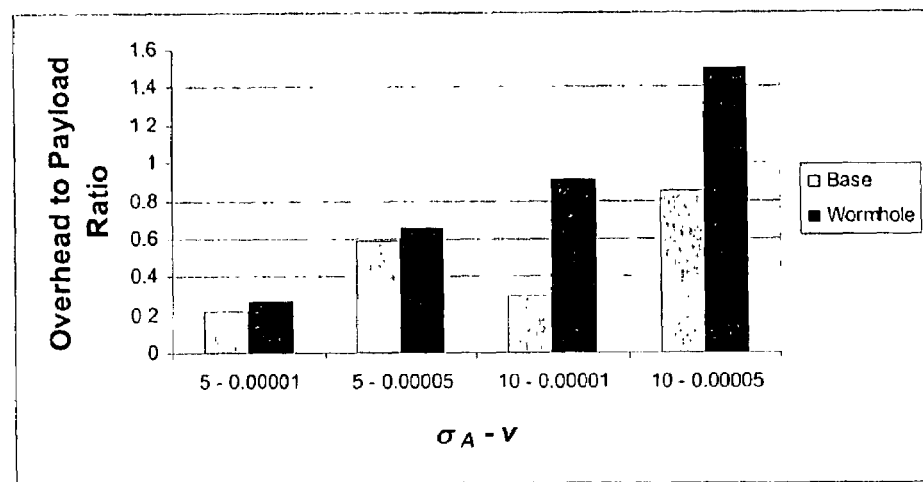
FIG. 33C    Overhead to payload ratioa

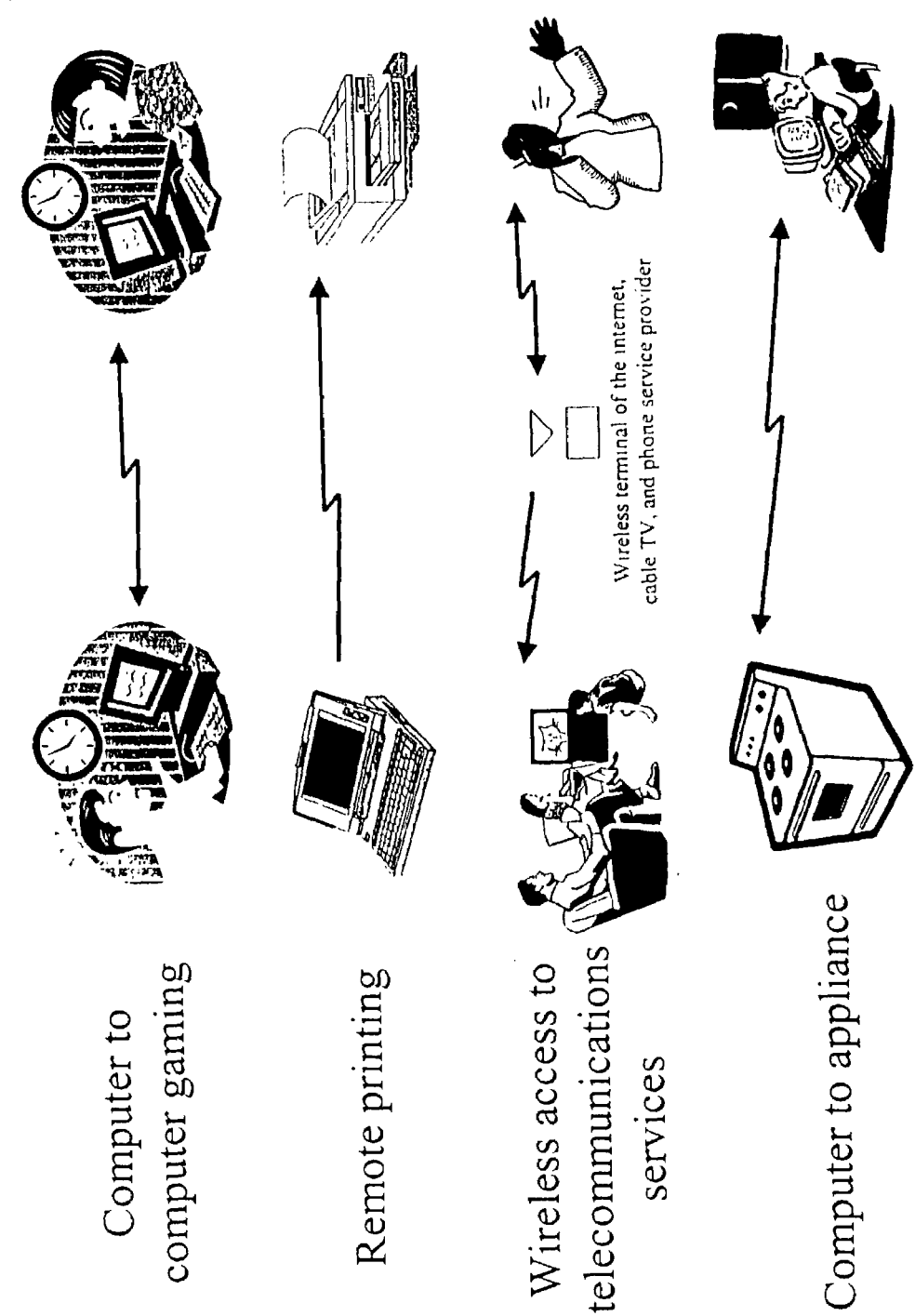

ACCESS AND ROUTING PROTOCOL FOR AD HOC NETWORK USING SYNCHRONOUS COLLISION RESOLUTION AND NODE STATE DISSEMINATION

CROSS REFERENCE TO RELATED APPLICATIONS

This application claims the benefit of provisional application No. 60/277,716, filed Mar. 21, 2001, which is incorporated by reference herein, in its entirety, for all purposes.

GOVERNMENT LICENSE RIGHTS

The U.S. Government has a paid-up license in this invention and the right in limited circumstances to require the patent owner to license others on reasonable terms as provided in DA Form 2873-R, April 93.

FIELD OF THE INVENTION

The invention relates generally to wireless communications. More particularly the present invention is a protocol for use with ad hoc mobile networks that distributively controls medium access and packet routing thereby avoiding collisions of communications and providing quality of service in a synchronous communication system.

BACKGROUND OF THE INVENTION

Ad hoc mobile networks have been proposed as a solution to wireless networking where nodes are mobile, the range of their mobility exceeds the transmission range of any single transceiver, and there is no existing network infrastructure such as that which exists in a more traditional fixed wireless network having transmission towers and base stations. Typical proposed applications for such ad hoc networks include military command and control, search and rescue, sensor, and disaster relief networks. However, ad hoc networking may find broader application as a networking approach in offices, across college campuses, in homes, and even possibly as the architecture of a future generation of mobile wireless data networks. Indeed, the increasing availability of high frequency transceivers (i.e. high bandwidth) will allow simultaneous support of multiple connections at different qualities of service (QoS). However, the increased attenuation associated with such high frequencies will make cellular architectures centered on nodes communicating directly with base stations impractical. The natural alternative is for nodes to communicate with their peers rather than with a base station and to cooperate to support connectivity as is envisaged by the ad hoc networking approach.

Ad hoc networks have no base stations and are quite volatile. The performance of these networks is contingent on the ability of access protocols to allocate bandwidth and the ability of routing protocols to determine and to maintain routes among the nodes. Extensive research has been directed toward this issue and numerous protocols have been proposed for both medium access and routing.

Three major challenges confront ad hoc access protocols, providing fair access onto a single channel to multiple contending nodes (i.e. all contending nodes have the same opportunity to gain access), achieving spatial reuse of the channel, and providing a mechanism that allows nodes to reserve bandwidth on the single access channel.

Fair access is typically achieved either by scheduling accesses or by introducing temporal randomness so that nodes may gain access at different times. Due to the distributed nature of ad hoc networks, temporally random access techniques improving on the principles underlying the Aloha and Carrier Sense Multiple Access (CSMA) protocols have dominated.

The IEEE 802.11 and the ETSI HIPERLAN MAC protocols exemplify the state of the art in standardized protocols. The 802.11 MAC is based on a distributed CSMA like protocol that seeks to avoid collisions when the channel is congested. Nodes schedule packet transmissions to start in randomly selected time slots within a contention window. Nodes transmit the packets after sensing the channel to be idle for that selected number of time slots. If the packet is not received successfully, a back off algorithm randomly schedules retransmission in a larger contention window. The contention window increases exponentially with each failure, thus reducing the probability that nodes, which collide, will subsequently collide. However, the protocol's performance still degrades with congestion.

The HIPERLAN protocol takes a different approach. Nodes first attempt to send packets as they arrive. If a packet arrives when the channel is busy, the node waits until the channel is free again and then contends immediately using the signaling protocol Elimination Yield Non-Preemptive Multiple Access (EYNPMA). When multiple nodes within range of each other contend simultaneously, this protocol is better than 96% effective at isolating a single winner. By contrast with 802.11, the performance of this access mechanism is robust to the density of nodes however is very susceptible to hidden node effects on account the timing of EYNPMA is based on the release of the channel by a transmitter. Only nodes within range of this transmitter can achieve the appropriate synchronization.

RICH-DP offers a variation to slotted Aloha. All nodes follow a common frequency hopping sequence. Access attempts occur on these hops as in slotted aloha but they are receiver initiated. Nodes poll their peers in these hops to determine if their peer has a packet to send them. If so, the two nodes exchange data stalling at that hop frequency and thereby avoiding collisions with future polls and data exchanges, which will occur on other hop frequencies. The use of request-to-receive (RTR) messages sent by destinations results in collision avoidance as collisions occur at destinations. Unique to this approach is that not only do the access attempts occur at random times they may occur when the sources have no data to send. Nevertheless on account of a dedicated collision free channel for the subsequent data exchange and the concurrent use of multiple channels in the same space it is a very competitive protocol. Its limitations are that it is sensitive to high node densities on account of the finite number of frequencies and typical of the slotted aloha access mechanism is subject to congestion collapse as collisions may still occur in the RTR polls.

The dispersion of nodes in networks offers the potential to spatially reuse the radio channel so that more than one pair of nodes can exchange data at a time but also results in the pesky hidden node phenomena where distant nodes transmitting simultaneously unbeknownst to each other interfere at one or both destinations. The challenge to access protocols is to resolve from a spatial distribution of transmitters a set that can use the channel simultaneously without interfering with each other.

The deleterious impact of the hidden node problem is a significant issue for CSMA protocols. In fact, when "wireless" CSMA was first presented, it was noted that CSMA's performance could degrade to that of Aloha. Subsequently, it was demonstrated that a two-way handshake prior to data transmission could suppress collisions. The principle is for the source to first transmit a short "request-to-send" (RTS) packet to the destination implicitly directing all nodes within range to back off while the data exchange takes place. Upon receiving the RTS, the destination replies with a "clear-to-send" (CTS) packet, which simultaneously directs its neighbors to back off while giving the source the go-ahead to transmit the data packet. Collisions may still occur during RTS-CTS exchanges but they only interfere with these short transmissions rather than the longer data transmissions. In fact, modeling of the present invention shows that a successful RTS-CTS exchange is a sufficient condition to assure no collision in the subsequent data transmission.

The RTS-CTS exchanges are currently used by 802.11. By contrast, HIPERLAN takes a different approach in dealing with hidden nodes. A node assumes a collision has occurred when it fails to gain access but then does not detect a packet transmission. When this is the case the node identifies this as the "hidden elimination" condition and foregoes attempting to gain access for at least 500 ms. Unfortunately, various studies reveal HIPERLAN's performance degrades significantly with an increase of hidden nodes.

RICH-DP avoids the channel sharing challenge by segregating transmissions on different frequencies.

Access protocols must enable the reservation of resources if they are to achieve bandwidth or delay QoS constraints.

The 802.11 protocol supports two types of coordination functions built upon its distributed access mechanisms, a distributed coordination function (DCF) and a point coordination function (PCF). The DCF is the default. The PCF enables a central node, the point coordinator (PC), to schedule transmissions; however, the standard provides no guidance on how this should be done. The PCF can be used to support multimedia traffic in certain situations, but this assumes that all nodes are within range of the PC. In a widely distributed network, this approach would require multiple PCs working together to manage access. Currently no work attempting such a solution for an ad hoc network appears to exist. In fact, the DCF remains the predominant coordination function used in ad hoc networking. Attempts have been made to add signaling to the DCF so as to enable it to support constant bit rate services; however, this work again requires all nodes to be within range of each other. The 802.11 protocol does not simultaneously support resource reservation and spatial reuse.

HIPERLAN's method of supporting QoS is to give priority to packets based on their residual lifetime. The EYNPMA protocol has five levels of priority, all based on the residual lifetime of a packet. Unfortunately, experiments demonstrate that this priority scheme is not effective at supporting QoS since there are no mechanisms to distinguish between packets associated with real time services and old data packets. The problem is, of course, more pronounced in congested networks where more nodes would contend to transmit old, i.e. higher priority, data packets.

Spread spectrum (SS) technology has frequently been proposed as a method to multiplex signals within the same geographic region. Spread spectrum also offers other very attractive features such as resistance to detection, resistance to multipath induced fades, and resistance to jamming. Multiple transmissions can coexist in the same frequency band when using orthogonal spread spectrum codes. This is a key technology in cellular phone systems and is the basis of code division multiple access (CDMA).

Unfortunately, several complications are introduced by the distributed nature of ad hoc networks. First, the question arises, "which code to use and when to use it?" Synchronizing the codes transmitters use to those that receivers are using to receive is not trivial. Second, in a channel with only a finite number of codes available, the network needs to assign codes such that they are spatially distributed. In a dynamic network, keeping track of codes can be as complicated as keeping track of routes. Third, unlike CDMA cell phone systems, it is possible that a destination will be closer to an interfering transmitter than its source transmitter.

Even with a different spreading sequence the relative power of the interfering signals can raise the effective noise level of the channel such that the desired signal is lost. Finally, when codes are used, networks become packet sensing as opposed to carrier sensing. Receivers must synchronize with the transmitter from the beginning of the packet transmission or else the transmission appears as noise. To avoid interfering with an ongoing exchange at a destination a source must know that the destination is idle and ready to receive its transmission. The only way to be certain that the destination is idle is to monitor the exchanges to and from the destination. This is difficult, since it may be impossible to monitor an incoming transmission to this destination on account of separation from the distant source. Not knowing who this source is also prevents knowing the code that would be used in the destination's acknowledgement. Not sensing a destination is busy is no guarantee that it is idle.

There are four approaches to selecting codes: transmitter-based, receiver-based, pair-wise oriented, and common code shifted in time. In transmitter-based schemes a unique code is assigned to each transmitter. The problem with this approach is determining which transmitter's code a potential receiver should use at a given time.

In receiver-based schemes a unique code is assigned to each receiver. In this approach, there is no confusion at either the receiver or the transmitter as to which code to use but there is the question as to when the transmitter should start transmitting. Transmitting to a destination that is already receiving a packet from another source can interfere with that reception.

With transmitter-based codes the problem associated with an adjacent node interfering with a destination's reception is not as severe since it is precluded from using the same code.

In pair-wise oriented schemes unique codes are assigned to pairs of nodes. Pair-wise coding presents the same challenge to destinations as transmitter-based codes. Each potential destination needs to determine which code it should use in receiving.

Common code systems rely on the offset of the phase of codes used in transmissions that occur concurrently. The offsets may either occur randomly or be deliberate. In the latter case, the selection of the offset is no different than the selection of the spread spectrum code in the first three approaches. Additionally, despite the presence of an offset when using common codes there is still an increased likelihood that signals may interfere with each other. However, using a common code has an advantage in that it is the only approach that can support broadcast transmissions.

Proposed solutions to the problem of selecting codes normally involve the use of hybrid protocols. In one hybrid, all nodes monitor and contend using a common code but after the addresses of the source and destination are transmitted the transmitter uses a transmitter-based code to send the data packet. The destination knows which code to use since it receives the source address before the transition to the use of the transmitter-based code. In a second protocol, every node is assigned two codes, one to receive on and one to transmit on. When a node is idle it listens using its receive code. A source will use the receive code of the destination of a packet to send the source and destination address portion of the packet but will again transition to the source's transmit code to send the data portion.

Both approaches attempt to limit the time that another node may interfere with the exchange. In the first, other nodes will only interfere during the initial transmission of the addresses and in the second the potential interference occurs during the same period but is further reduced on account that interfering nodes must be transmitting to the same destination. The disadvantage of the second protocol over the first is its inability to broadcast packets.

The assignment of codes is also a problem in spread spectrum ad hoc networks. Normally there are a finite number of codes that must be distributed to a larger number of nodes. Random selection of codes may not assure the required physical separation of nodes using the same codes. Various algorithms have been developed for the assignment of codes. Most methods of assigning and distributing codes are associated with the hierarchical organization of networks.

Code assignment does not eliminate the unwanted interference from transmitters in close proximity to the destination end of other exchanges. In other words, the interfering source is closer to a destination than its intended source. Ideally, an access protocol would deliberately select transmitting nodes that do not interfere at the destinations.

Although there has been much work on the use of spread spectrum in ad hoc networks there are no protocols that completely integrate within a medium access control protocol the assignment of codes, the scheduling of a spatially distributed set of transmissions, and a method used by nodes to select codes for transmission and reception. In turn there are no methods that support the use of CDMA technology to transmit different messages from one node to many.

Routing protocols in ad hoc networks attempt to balance the reliability of routing information with the overhead that is required to obtain it. The objective is to obtain the best balance resulting in high end-to-end throughput in the network. Obviously, having very accurate routes will insure that a route can be found for a packet but may incur excessive routing overhead thus reducing the payload capacity of the network and in-turn reducing end-to-end throughput. Similarly, with less overhead the network may be able to support more payload but at the expense of greater delays and greater losses of packets and in-turn less end-to-end throughput. Additionally, most protocols are very dependent on the volatility of the network. Node mobility invariably increases the overhead required to support routing.

Routing protocols have been traditionally categorized as either link state or distance vector. Link state protocols are centralized routing protocols where individual nodes accumulate link state information and then calculate routes. Distance vector protocols are distributed protocols where neighbor routing information is used to construct routing tables.

Generally, when using link state information, no node has a vision of the complete network topology, only the next hop on a path to each destination. Each protocol reacts differently to link state changes. In the link state protocol all nodes must explicitly receive a packet indicating the change in the link state. Then that node can calculate new routes. In distance vector approaches, the effect of a change in a link state propagates through the network after the nodes that are ends of a changed link advertise a new routing table that uses different links. The effect of failed links may take a while to resolve and can result in route looping if some method is not applied to specifically preclude it from occurring. In either approach changes can result in a deluge of overhead traffic. In both the link state and distance vector approaches network volatility can result in so much overhead that network capacity collapses and network routes become inaccurate.

On account of the overhead in updating routing tables in ad hoc networks, modifications have been made to the basic link state and distance vector algorithms that attempt to preclude updates or to delay finding routes until they are needed. These approaches are broadly categorized as proactive and reactive protocols. Some distinguish these protocols as table driven versus on-demand routing protocols. In proactive protocols information about the network is sought continuously. The objective is to even out the routing overhead over time and to enable routes to be identified more quickly. Reactive protocols delay seeking routes until they are needed, thereby reducing overhead at the expense of responsiveness. Many ad hoc routing protocols have both proactive and reactive characteristics. A third approach to improving the basic protocols is to build a hierarchical organization of nodes that attempts to reduce the quantity of routing information necessary at individual nodes to identify routes. These are referred to as hierarchical routing approaches. Hierarchical routing protocols may still have proactive and reactive characteristics. A fourth approach is to use physical location in routing. Protocols that use location information either use this information to define a subset of the network's nodes within which to search for a route or directly use location information in calculating routes.

Several proactive routing schemes exist in conjunction with distance vector algorithms, most notably the Destination-Sequenced Distance-Vector (DSDV) routing protocol and the Wireless Routing Protocol (WRP). Both add additional information to the routing tables in order to prevent the creation of routing loops and to support faster convergence to valid routes after link changes. In DSDV the routing table includes a sequence number provided by a destination for each route. These destination sequence numbers are always even. Nodes will always use the route with the most recent sequence number and in the case of two routes with the same sequence number choose the route with the smaller metric. In the case of a route being identified as bad, a node advertises its routing table with the next odd sequence number for this route thereby also indicating an infinite metric. This message serves as a query to the destination to generate a new sequence number for identifying a new route. A node identifies a new route to a destination when it receives a route with a more recent sequence number. Loops are avoided since the protocol precludes a node from selecting a route based on an older sequence number. In WRP the routing tables include the addresses of predecessor nodes. A predecessor is the node that transmits a packet to a final destination. The objective of adding this additional information is to avoid looping. A node that identifies a link failure will select an alternate route through one of its neighbors that does not have the same predecessor node thus avoiding counting to infinity and looping. Additionally, with this predecessor information a node can trace back from each destination all hops that are taken from the source. Each node has the ability to verify that there are no loops in its routing tables and that routes do not use failed links thus enabling quicker convergence of the protocol.

Two proactive link state routing protocols have recently been proposed Optimized Link State Routing (OLSR) and Fisheye Routing. OLSR attempts to reduce the overhead of disseminating link state information by identifying a subset of nodes to broadcast link state information during the flooding process. The subset of nodes that relay link state information are referred to as multipoint relays (MPRs). Each node selects the MPRs for the link state information it relays. MPRs are selected to insure the broadest connectivity with the fewest MPRs. A node's set of MPRs must be able to reach all of its two-hop neighbors. Fisheye routing controls the frequency at which link state information is propagated through the network. Link state information is disseminated to distant nodes less frequently than it is disseminated to neighbors. The intuition behind the protocol is that changes in routes based on a distant destinations movements have only a small effect on the route near the source and that as the packet gets closer to the destination, nodes with more current information will take over the routing anyway. So these improvements to the basic link state routing protocol attempt to reduce the quantity of link state updates by either reducing the number of nodes disseminating them or by reducing the frequency of updates based on the need to receive them.

The most extensive research in ad hoc routing protocols has been in developing reactive protocols referred to as source initiated on-demand routing protocols. The general concept is pretty much to ignore routing until a route is needed. At that time, the source initiates some route searching mechanism to find the "best" route to the destination. The protocols differ in how much overhead is required to discover the route and the ability of the route to withstand or react to subsequent network changes. The simplest of the on-demand protocols is Ad Hoc On-Demand Distance Vector Routing (AODV). In AODV, nodes only retain routing information on routes over which they are actively participating. If a node needs a route, it attempts to discover one. The process involves a series of route request broadcasts that are flooded throughout the network. Three sequence numbers; source, broadcast ID, and destination, characterize the requests. Each node that receives a request notes the address of the node from which it first receives the request and either further broadcasts the request or responds with a unicast reply to the predecessor identifying that it can provide a path to the destination. If the request reaches the destination, the destination responds with the unicast reply. The distance of the final route received by the source depends on the manner in which the initial request progressed through the network. In the case of link failures, the node identifying the failure may reply back to the source that the route is no longer valid in which case the source executes a new search or it may attempt to do a repair locally by broadcasting its own route request packet. As can be seen the protocol relies on flooding to find a route but attempts several modifications to reduce the quantity of transmissions that are required.

The other on-demand routing protocols build upon the AODV concept. Dynamic Source Routing (DSR) requires nodes to retain routes that they have learned or overheard and then for these nodes to use this information to reduce the overhead of route discovery. If a node receives a route request for which it has a route it simply replies to the source. If a route is broken the node identifying the break either forwards the packet using an alternative route in its cache or it notifies the source, which then has the option of using another cached route or invoking the route discovery process. The Temporally Ordered Routing Algorithm (TORA) uses the route discovery process to build a directed acyclic graph (DAG) rooted at the destination. In such a graph all nodes point toward the most effective path to the destination. The advantage of this approach is that with link failure the algorithm provides an efficient method for the network to modify the DAG thus keeping a route to the destination. However, it is not effective at adding links except with a new discovery process.

Associativity-Based Routing (ABR) protocol uses locally gained information to give preference to the use of associated links in routes that are discovered. An associated link is a link between nodes that have a long-term association. This is measured by how long the two nodes have been within range of each other. It may occur when two nodes are not moving and are close to each other or if the nodes move in unison. The objective of this metric is to find routes with a greater expected longevity so that the route discovery process is used less often. When the destination receives several route requests it chooses the route that has the best associativity characteristics. ABR also has a very deliberate route reconstruction process. The specific process depends on where a link is lost. If the route fails near the destination, then the upstream node to the failed link attempts to find an alternate path. If unsuccessful, the responsibility is passed on to the next upstream node, and so on, until a new route is found or the process has backtracked half the distance of the original route. In the latter case the "pivot" node sends a route notification packet to the source so that it will reattempt the route discovery process.

A final example of the on-demand protocols is the Signal Stability-Based Adaptive Routing (SSA) protocol. SSA is similar in objective to ABR in that it attempts to identify greater longevity routes but it uses signal strength and location stability in its metrics for choosing the route. In the case of a link failure, the protocol requires the upstream node to notify the source of the error. The response is for the source to erase the route and to then invoke another discovery process. As can be seen, the on-demand routing protocols balance the quantity of overhead with the responsiveness of the route discovery process and the ability of the network to maintain valid routes without having to repeat the discovery effort. The trend in the improvement efforts is to use information that can be gained by individual nodes to support one or several of three objectives: find routes that are robust so there are fewer discovery efforts; leverage the information to fix failed routes; and, leverage the information to reduce the overhead of discovering routes.

Hierarchical routing protocols attempt to reduce the routing traffic by reducing the quantity of overhead required to create and maintain routes. Nodes are organized into clusters. The resolution of routing the table differs for routes within a cluster versus routes outside of clusters. Nodes have explicit routes to nodes within their own cluster but have limited understanding of the routes to nodes in other clusters except for the series of clusters the route follows to ultimately get to the destination. Some approaches identify certain leaders within each cluster to perform the route calculations in lieu of every node as a method to reduce routing overhead. Most proposals in this area focuses on the formation of clusters, the coordination of routes within clusters, the coordination of routes between clusters, and the maintenance of cluster organization. Clustering offers a new dimension to the complexity of routing in the sense that creating and maintaining the cluster organization adds overhead of its own. Several solutions have been suggested. They differ in whether clusters intersect, in the criteria used to form the clusters, and whether the clusters have leaders. The benefit of creating clusters is the reduction in routing overhead that results form reduced size routing tables, the reduced set of nodes participating in the routing algorithms, and a reduction in sensitivity to node mobility as this mobility is hidden within the cluster organization. The routing protocols themselves, however, remain very similar or identical to those discussed above. Hierarchical routing is a hybrid type of routing that combines the use of reactive and proactive routing protocols. Proactive protocols are used within the clusters and reactive routing is used between clusters. This hybrid use of protocols has also been suggested for flat networks in the Zone Routing Protocol (ZRP) as a method to reduce delay in the route discovery process without overloading the network with the overhead typical of the proactive protocols.

With the advent of the Global Positioning System (GPS) and other location technologies, physical location has increasingly been identified as a parameter in reducing routing overhead. Location is used in one of three ways. First, location can be used to define a smaller region within which to search for a route when using on-demand type protocols. One such protocol is Location-Aided Routing (LAR) where two different algorithms are suggested for defining a search region. The first is a simple box that is defined by the location of the source and a potential region where the destination may be located. In the second search algorithm requests are forwarded to packets based on their predicted distance to the destination. Both algorithms are effective at reducing overhead.

The second way location can reduce routing overhead is by reducing the number of routes that are tracked. An example of this type of protocol is LANMAR. Rather than maintaining routes to every node in a large network, nodes keep routes for a subset of nodes within its "scope" and then routes to several landmark nodes. Nodes not included in this list are associated with landmark nodes. Packets for distant nodes are first routed toward the destination's associated landmark and once the packet arrives at a node that has the destination within its scope, the packet is rerouted directly to the destination. As can be seen, this protocol accepts a less accurate route the more distance between the source and destination just as Fisheye routing.

Another example of this type of approach is the zone based hierarchical link state (ZHLS) routing protocol. In ZHLS spatial zones are mapped out and nodes use location information to identify their association with a zone. Within their physical zone, nodes use link state routing to route packets but packets destined for nodes in other zones are routed through intermediate zones rather than nodes. If a source does not know the location of a destination it queries each zone to find the destination.

The third approach is to use location explicitly in the calculation of routes. An example of this type of protocol is the Distance Routing Effect Algorithm for Mobility (DREAM). In DREAM, sources route packets to intermediate nodes in the direction of the last known location of the destination. When there is no node in the direction of the destination that is within range, the packet is flooded. Routing overhead is limited to that required to disseminate node locations. The rate of updates follows the philosophy of Fisheye routing. Nodes broadcast updates based on changes in location and assign a lifetime to these updates. Other nodes continue to forward these updates in broadcasts so long as the packet has not expired. In this manner distant nodes receive fewer updates. Also, less information must be disseminated in these updates since there are far fewer nodes than there are links.

With the exception of DREAM, all the protocols are based on the measured quality of links. The relative performance of current routing protocols is situation dependent. The distance vector and link state algorithms that perform so well for static networks are not suitable in highly dynamic networks. A significant difference between static networks and wireless networks is that the links themselves are not physical entities in wireless networks. Rather, the nodes and their distribution are the physical entities. Link availability and link capacity are transient being spatially and temporally dependent on the distribution of nodes. Therefore, it follows that node states are more relevant to the routing solutions than link states and distance vectors. Additionally, many of the objectives in wireless routing are node oriented such as location based services and energy conservation.

Quality of service (QoS) routing protocols built upon distributed access mechanism are few. Their effectiveness is questionable. The challenge is that most MAC protocols for ad hoc networks are based on temporally random attempts to differentiate who has access. (e.g. Aloha, Slotted Aloha, MACA, MACAW, FAMA, 802.11, HIPERLAN, etc.) Such access protocols prevent routing protocols from providing bandwidth and delay guarantees. It is not feasible to guarantee QoS when access to the channel at each hop occurs at random times. The typical approach to overcome this limitation is to improve the probability that packets that require some sort of QoS can gain access. This is accomplished at the MAC level by increasing the probability that these packets will attempt access first such as HIPERLAN, which provides a priority access scheme. But such priority access schemes are not effective in congested networks. So at the routing level, QoS routing either attempts to send packets through less congested regions of the network by creating routing metrics that favor stable and uncongested links. Each of these tasks is somewhat daunting.

Identifying less congested regions itself contributes to congestion. Like access protocols, the effectiveness of these routing protocols is very contingent on the network load. In addition, the measurement of link availability is based on passed qualities which may not be present when the service is attempted. The more appropriate approach is to reserve resources (i.e. links at specific times). A reservation approach is suggested which assumes a underlying Time Division Multiple Access (TDMA) MAC that is complemented with Code Division Multiple Access (CDMA). The gist of the protocol is to reserve TDMA slots along the path. It assumes away the near-far and hidden node problems on account of the use of CDMA (This is an assumption since no provisions are made to separate interfering transmitters from destinations. Even with the use of different codes hidden nodes may interfere if they are close to the destination.) Each destination along the path accepts a reservation from a source and agrees to listen to a slot on a periodic basis using the source's code. The initial access mechanism to the slots and the coordination of which codes to use are not described.

Mobile nodes in ad hoc networks frequently rely on batteries for energy and therefore have a finite lifetime. Conserving energy is therefore important to extending the lifetime of both individual nodes and the network. This is especially difficult in ad hoc networks since energy conserving actions must be made in a distributed manner. In fact, the continuous participation of the mobile nodes to create a fabric of connectivity is critical to the overall performance of the network. Typically, this results in a choice of either operating at peak performance at the expense of a shortly lived network or choosing sub optimum performance for network longevity. Additionally, most energy conserving protocols focus on the implementation of a single energy conserving approach.

Protocols may use four sets of mechanisms to reduce energy consumption: 1) help nodes enter low energy states; 2) choose routes that consume the least energy; 3) selectively use nodes based on their energy status; 4) reduce overhead.

Using low energy states has great potential for conserving energy since these state use less than a tenth of the energy used by radios when receiving or transmitting. The default state of nodes is receiving since signal processing is required to detect and to synchronize to an incoming signal. Entering a low energy state requires the node to cease sensing the channel and to stop participating in the network's activities. The objective of type 1 energy conserving protocols is to assist nodes that are not participating in data exchanges to enter a low energy state without degrading overall performance of the network. Proposed methods for managing nodes entering the doze state may be one of two kinds. In the first, nodes doze and then wakeup on a periodic basis according to network wide parameters. The 802.11 standard provides this kind of mechanism. The second requires the node desiring to doze to specifically coordinate a dozing cycle with another supporting node that agrees to act as a surrogate destination for the dozing node's traffic while it is dozing. The ETSI HIPERLAN standard uses this approach.

In both the 802.11 and HIPERLAN protocols, the decision to doze is initiated by the individual nodes desiring to conserve energy. In the ad hoc version of an 802.11 network, the node that first forms the network decides whether it permits energy conservation by establishing an "ATIM Period." A node that desires to conserve energy may doze so long as it wakes each ATIM Period to listen for ad hoc traffic indication messages (ATIM). ATIMs are transmitted during a short window at the beginning of each ATIM period, called an ATIM Window. If the node wakes and hears an ATIM directed to itself, it acknowledges the ATIM and remains awake for the rest of the ATIM period prepared to receive traffic. If it receives no ATIM directed to itself, the node returns to the doze state at the conclusion of the ATIM window. Note that there is no method for a node's intent to doze to be disseminated. Other nodes assume this state after failing to transfer data through regular contention.

The energy conserving mechanism in HIPERLAN requires a node desiring to doze, a "p-saver," to coordinate with another to serve as its surrogate, a "p-supporter". As part of this coordination the two nodes agree to a period at which the p-saver will awaken to receive unicast messages and a period at which the p-supporter will transmit multicast messages. The p-supporter node collects transmissions intended for the p-saver and then attempts to forward them to the p-saver during the coordinated transmission periods.

HIPERLAN's approach is disconcerting since it does not make the dozing states known throughout the network. Nodes in ad hoc networks depend on each other to route and distribute packets to each other. The arrangement of having a surrogate node collect data for another may defeat many routing protocols. The p-supporter node may not be in a location to collect data from a relaying node in the opposite direction to the p-saver. Additionally, the p-saver may be a critical next hop in a route.

The critical deficiency of both the 802.11 and HIPERLAN techniques is that they do not account for the repercussions of a single node's decision to enter the doze state. These repercussions are more congestion as nodes attempt to send traffic to nodes that are dozing and complications for other protocols higher in the stack such as routing. To minimize these adverse effects, access protocols must be able to make dozing more predictable and to integrate the occurrence of dozing with the activities of the routing protocol.

Routing protocols conserve energy by identifying routes based on energy consumption. From the protocol perspective, energy is consumed in transmission and in reception. The energy consumed in transmission can vary based on the range between a source and its destination. This assumes that all nodes know each others' locations and that a source can adjust its transmission power to the minimum required for a successful exchange with a destination. The energy consumed in reception is constant. Due to the power law relation of energy consumed to the distance transmitted a route with more shorter hops may consume less energy than a route with fewer longer hops. It is possible for a route that used two equidistant hops to a destination would require as little as $\frac{1}{8}^{th}$ the transmission energy of the direct one hop route. Routing protocols must also consider the energy consumed in each additional reception. So while the transmission energy decreases with more and shorter hops the reception energy increases. Therefore, calculating routes that consume the least energy is accomplished with either distance vector or link state routing algorithms together with a metric for links that combines the energy used in the transmission with the energy consumed in the reception. Building such a metric requires sharing information between the nodes at both ends of a link and some method for determining the power required to transmit across the link.

Routing protocols may prolong the lifetime of a network by preferring the use of nodes that are not energy constrained and by balancing the use of nodes that are energy constrained. One approach to solve this problem is Power-Aware Routing. It uses an energy cost metric for links that is obtained by weighting the energy consumption on the path by the energy reserve on each node of the path. This has a load balancing characteristic that steers traffic away from low energy nodes. Currently, there are no practicable uses of this metric either.

Current access methods further limit the practicability of using energy consumed and node lifetime as part of a routing metric. Both encourage more contentions in a network and in more congestion. This increase in congestion results in failed access attempts and, thus, a corresponding increase in energy consumption. It is believed that the decreased consumption of energy used in transmitting a packet is more than balanced by an increase in energy consumption to gain access for a net energy loss.

The challenge of implementing energy conservation mechanisms is their interlayer dependence. The success of a mechanism based on a MAC mechanism can greatly affect the routing protocol (e.g. dozing can remove potential routes) and vice versa (e.g. using shorter hops can increase congestion and preclude dozing). Energy conservation mechanisms must be integrated across layers. Such integration can be achieved only if the dozing methods are made known to the routing protocol and if the routing protocol does not cause congestion.

In view of the above, what would be truly useful is a protocol that can be used with ad hoc networks. Such a protocol would integrate medium access control and routing such that they provide quality of service, while conserving energy of individual mobile nodes, and while allowing maximum use of wireless channels minimizing collisions of concurrent communications.

SUMMARY OF THE INVENTION

It is therefore an object of the present invention to allow spatial reuse of a wireless channel.

It is yet another object of the present invention to insure that there are no collisions with hidden nodes during transmission of data.

It is still another object of the present invention to minimize the effect of propagation delays and transceiver state transitions.

It is a further object of the present invention to prioritize the transmission data for Quality Of Service purposes.

It is yet another object of the present invention to conserve energy of transceivers in a mobile network.

It is still another object of the present invention to arrive at an architecture for future generations of mobile wireless networks.

It is a further object of the present invention to eliminate the need for architectures that rely upon nodes in communication with base stations.

It is yet another object of the present invention to arrive at an architecture wherein nodes communicate with their peers to cooperate and support connectivity.

It is still another object of the present invention to permit high capacity networks suitable for highly mobile and widely distributed multihop ad hoc networks.

It is a further object of the present invention to resolve a set of transmitters that can use a given channel simultaneously without interfering with each other.

It is yet another object of the present invention to establish a fully synchronous architecture of an ad hoc network where all nodes contend simultaneously and synchronously.

It is still another object of the present invention to resolve a set of dispersed nodes that can transmit simultaneously.

It is a further objective of the present invention to permit various metrics to be used simultaneously with each being selected based on network or traffic requirements.

It is yet another object of the present invention to reduce overhead in an ad hoc network by reducing the frequency of updates for nodes that are spatially distant.

It is still another object of the present invention to guaranty quality of service to a channel of communication when multiple hops are required.

It is a further object of the present invention to permit packets to cross a network with the minimum energy required.

It is yet another object of the present invention to insure all nodes have fair access to a single wireless channel.

It is still another object of the present invention to coordinate the use of spread spectrum codes in ad hoc networks.

It is a further object of the present invention to coordinate the use of orthogonal channels in a common ad hoc network.

It is yet another object of the present invention to enable multiple sources to each transmit multiple different packets to different destinations simultaneously.

It is still another object of the present invention to provide a mechanism for nodes to reserve the periodic use of the wireless channel.

It is a further object of the present invention to coordinate the use of low energy transceiver states at wireless nodes.

It is yet another object of the present invention to identify node connectivity using node states.

It is still another object of the present invention to calculate link metrics using node states.

It is a further object of the present invention to coordinate the use of directional antennas.

It is yet another object of the present invention to enable the reservation of resources to guaranty bandwidth for communications across multiple hop connections.

It is still another object of the present invention to enable the reservation of resources to guaranty a maximum length of delay for communications to traverse across multiple hop connections.

It is a further object of the present invention to permit packets to cross a network without traversing nodes that are using low energy states.

It is yet another object of the present invention to permit packets to cross a network in a manner that prolongs the life of the network.

It is still another object of the present invention to provide a mechanism that enables an agent to remotely engineer traffic in the network.

These and other objects of the present invention will be apparent from a review of the specification herein.

The present invention encompasses a pair of protocols called Synchronous Collision Resolution (SCR) and Node State Routing (NSR). SCR is a novel access protocol that achieves high capacity collision free access using a signaling approach that creates a random cellular-like network after each signaling period. NSR is a novel routing protocol that uses the dissemination of node states to predict link availability and to assign metrics to those links for the creation of optimized routes. Both are perfectly suited for highly mobile and widely distributed multihop ad hoc networks.

Through the novel features of the access and routing protocols, Synchronous Collision Resolution (SCR) and Node State Routing (NSR) of the present invention, one can manage the use of most known energy conserving approaches and without sacrificing performance. The energy conservation mechanisms of the MAC layer are fully integrated into the algorithms of the routing protocol. Meanwhile, the routing protocol independently implements the conservation mechanisms that are managed exclusively at its level.

The QoS routing technique of the present invention, integrates the use of the access protocol, SCR, and the routing protocol, NSR of the present invention. The access protocol provides a specific mechanism that enables the reservation of links that simultaneously prevents hidden nodes and identifies which orthogonal channels to use. The routing protocol can then use this mechanism to build multihop routes that can meet both bandwidth and delay constraints.

One characteristic common to most protocols is to infer link availability from their past availability. The node state routing (NSR) of the present invention is based on nodal as opposed to the traditional link states. In NSR, links are inferred from node state information that is disseminated throughout the network. Further Synchronous Collision Resolution (SCR) bases access on spatial randomness rather than temporal randomness. As a result, the access protocol of the present invention enables periodic reservation of resources. The present invention integrates the capabilities of NSR and SCR to provide multihop stream-based connections. These connections can be used for various quality of service objectives to include providing bandwidth and delay guarantees. Further the connections of an ad hoc network using the present invention exploits these connections and other long range connections for load balancing. These connections are abstracted within NSR's "wormhole" routing construct as more fully set forth below. Using this construct, well placed wormholes can greatly improve the performance of the routing protocol.

BRIEF DESCRIPTION OF THE DRAWING FIGURES

FIGS. 2A and 2B illustrate the effect of the signaling protocol.

FIGS. 4A and 4B illustrate the signaling process using both continuous and discrete signals.

FIGS. 17A-17E illustrate the effects of synchronization discrepancies, propagation delays, and transceiver state transition times on the sizing of signaling and interframe slots.

FIG. 19 illustrates an example set of node states and a corresponding example set of wormhole states.

FIGS. 25A and 25B illustrate probability and cumulative distributions of separation distances between signaling survivors and their nearest surviving neighbors comparing the performance of different sets of signaling parameters.

FIGS. 26A and 26B illustrate probability and cumulative distributions of separation distances between signaling survivors and their nearest surviving neighbors comparing the performance of different sets of signaling parameters at different contending node densities.

FIGS. 27A and 27B illustrate the spatial throughput and spatial capacity of SCR for different network densities, loads, and processing gains.

FIGS. 28A-28C illustrate simulation results of the performance of this invention in a network with density $\sigma_A=5$, where all nodes move at a rate of 0.00001 of the transmission range per transmission slot, and new packets are created at nodes at a spatial rate of $\lambda_A=0.05$.

FIGS. 29A-29C illustrate simulation results of the performance of this invention in a network with density $\sigma_A=5$, where all nodes move at a rate of 0.00005 of the transmission range per transmission slot, and new packets are created at nodes at a spatial rate of $\lambda_A=0.05$.

FIGS. 30A-30C illustrate simulation results of the performance of this invention in a network with density $\sigma_A=10$, where all nodes move at a rate of 0.00001 of the transmission range per transmission slot, and new packets are created at nodes at a spatial rate of $\lambda_A=0.05$.

FIGS. 33A-33C illustrate the comparison of performance of networks with and without wormholes for common scenarios of the mobile nodes.

FIG. 40 illustrates some home applications of ad hoc networking.

DETAILED DESCRIPTION OF THE PREFERRED EMBODIMENT

Figure 1:
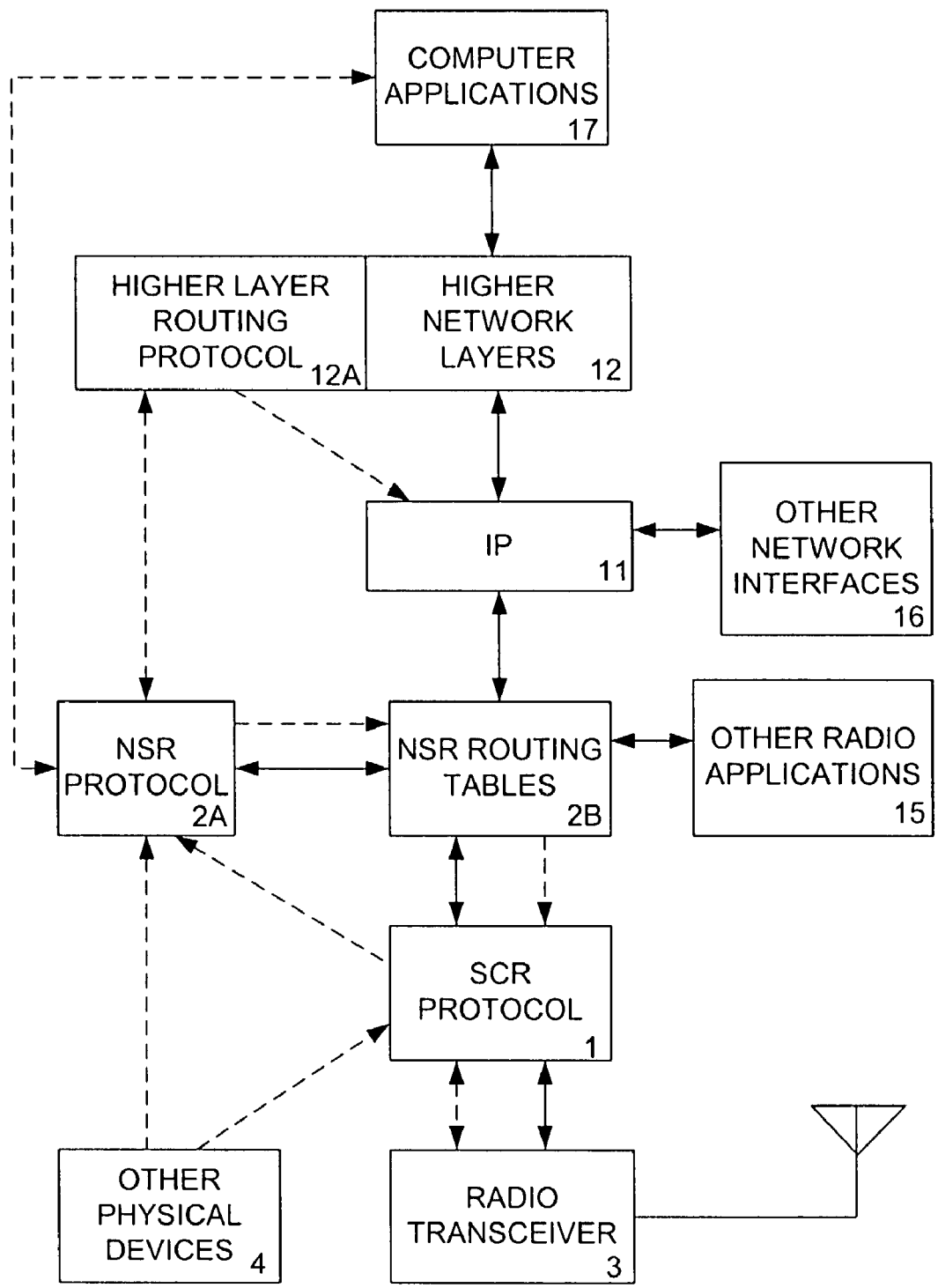
FIG. 1 illustrates the interconnectivity of the invention with other node devices and processes.

FIG. 1 illustrates the interconnectivity of the invention and other node devices and processes. The SCR protocol (or "SCR MAC") 1, the NSR protocol 2A, and the NSR routing tables 2B embody aspects of the invention. The SCR protocol 1 manages access to the radio channel through the radio transceiver 3. The SCR protocol 1 attempts to gain access whenever a packet is forwarded to it from the NSR routing tables 2b. Signaling and payload packets that are forwarded to the radio transceiver 3 are then immediately transmitted. The SCR protocol 1 directs the transceiver settings, e.g. channel, spread spectrum code, etc. that the radio transceiver 3 uses through an information link (shown in broken line). In the reverse, the radio transceiver 3 receives packets on the wireless channel and forwards them to the SCR protocol 1. Measurements of the quality of the signal are provided by the radio transceiver 3 to the SCR protocol 1 through an information link (shown in broken line). It is important for the SCR protocol 1 to have precise timing so that it can function effectively. Timing information is provided by other physical devices 4 or may be provided by the radio transceiver 3.

The NSR protocol 2A contains a table of states of nodes and wormholes in the network, creates "this" node's state, manages the dissemination of node states from "this" node, and calculates all routing tables. It obtains information about "this node's state from the SCR protocol 1, from other physical devices 4, from the computer applications 17 and from the higher layer routing protocols 12A. The NSR protocol 2A manages the dissemination of node state packets. It creates each node state packet and forwards it to the NSR routing table 2B. Similarly, it receives node state packets that have been received on the wireless channel from the NSR routing table 2B. On a periodic basis, the NSR protocol 2A calculates routing tables and provides them to the NSR routing tables 2B through an information link (shown in broken line). It also provides this information to the higher layer routing protocol 12A.

The NSR routing tables 2B perform the packet queuing and routing function. When a packet arrives at the NSR routing tables 2B, it determines if it needs to be transmitted on the radio channel or if it needs to be forwarded to another radio application 15, the IP layer 11 of the node's protocol stack, or, in the case of node state packets, to the NSR protocol 2A. Packets that need to be sent to the radio transceiver 3 are queued and then forwarded to the SCR protocol 1 on a transmission slot-by-transmission slot basis. The NSR routing tables 2B encapsulate these packets with the next hop routing information.

The invention may operate as a stand-alone protocol for some radio applications 15 or it may operate as the link layer protocol beneath IP 11. IP 11 retains its routing and forwarding function, however, its routing tables are provided by another higher layer routing protocol 12A. When a packet arrives from a higher network layer 12 it is routed to one of it interfaces amongst which is the wireless interface whose access is managed by this invention. The IP layer 11 may be connected to multiple interfaces. One interface is this invention. Other interfaces 16 may be any other type of interface to include other wireless interfaces that support a different subnetwork.

Other radio applications 15 may be specialized multimedia devices such as microphones, video cameras, or any other media device that is not normally connected directly to IP 11. Both mobile and fixed nodes may interface with such specialized multimedia devices. A node may also be embodied as an integral part of an appliance or device. A given node may be permanently located, serving as a network infrastructure and having connections to other networks including the Internet. On the other hand, most or the entire network may be formed by mobile nodes embodied, for example, as portable handheld devices and transceivers in vehicles with external antennas.

The computer applications 17 include, generally, the information systems at this node. These computer applications are likely to use the node state information collected by the NSR protocol 2A and, in return, may provide information that is included in "this" node's node state.

Higher network layers 12 represents all protocol layers that exist between the computer applications 17 and the IP protocol layer 11.

The present invention encompasses of a set of protocols, Synchronous Collision Resolution (SCR) and Node State Routing (NSR), and their interconnection with other protocols and devices that reside at individual nodes of a wireless communications network. FIG. 1 illustrates the logical placement of the SCR protocol 1 and NSR processes (2A, 2B) within the protocol stack and their interconnection with possible protocols and devices that may exists at those nodes. SCR and NSR exist to manage access to a single wireless access channel and to manage the routing of packets amongst the nodes that share that channel such that all nodes are logically connected. It is an object of SCR and NSR to take full advantage of the physical characteristics of the radio channel and to control the transmission parameters of the radio transceiver 3 to enhance the effectiveness of the access mechanism.

Packets intended for other nodes that share the wireless channel arrive from higher layers 11, 15 at the NSR routing tables 2B. The next hop for the packet is selected from the appropriate routing table and the packet is forwarded to the SCR protocol 1 with this information. SCR protocol 1 then schedules the access attempt for the packet, either immediately, after some number of queued packets, or for some specific scheduled transmission time. At the appropriate time, the SCR protocol 1 then attempts to gain access to the wireless channel. When the SCR protocol 1 is successful at gaining access, the packet is forwarded to the radio transceiver 3 and transmitted. Packets arriving at the radio transceiver 3 from the wireless medium are forwarded to the SCR protocol 1, which immediately forwards the packet to the NSR routing tables 2B. If the packet is intended for an application at the node it is forwarded up the protocol stack to that application. If it is intended for another node in the network, either it is forwarded back down the stack with the appropriate next hop as described above or it is routed to the IP layer 11 for forwarding on another interface 16.

Access to the wireless medium is managed by the SCR protocol 1. All nodes that have traffic to send attempt to gain access at the same time. The SCR protocol 1 uses a signaling mechanism to resolve a subset of these nodes to actually send packets. FIGS. 2A and 2B illustrate the results. In FIG. 2A, a dense array of nodes with packets to send 19 is illustrated. The signaling portion of SCR thins this set of nodes to a subset of nodes 20 that are separated from each other, as illustrated in FIG. 2B. Many nodes 20B do not survive the signaling because they are determined to be insufficiently separated. SCR and NSR work together using both the selection of next hops and any of the controllable parameters of the physical layer to make the subsequent exchange of packets successful.

All nodes on the wireless channel use the NSR protocol to understand the topology of the network. The NSR protocol collects relevant physical and logical states of the parent node and disseminates these to the NSR protocol layer of other nodes in the network. The NSR protocol at each node then uses the set of states it has received from all the nodes in the network to estimate connectivity and to calculate preferred routes. These routes are embodied in the NSR routing tables 2B, shown in FIG. 1.

Synchronous Collision Resolution

Figure 3:
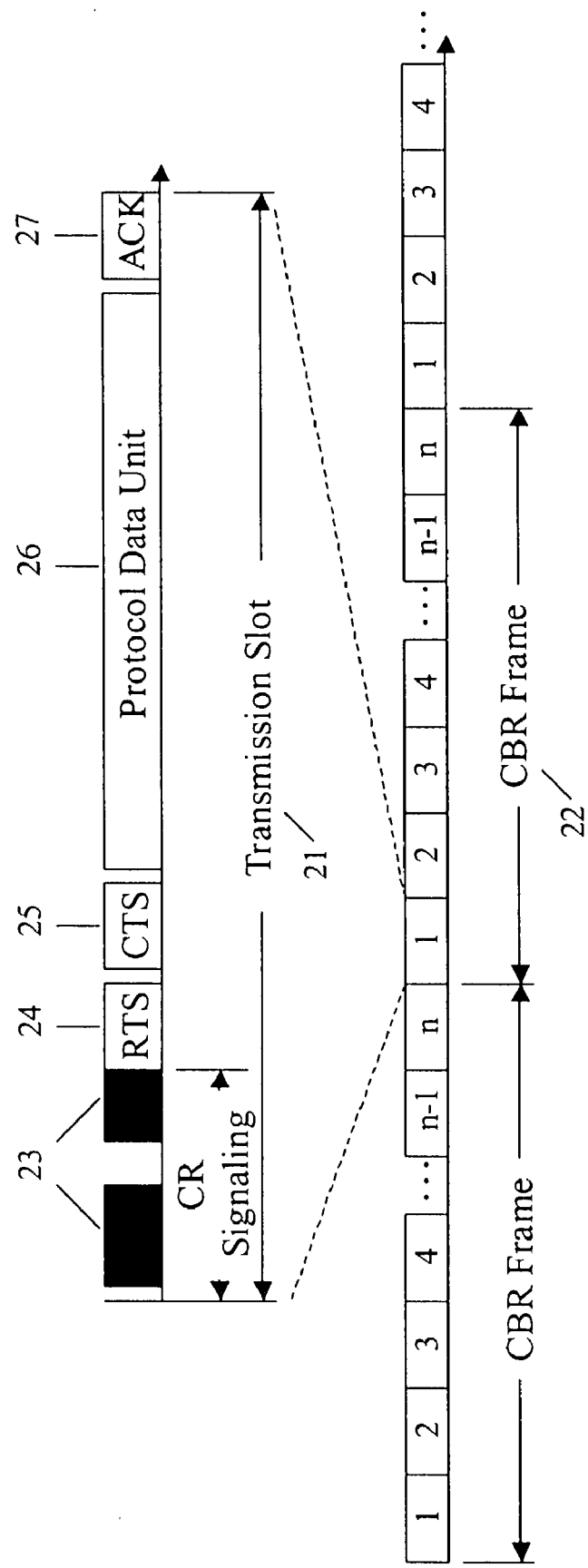
FIG. 3 illustrates the temporal organization of the wireless channel.

FIG. 3 illustrates the organization and operation of SCR. SCR divides the access channel into a series of transmission slots 21 and further logically groups these slots into repeated frames that are called constant bit rate (CBR) frames 22. Rather than using a temporally random access mechanism, SCR requires all nodes to contend simultaneously and synchronously. SCR then uses a signaling protocol 23 similar to that used by HIPERLAN followed by a Request to Send (RTS) 24-Clear to Send (CTS) 25 handshake similar to that used in 802.11. Applying collision resolution signaling 23 in a synchronous manner provides several opportunities. The signaling itself allows the contending nodes to fairly resolve a set of dispersed nodes that can transmit simultaneously. One may visualize the signaling as a mechanism to resolve all potential sources to a smaller set that are spatially distributed to form a random cellular network as is illustrated in FIG. 2. The RTS 24-CTS 25 handshake that follows insures that there are no hidden node collisions in the data transmission. A contending node that receives a valid CTS response to its RTS then transmits a protocol data unit (PDU) 26. A node that successfully receives the PDU responds with an acknowledgment (ACK) 27. If the node sending the PDU receives a valid ACK then it considers the exchange successful, otherwise it reschedules the PDU for a subsequent transmission slot.

Two concepts that are important to distinguish in this description are that of the transmission slot 21 and the signaling slot. The transmission slots occur at a regular interval and accommodate the transmission of a single packet. At the beginning of each transmission slot 21 is a signaling period 23 used to determine which nodes get access to the channel. This signaling period 23 is also slotted. These slots are referred to as signaling slots. FIG. 3 shows the relation of the signaling slots to the transmission slots 21. FIGS. 4A and 4B show the organization of the signaling slots into three different signaling phases 32, 33, 35.

Collision Resolution Signaling

Collision resolution signaling uses signaling to select a single node to transmit data among multiple contenders when all nodes are within range of each other. The present invention uses multiple signaling phases to achieve this effect. One implementation comprises three signaling phases and two access signals and is illustrated in FIG. 4A. The first signal 31 starts at some point in the first (priority) phase 32 and ends in the second (elimination) phase 33. The second access signal 34 starts at some time within the third (yield) phase 35 and ends at the phase's end when a node starts to transmit a RTS. A node wins the contention by being among the first to start transmitting in the first phase, among the last to stop transmitting in the second phase and the first to start transmitting in the third phase. Nodes that recognize that they have lost the contention in any one of the phases will defer from attempting to gain access. An equivalent process can be implemented using discrete pulsed signals as illustrated in FIG. 4B. One pulse 37 corresponds to the start of the first signal 31 and another pulse 38 corresponds to the end of the first signal 31. A pulse 39 corresponds to the start of the second signal 34.

The signals used for these signaling phases need only be detectable. It is possible to enhance the functionality of signaling by modulating information into the signaling. One modulation method is tone multiplexing. In tone multiplexing signals may be sent on different frequencies and nodes may alter their response based on the frequencies they sense. This invention can exploit this capability to enhance the capacity of the network.

The three phases in the example implementation of the present invention are referred to as: priority, elimination, and yield phases. Each phase consists of an integer number of signaling slots that are denoted by h, l, and m respectively. A node with a packet to transmit will choose to start transmitting in one of the priority phase slots in the following manner. For each of the first h-1 slots, if a node has not sensed another node's access signal, it will chose to start its own transmission with probability 1-r. The quantity "r" is defined as the listening probability. If the node has not started to transmit prior to the $h^{th}$ slot and it has not sensed another node's access signal, it will start in the last slot with probability 1. Nodes that successfully start transmitting an access signal continue throughout the priority phase and into the elimination phase. The same technique is used for selecting a slot to end the access signal. A node stops transmitting in any of the first l-1 slots of the second phase with probability 1-q or stops on the $l^{th}$ slot with probability 1. The quantity "q" is defined to as the transmission probability. After the contending node stops transmitting, it listens to the channel and will defer its contention if it hears another node still transmitting an access signal. A slot 36 is reserved at the end of the elimination phase in which no signaling takes place. This slot allows nodes that transmit through the last elimination phase slot to verify their survival. It is called a survival verification slot. Finally, if a node is still contending, it will repeat the process used in the priority phase on the m slots of the yield phase but using a listening probability of p.

The slots in which a single independent node transmits in the priority phase, B, stops transmitting in the elimination phase, C, and starts in the yield phase, D, are random variables with truncated geometric distributions as follows:

$$Pr(B=b) = \begin{cases} (1-r)r^{b-1} & 1 \le b < h \\ r^{h-1} & b = h \end{cases} \quad (1)$$

$$Pr(C=c) = \begin{cases} (1-q)q^{c-1} & 1 \le c < l \\ q^{l-1} & b = l \end{cases} \quad (2)$$

$$Pr(D=d) = \begin{cases} (1-p)p^{b-1} & 1 \le d < m \\ p^{m-1} & b = m \end{cases}.$$

When k nodes contend for access they interact by listening to each other during each phase and the number of contenders decreases with each phase. The number of nodes surviving each of the three phases are denoted by V, W, and X, whose distributions are given by:

$$Pr(V = v \mid k) = \binom{k}{v} \sum_{b=1}^{h} Pr(B=b)^v Pr(B>b)^{k-v} \quad 0 < v \le k; \quad (3)$$

$$Pr(W = w \mid V = v) = \binom{v}{w} \sum_{c=1}^{l} Pr(C=c)^w Pr(C<c)^{v-w} \quad 0 < w \le v;$$

$$Pr(X = x \mid W = w) = \binom{w}{x} \sum_{d=1}^{m} Pr(D=d)^x Pr(D>d)^{w-x} \quad 0 < x \le w.$$

The probability that only a single node survives when there are k contenders is by $$Pr(X = 1 \mid k) = \quad (4)$$

$$\sum_{v=1}^{k} \sum_{w=1}^{v} Pr(X = 1 \mid W = w) \cdot Pr(W = w \mid V = v) \cdot Pr(V = v \mid k).$$

The priority and yield phases of this implementation are examples of first to assert phases. Nodes survive these signaling phases by being the first to signal.

Figure 5:
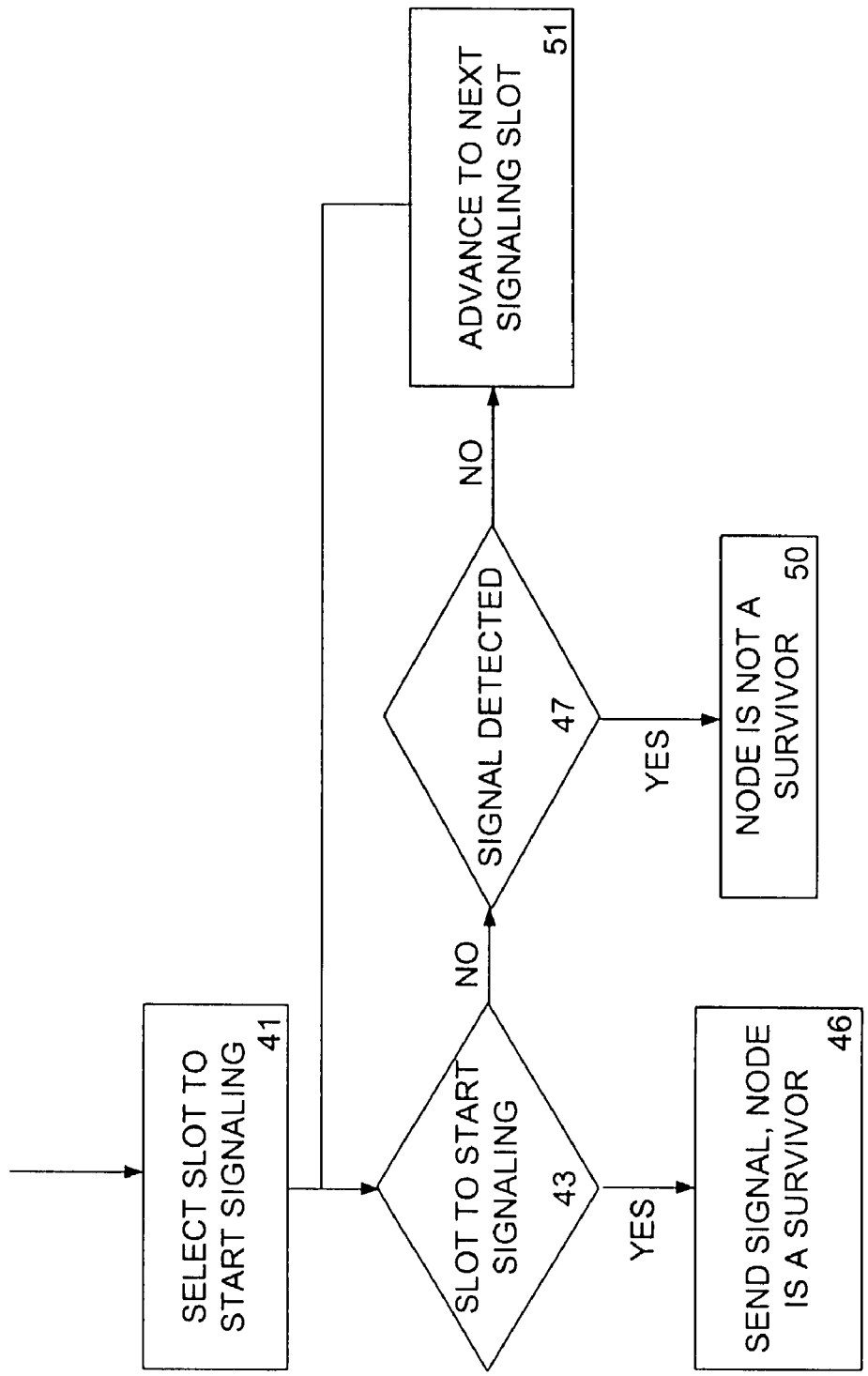
FIG. 5 is an illustrative flow chart of the first to assert signaling process.

FIG. 5 is an illustrative flow chart of the first to assert signaling process. The process starts by selecting 41 a slot in the first to assert signaling phase to start signaling. Then at the beginning of the first slot it inquires 43 if this is the slot that was selected to start signaling. If it is, it starts signaling 46 and the node is considered a survivor of the phase. If it is not, the node listens 47 in the slot for another node's signal. If a signal is detected then the node stops contending 50 and considers itself to have lost the contention. If no signal is detected it advances 51 to the next slot and repeats the slot checking process.

FIG. 5 is a flow chart of the first to assert phase. The elimination field is a last to assert phase. Nodes survive last to assert signaling phases by being the last to signal.

Figure 6:
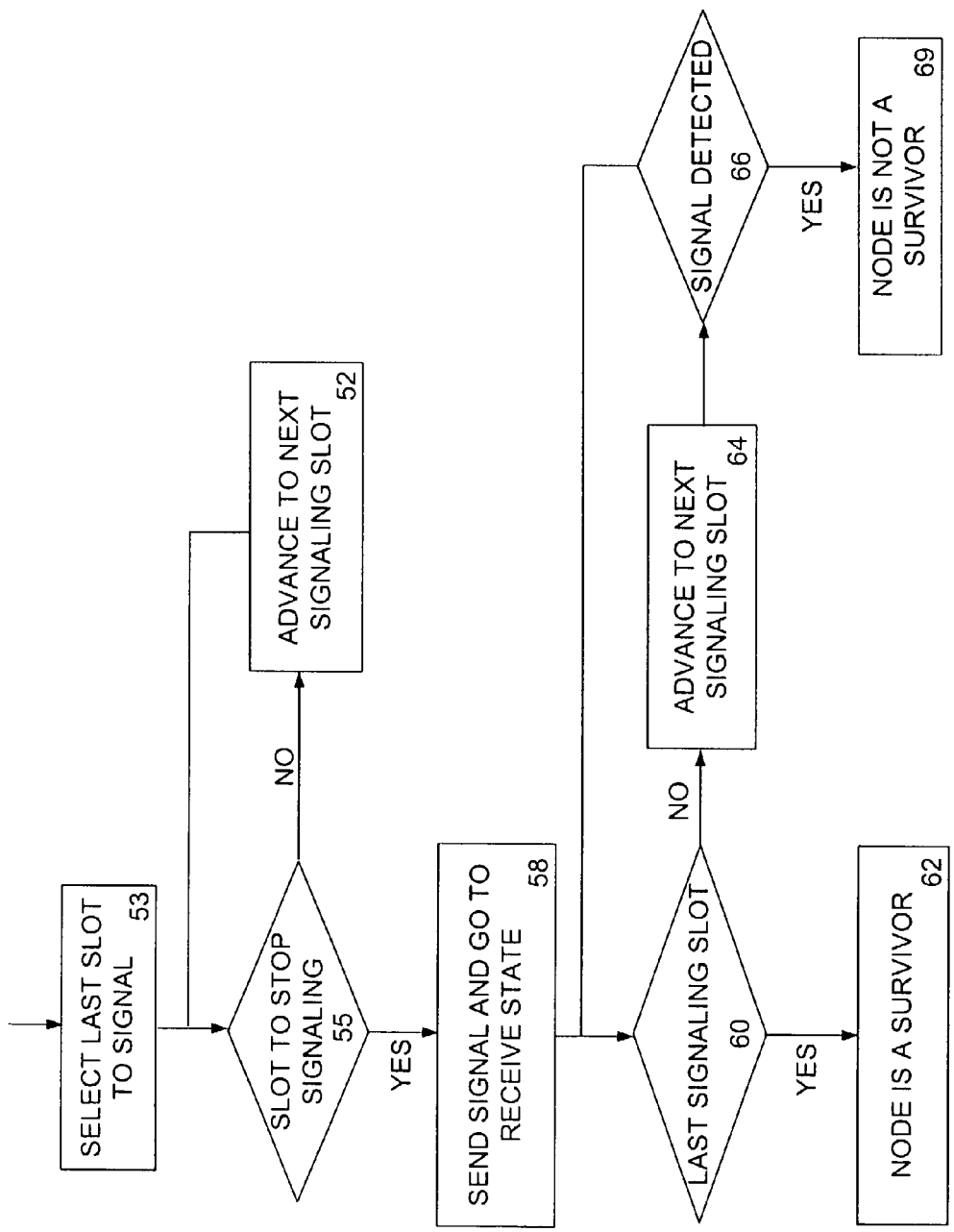
FIG. 6 is an illustrative flow chart of the last to assert signaling process.

FIG. 6 is an illustrative flow chart of the last to assert signaling process. The process starts by selecting 53 a slot in the last to assert signaling phase to stop signaling. Then at the beginning of first slot it inquires 55 if this is the slot that was selected to stop signaling. If not it advances 52 to the next signaling slot and repeats the query. If it is the slot to stop signaling it sends 58 this last signal and stops signaling at the end of the signaling slot. The node then inquires 60 if this last slot was the last signaling slot of the last to assert signaling phase. If it was the last slot, then the protocol advances 62 and the node considers itself a survivor of the signaling phase. If not, the process advances 64 to the next signaling slot and listens for a signal. At the conclusion of the slot, it inquires 66 if it detected a signal. If a signal is detected 69, it considers itself to have lost the contention. If a signal is not detected it returns 60 to the query that checks for the last signaling slot.

FIG. 6 is a flow chart of the last to assert phase. When continuous signals are used, last to assert signals follow first to assert signals. When discrete signals are used first to assert and last to assert signaling processes may be used in any order.

Figure 7:
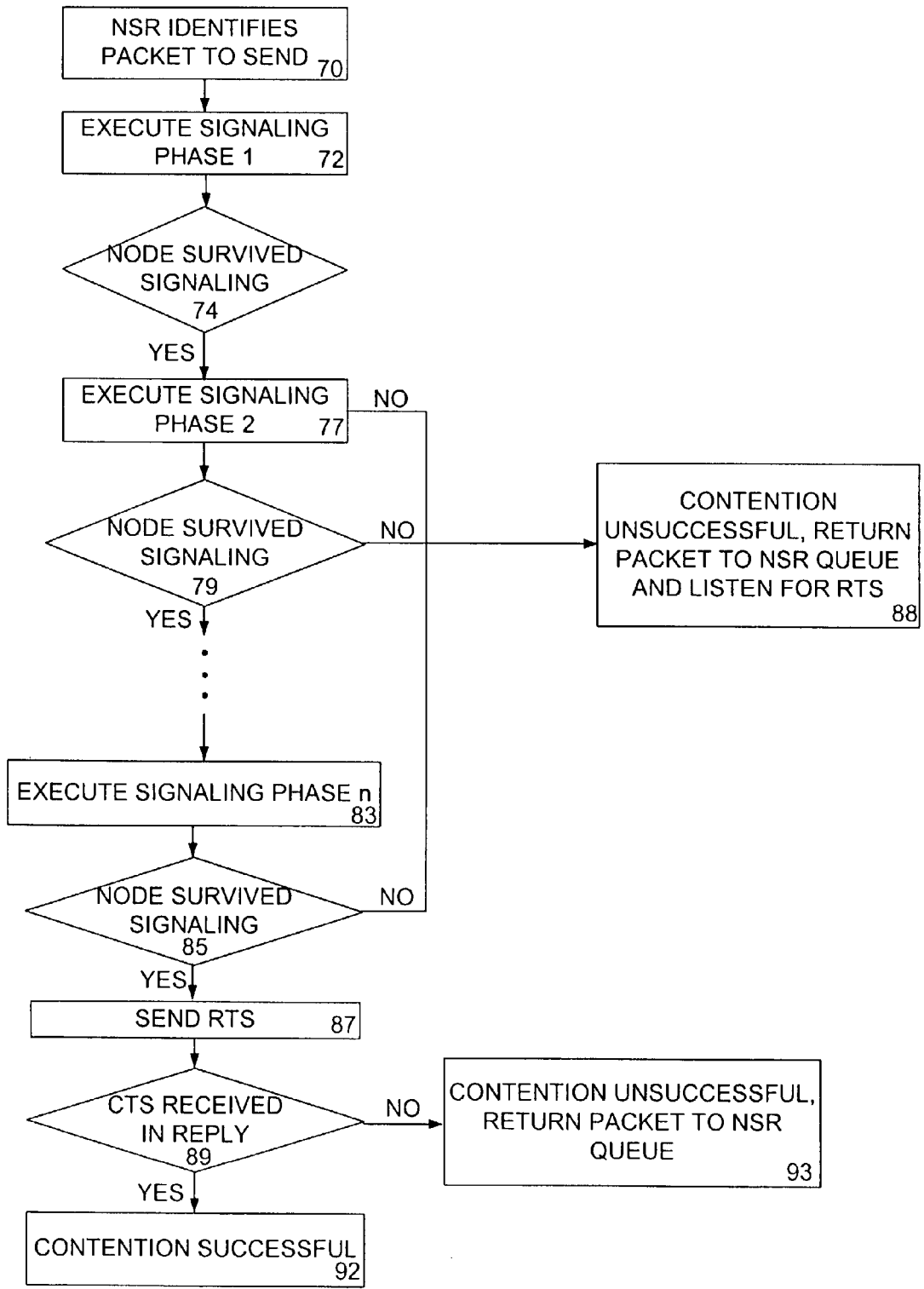
FIG. 7 is an illustrative flow chart of the generic signaling process.

FIG. 7 is an illustrative chart of the generic contention signaling process. The process starts 70 when a packet is forwarded to SCR by NSR, and with the node executing 72 the first signaling phase. This phase may be either a first to assert, FIG. 5, or last to assert, FIG. 6, signaling process. The process inquires if the node survived 74 the signaling phase. If it did not survive the signaling phase, the contention is considered unsuccessful 88, the packet is returned to the NSR queue, and the node listens for an RTS. If it survives the signaling phase it advances 77 to the next signaling phase. This process repeats itself for each of the multiple cascaded signaling phases. The activities of second signaling phase execution 77 and nth signaling phase execution 83 are similar to those of first signaling phase execution 72. The activities of inquiring of node survival 79, 85 are similar to those of the inquiry of node survival 74 after execution of the first signaling phase, except the last inquiry of node survival 85 will advance (if the last signaling phase was survived) to sending 87 an RTS since the node has survived all the signaling phases. After sending 87 the RTS, the node listens 89 for a CTS and if a CTS is received in reply then the contention is considered successful 92. If a CTS is not received the contention is considered unsuccessful 93 and the packet is returned to the NSR queue.

FIG. 7 is a flow chart of the generic contention resolution signaling process. When different sequences of signaling phases are used an equation similar to 4 can be formed for the survival probability by nesting equations of a type similar to equation 3 where the slot selection probabilities are dictated by equations of type 1 and 2 for first to assert and last to assert signaling phases respectively. Discrete signaling has an advantage over continuous signaling since it requires fewer slots for the same results. The last slot of a first to assert phase is implied. A contending node that chooses the last slot to signal and has not heard another node signal during the first to assert phase does not signal and survives the phase. The first slot of a last to assert signaling phase is implied. A contending node that chooses the first slot to stop signaling simply does not signal. This node survives signaling if no other node signals in the last to assert phase.

Selecting the Signaling Parameters

Six parameters may be selected in the design of the collision resolution signaling when the three phases of FIG. 4 are used. They are the number of slots in the priority, elimination, and yield phases, h, l, and m respectively and the corresponding listening and transmitting probabilities, r, q, and p respectively. The tradeoff in the design is that more slots are more effective at insuring just a single node survives in a contention but results in more of the bandwidth of the channel being lost to overhead. The listening and transmitting probabilities should be selected based on the number of slots used for the signaling.

Figure 8A:
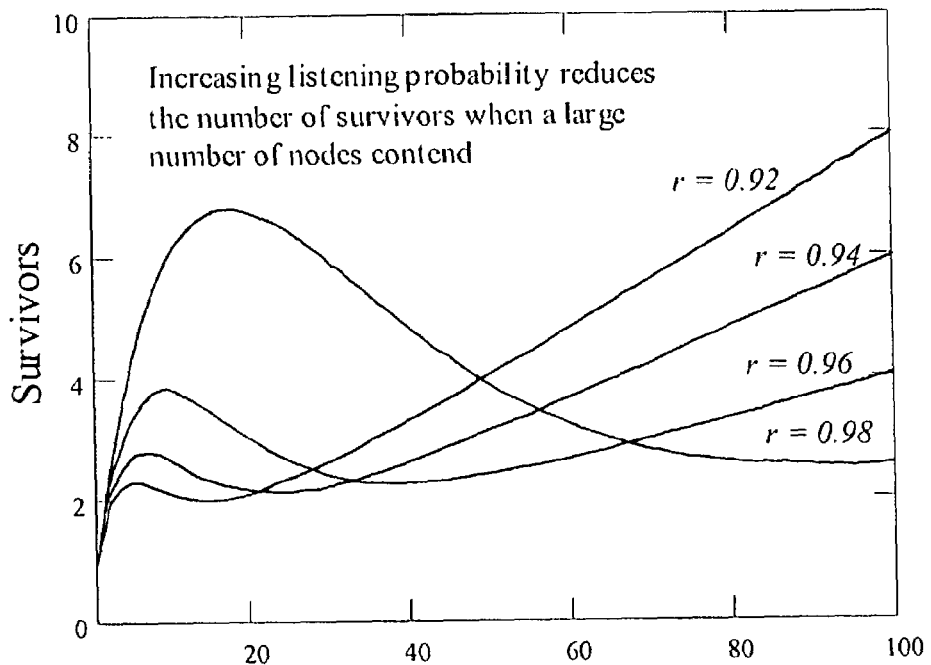
FIGS. 8A and 8B illustrate the effect of signaling parameters in first to assert signaling phases on the contending node survival rate.
Figure 8B:
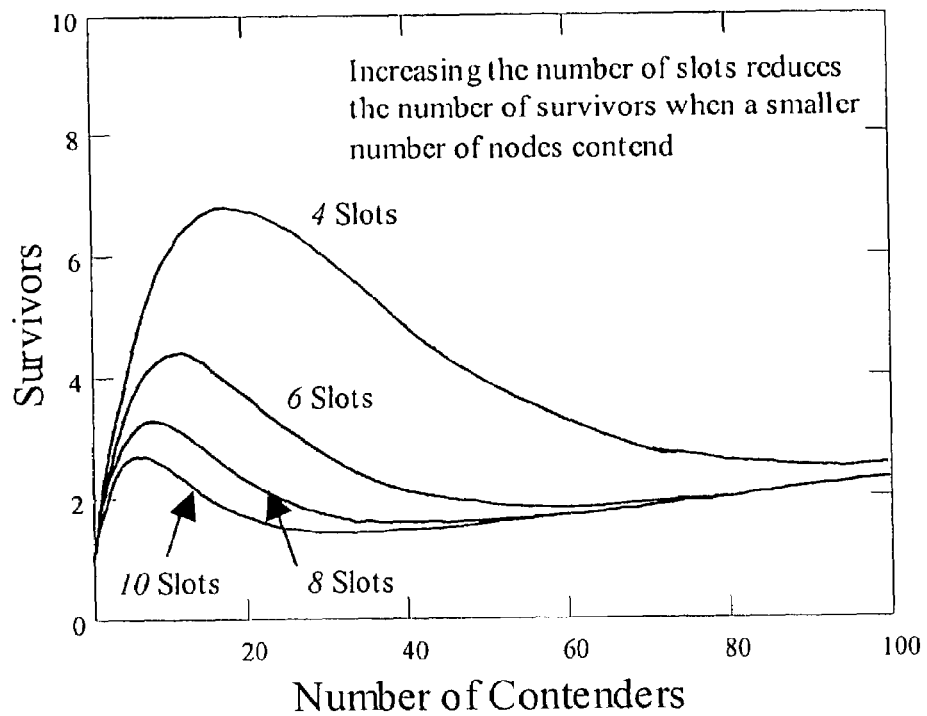
Figure 9:
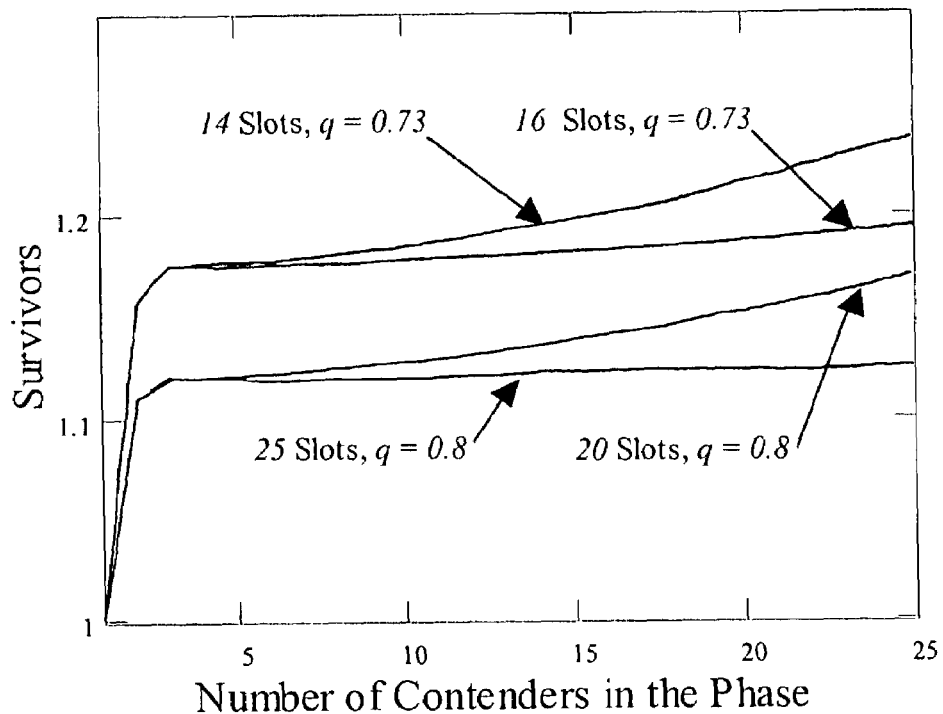
FIG. 9 illustrates the effect of signaling parameters in last to assert signaling phases on the contending node survival rate.

The signaling phases are classified in two types, "first to assert" or "last to assert." In first to assert phases the goal is for a small number of nodes to assert themselves first thus excluding the remaining nodes. In last to assert phases the goal is to gracefully allow nodes to stop transmitting such that there are a small number of survivors in the end. The characteristic performance of the two types of phases are illustrated in FIGS. 8A, 8B, and 9. The issue is how the number of contenders, the listening or transmission probability, and the number of slots affect the number of survivors of each phase. The first to assert and last to assert phases have different behavior. For a given set of parameters, i.e. number of slots and listening probability, first to assert phase survivor quantities have a relative maximum, followed by a relative minimum and then monotonically increase with the number of contenders. Increasing the listening probability while keeping the number of slots constant moves the relative minimum to when a larger number of nodes contend with the tradeoff of increasing the relative maximum. See FIG. 8A. For a given listening probability, increasing the number of slots reduces the relative maximum. See FIG. 8B.

In last to assert phases, the survivor quantity increases monotonically; however, it has a region where the performance is nearly flat. Increasing the transmission probability reduces the initial survivor quantity at the expense of reducing the range of the flat region. Increasing the number of slots extends the flat region. See FIG. 9.

The goal of using multiple signaling phases is to use the initial phases to thin out the contenders and then to use the final phase to isolate a single winner. Thinning out can be accomplished using just a few signaling slots in the first phase. Note that in FIG. 8A that four slots and a listening probability of 0.96 will result in an expected number of survivors that varies by just 2 for a range of 4 to 100 nodes contending. The intermediate phases then seek a low survivor quantity for the expected range of survivors from the priority phase. In the end, the final phase uses a large number of slots and a high listening probability to isolate just one node. The effectiveness of collision resolution signaling can always be improved by adding more slots to any of the phases. Also for any number of slots used, the transmission and listening probabilities can be chosen either for consistent success rates for a wide range of contending nodes or to aggressively seek higher success rates at the expense of less consistency.

Figure 10:
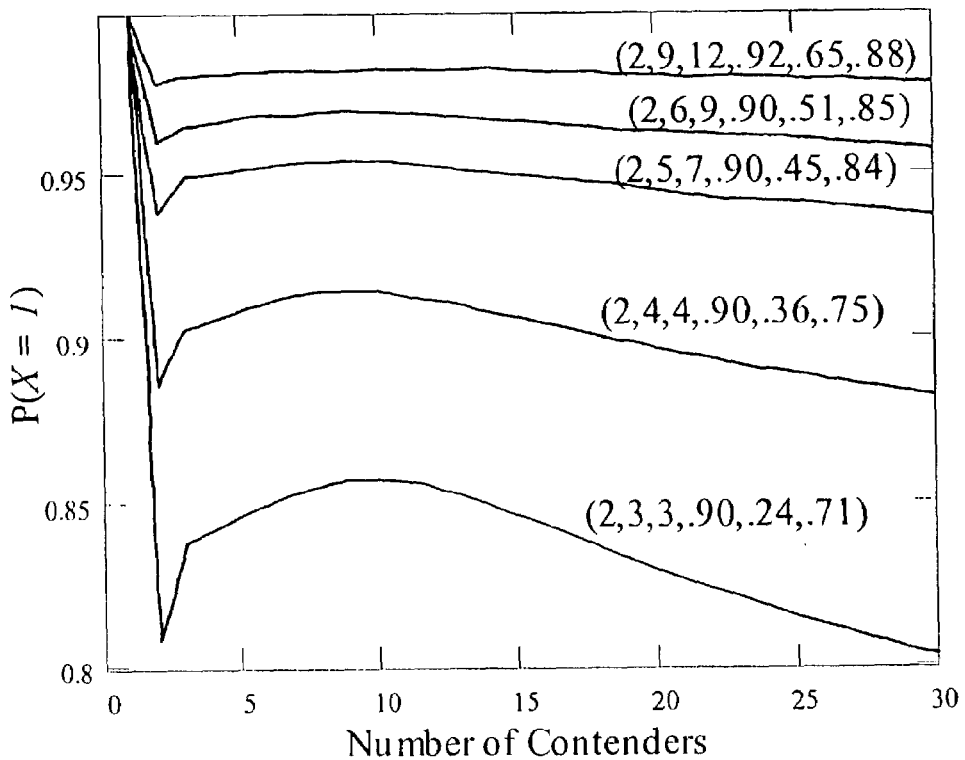
FIG. 10 illustrates the effect of different sets of signaling parameters and different numbers of contending nodes on the probability that just one node survives.

FIG. 10 plots the results of equation 4 for several sets of signaling parameters. With am few as 8 signaling slots the signaling can result in a single contention winner more than 80% of the time. These results extend to the set of nodes that are not within range of each other and represent the probability that a surviving node is the sole survivor within its transmission range. The more interesting result of the signaling protocol is the resolution of a subset of contending nodes that are separated from each other as illustrated in FIG. 2. These characteristics are demonstrated later in the examples section.

RTS-CTS Exchanges

SCR tackles the hidden node problem by using an exchange of RTS 24 and CTS 25, but the underlying principle is different. Indeed, rather than relying on the timing of RTS-CTS exchanges to suppress other contending nodes, the protocol relies on collision resolution signaling to suppress other contenders. RTSs and then CTSs in SCR are transmitted simultaneously to test whether current capture conditions will support successful reception of subsequent packets in an environment with hidden nodes. Subject to the following assumptions, one can show that this approach prevents collisions while enabling efficient use of capture to promote spatial reuse.

Assumption 1: RTS packets are transmitted simultaneously.
Assumption 2: CTS packets are transmitted simultaneously.
Assumption 3: The network uses fixed sized data packets and fixed sized intervals between RTS 24, CTS 25, data packet 26, and acknowledgement 27 transmissions, so packets 26 and acknowledgements 27 are transmitted simultaneously.
Assumption 4: A node will never transmit data using a higher power than it uses in transmitting the RTS 24 or the CTS 25.
Assumption 5: Channel characteristics remain constant throughout the transmission slot.

Proof of Theorem

THEOREM: Under the above assumptions SCR prevents all collisions during data transmission.

Source nodes transmit packets if there is a successful RTS-CTS handshake. Since RTS 24 and CTS 25 transmissions are sent simultaneously, so too are packets and acknowledgements. Collisions cannot occur between acknowledgements and data packets. A destination's successful reception of an RTS 24 transmission from a source indicates it will also successfully receive a data packet transmitted from that source. A source's successful reception of a CTS 25 from a destination indicates that it will also successfully receive an acknowledgement from that destination. Therefore, a successful RTS-CTS handshake indicates that the subsequent data packet 26 and acknowledgement 27 transmissions will not fail on account of collisions.

The RTS-CTS handshake, by option, may be revised for broadcasted packets. Broadcast packets are packets that are transmitted from one node to all destinations within its range. A node that is broadcasting a packet cannot distinguish multiple CTS packets 25 from these destinations so it cannot use the receipt of a CTS 25 to verify that any particular destination has received its RTS 24. Therefore, a node with a PDU 26 to broadcast will transmit it despite the results of the RTS-CTS handshake. Destination nodes that receive an RTS 24 for a broadcast packet may optionally respond with a CTS 25. This option is a network wide choice that will depend on other network options that are selected. The choice of this option is based on whether the suppression characteristics of the multiple CTSs being transmitted simultaneously are desirable.

Hidden Node Blocks

Figure 11:
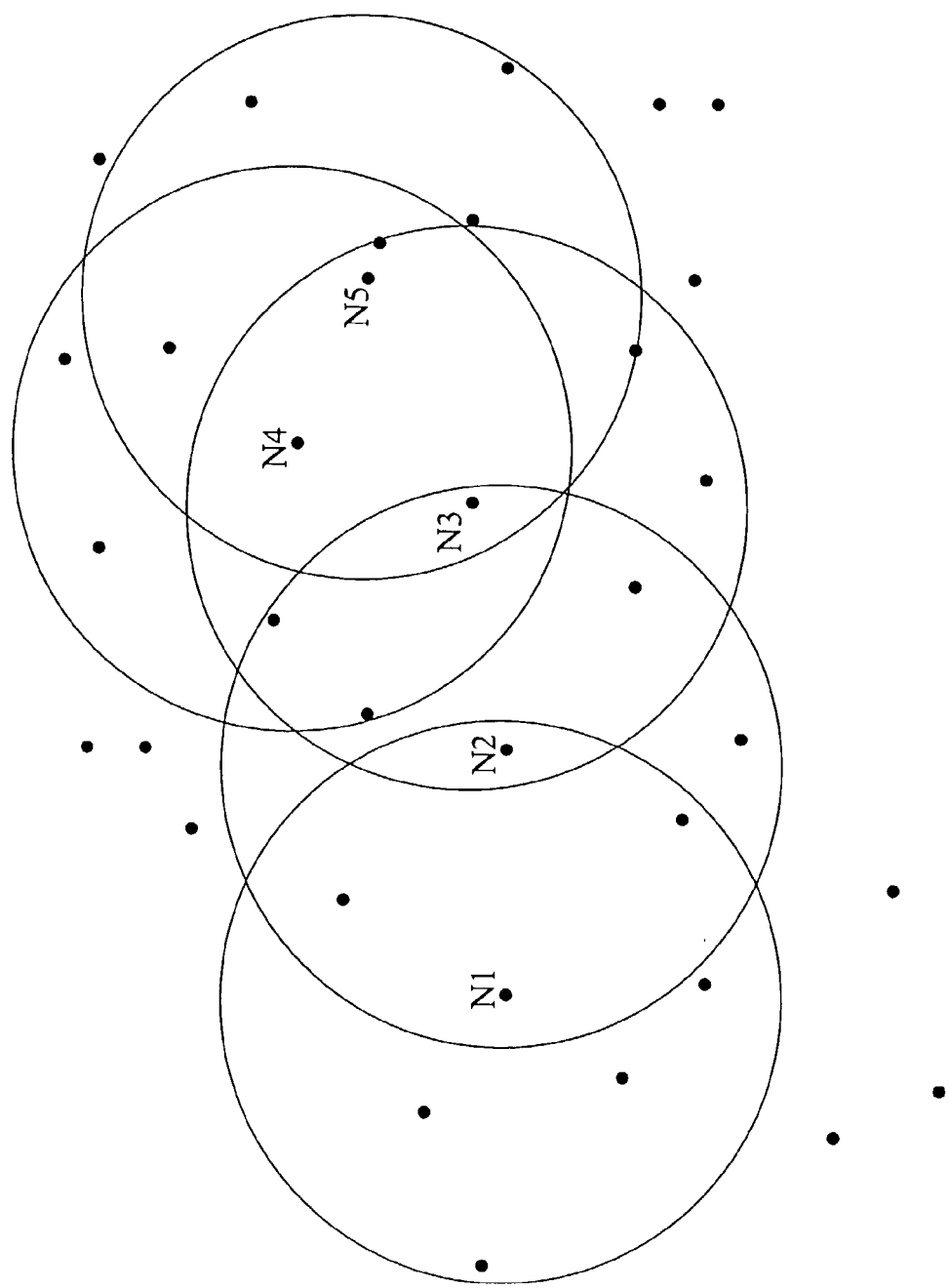
FIG. 11 illustrates an example scenario of contending nodes where blocking may occur.

Low node densities and low loads in SCR networks can cause an adverse condition called hidden node blocking. This occurs when nodes out of range of each other attempt to gain access to the same destination and there are no other nodes within range of these that are also contending. As a result, the nodes survive signaling but block each other at the destination. As an example, refer to FIG. 11. Each dot represents a node and the circles are the transmission ranges of nodes N1 through N5. Consider what would happen if nodes N1 and N3 are the only nodes contending and their packets are both intended for N2. Their signaling would not interact with any other nodes and both would gain access but their transmissions would interfere with each other at N2 and block each other. This would continue slot after slot since there is no backoff mechanism. Now consider what would happen if N4 and N5 started to contend. Their signaling could suppress N3 thus allowing N1 to successfully exchange data with N2. N2 could then exchange its packet in a subsequent slot. The blocking problem is most prevalent in low density and low load networks.

A fix to this problem is to increase the range of the signaling mechanism in anticipation that it will interact with the other nodes forming the block. A node that senses it is being blocked can simultaneously increase the transmission power it uses in signaling while decreasing the threshold level it uses to detect a signal. The success of this technique is dependent on whether signaling is bidirectional. If all nodes involved in the block implement this procedure then at some point they should have bidirectional interaction. The effectiveness of this method is limited by the transmission power.

A second fix to this problem is to introduce a signal echoing procedure. Nodes that are not contending or have lost the contention, echo the yield phase signal starting the first slot after they hear the signal themselves. The effectiveness of this procedure at breaking blocks is dependent on the number of slots and the listening probabilities used in the yield signaling phase and is modeled by the equation $$Pr(X = 1 \mid W = w) = w \sum_{d=3}^{m} Pr(D = d)(Pr(D > d + 1)^{w-1}.$$

Selecting Parameters to Break Hidden Node Blocks

Figure 12:
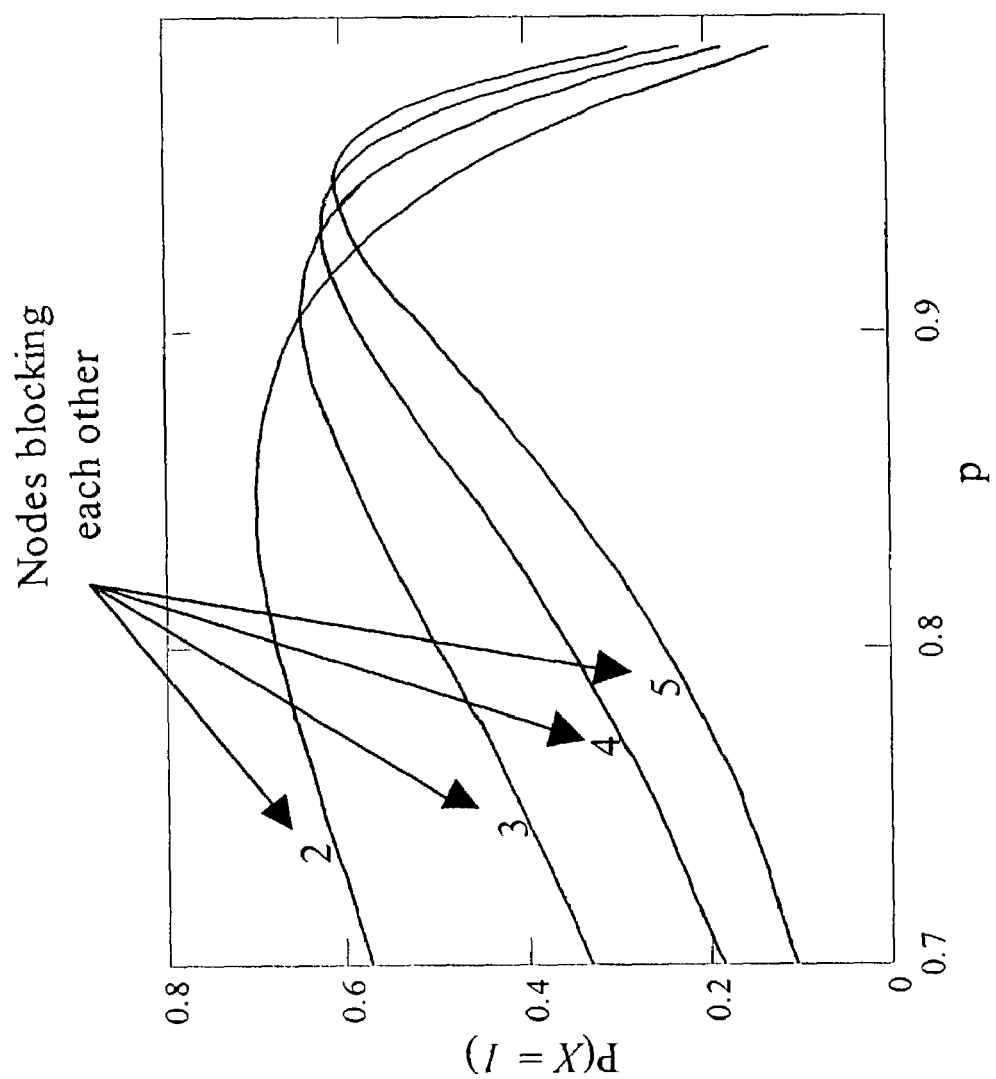
FIG. 12 illustrates the probability that signal echoing will break a block for different numbers of blocked nodes as a function of listening probability.

FIG. 12 illustrates the effect of different listening probabilities on the ability of signal echoing in a 9 slot yield phase to break a block for 2 to 5 nodes forming the block. As illustrated, there is an optimum listening probability for each quantity of nodes that form a block. The optimum occurs at a lower probability when there are fewer nodes blocking each other. The optimum for when two nodes block each other was the same or very close to the listening probability resolved to when choosing parameters for consistent access performance. Since the event of more than two nodes blocking each other will be rare, it is recommend to select the listening probability of the yield phase to optimize the effectiveness of signal echoing to resolve two nodes blocking each other. Table 1 lists the results of selecting parameters for the yield phase by this recommendation and the corresponding block breaking probabilities.

TABLE 1

Echoing success probabilities at breaking hidden node blocks

| Yield Phase Signaling Parameters | | Block Breaking Probabilities Nodes Blocking Each Other | | | |
|---|---|---|---|---|---|
| M | p | 2 | 3 | 4 | 5 |
| 12 | .88 | .76 | .66 | .55 | .46 |
| 11 | .87 | .74 | .64 | .52 | .43 |
| 10 | .86 | .72 | .61 | .50 | .40 |
| 9 | .85 | .70 | .59 | .47 | .37 |
| 8 | .84 | .67 | .56 | .44 | .34 |
| 7 | .82 | .64 | .52 | .40 | .31 |
| 6 | .81 | .59 | .48 | .36 | .27 |
| 5 | .79 | .53 | .43 | .32 | .22 |
| 4 | .75 | .44 | .34 | .23 | .16 |
| 3 | .71 | .29 | .22 | .15 | .09 |

Implementing signal echoing all the time can adversely affect capacity, as it will suppress many exchanges that could be successful. For example, in FIG. 11, N2 could echo N1's signal, followed by N3 echoing N2's signal resulting in the suppression of both N4 and N5 from gaining access. If all nodes in range of N1 echoed N1's signal many more contentions may be suppressed. Signal echoing should be reserved for networks where block detection is possible. Block detection will depend largely on the capabilities of the physical layer. The condition for assuming a block is occurring is detecting a strong but unintelligible signal. This condition would trigger the use of echoing for some number of transmission slots that follow.

Additional Services

Figure 13:
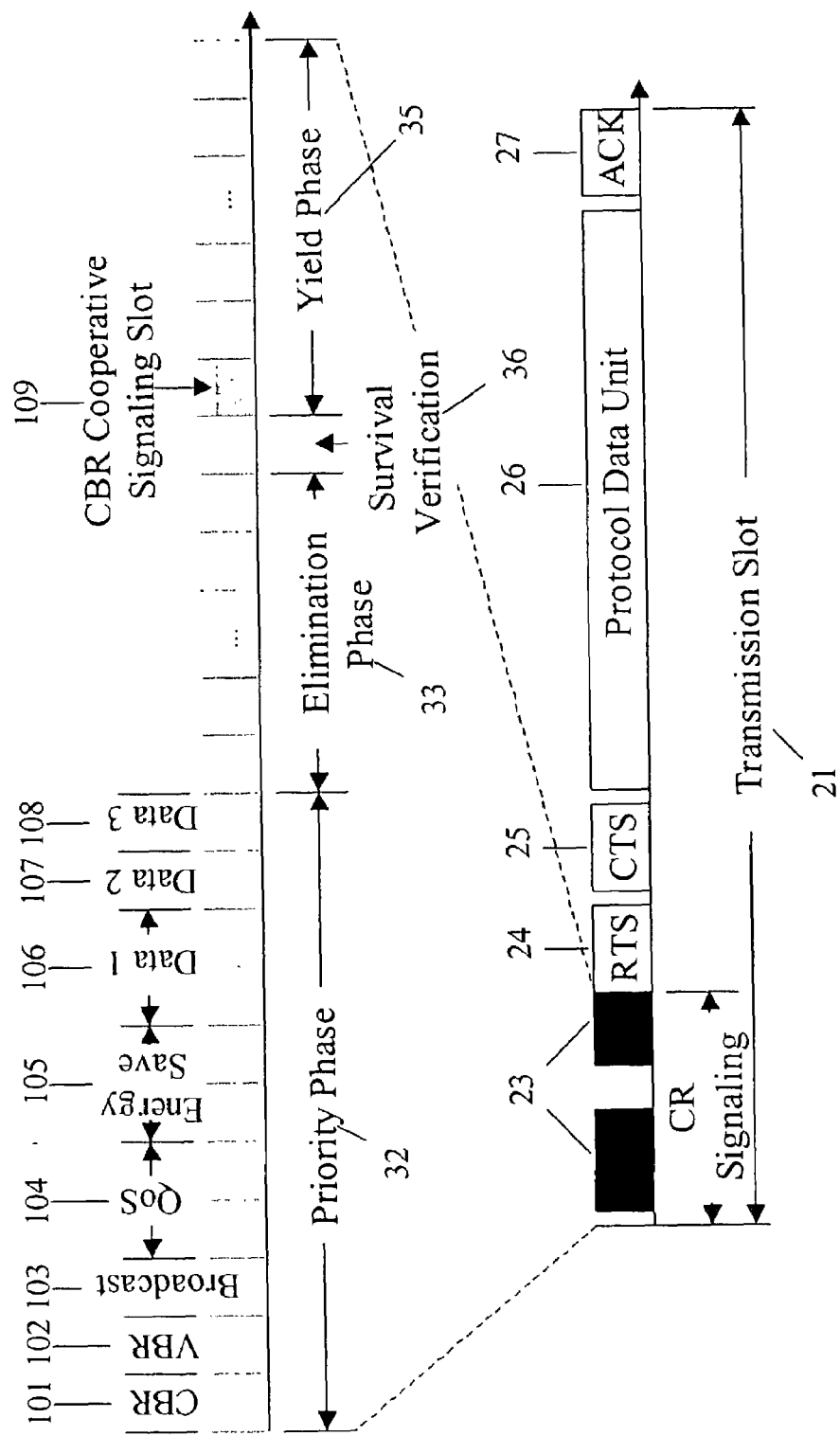
FIG. 13 illustrates an example signaling design to support SCR's special services.

The signaling mechanism can be modified to provide additional services. These modifications can be used selectively depending on the application of the network and the capabilities of the physical layer. FIG. 13 illustrates an example of all the services integrated together.

Quality of Service (QoS)

The priority phase may be used to distinguish QoS. Since signaling first in the priority phase gives precedence in gaining access, QoS is provided by managing which slots nodes can use in the priority phase. So to provide QoS the priority phase is divided into priority groupings 101, 102, 103, 104, 105, 106, 107, 108. A node that is contending to send traffic chooses the group that corresponds to the QoS required for the packet it is trying to send. If its packet requires a higher QoS than any other packet at any other node within its range then it is assured of gaining access. If other nodes within range use a higher priority group for access then it will not gain access, and if other nodes use the same priority group then access will be determined by the rest of the signaling. Each priority group may consist of 1 or multiple slots. If multiple slots are used then the contending nodes using that priority group will select the slot to start its signal using the same method described earlier. Since the optimum listening and transmission probabilities are sensitive to the number of slots used in each phase, different probabilities may be associated with each priority group. The number of groups and selection of priority is application specific and can be based on a packet's time to live parameter or be based on the operational function of the packet.

For example, in FIG. 13 the data priority groups, 106, 107, 108, are all for best effort peer-to-peer packets but distinguish priority based on time to live. Packets with shorter time to live get higher priority. FIG. 13 also illustrates an operational distinction. A packet that is broadcast to all neighbors has a higher priority group 103 than other best effort packets 105, 106, 107, 108. Operational distinction may also be based on the network application. For example, in a military network, a warning message of an enemy aircraft attack may take precedence over a routine e-mail message.

The use of priority groups can be leveraged to provide services in addition to QoS based on priority of access as described above. These include the ability to reserve resources, support real time traffic transmission, manage the use of orthogonal channels, and conserve energy.

Reserving Resources and Supporting Real Time Traffic

The traffic management objectives of the present invention are to enable the reliable transmission of stream based traffic, both constant bit rate (CBR) and the more bursty variable bit rate (VBR) traffic. These goals are achieved using periodic frames, a priority access scheme, and a specialized signaling mechanism. FIGS. 3 and 13 illustrate their organization. The periodic frame is called a Constant Bit Rate (CBR) frame 22 since it is repeated at a rate that allows a single transmission slot in each frame to support the lowest desired CBR rate. A node can achieve a higher CBR rate by using more than one transmission slot per frame.

Three groups of signaling slots are associated with stream based services. A node first contends for such services using the QoS priority group. If the node is successful it can then assert priority in gaining access to the same transmission slot in the next CBR frame using the CBR signaling slot 101. Since a node can only use a CBR signaling slot 101 if it had accessed the same transmission slot in the previous frame it is assured that it is the only node in its transmission area that can contend with this signaling slot. In this manner a source node can effectively reserve a specific slot in each CBR frame 22. Depending on the bandwidth required, this source node can repeat the process and reserve additional transmission slots in the CBR frame 22.

The present invention also assumes that a VBR stream can be serviced with a combination of a CBR stream and a variable number of additional transmission slots that respond to the bursty nature of the stream. Therefore, nodes requiring VBR service first contend and reserve transmission slots 21 in the same manner as the CBR streams and then use the VBR signaling slot 102 to access transmission slots to send the bursty overflow. The right to use the VBR signaling slot 102 is reserved to those nodes that already have CBR access within the frame.

A source node can only reserve a transmission slot in its transmission range, thus there is a risk that a contender outside a source's transmission range but within that of the destination may interfere. To assure both source and destination priority in CBR contentions a mechanism that allows the destination to also clear contenders from the area within its range is provided. A destination node recognizes when it is the recipient of CBR traffic, i.e. it knows that the CBR signaling slot was used to gain access and that it was the destination of the traffic sent in the same transmission slot 21 of the previous CBR frame 22. Under these conditions the destination also participates in the signaling protocol. Starting with the CBR cooperative signaling slot 109 of the yield phase both the source and destination transmit an assertion signal. Since only CBR traffic can use this signaling slot 109, the CBR traffic receives priority over all other contentions. The destination, however, stops transmitting the signal early so that it can transition to receive the RTS 24 from the source at the usual time in the protocol. The rest of the exchanges in the transmission slot 21 are the same.

The mechanism for reserving resource described above will result in fewer exchanges per area than the standard access method. However, the predictability of source-destination association offers the opportunity to pull this traffic entirely off the base channel. Nodes that have established a CBR association may use different tones in signaling. As a result, their signaling will not affect their neighbors and neither will their packet exchanges since they occur on a different channel. When the unique tones are no longer used in signaling, the nodes may immediately participate in the normal signaling process. The technique of pulling CBR traffic to a different channel will allow the CBR reservation mechanism to be used as a method to enhance capacity. Additionally, depending on the orthogonality of CBR channel, the source-destination pair can exchange data without using the RTS/CTS handshake thus allowing a higher effective data rate for data exchange.

The channels that are available for CBR exchanges would be associated with particular tones. Since every node can detect the use of the tones, the node that establishes the CBR connection can identify the channels that are in use in the first transmission slot that it gains access. The tones in use are monitored in the CBR signaling slot that precedes the QoS signaling priority group that is used to gain this first access. As part of this first packet exchange the source node specifies the channel that is to be used for the CBR connection.

Coordinating the Use of Different Channels

A transmission to a destination is successful if it is captured by that destination. The ability to capture a signal is dependent on the ratio of the signal strength to the background noise level and to the interference from other transmitters. The deleterious effect of interference is reduced by using different channels for each source destination pair to exchange RTS packets 24, CTS packets 25, PDU packets 26, and ACK packets 27. A channel in this sense may be a different frequency, a different pseudo noise spreading sequence for a direct sequence spread spectrum (DSSS) system, a different hopping sequence for a frequency hopped system, or any other method to separate channels. Note that the signaling 23 continues to be done on a common channel since we want all nodes to form a single network and placing them on different channels permanently would partition the network. The challenge is to allow each node to know which channel to use at the conclusion of signaling. The present invention accomplishes this coordination through the use of receiver directed channels for point-to-point communications and a common code for all broadcasted packets. Each node selects its own receiver channel and disseminates that selection to all other nodes in the network. At the conclusion of signaling, surviving nodes 20 (refer to FIG. 2B) will use either the broadcast channel for a broadcasted packet or the receiver directed channel of the node to which it is trying to transfer a point-to-point packet. Non-survivors 20b (refer to FIG. 2B), are potential destinations and listen either on the broadcast channel or their own channel. The invention enables these non-survivors to distinguish which channel to use by identifying which priority signaling group is used to gain access. To distinguish between point-to-point and broadcast packets the invention adds a separate priority group for broadcasted packets 103. A node desiring to broadcast a packet must use the broadcast priority group 103 to gain access. A non-surviving node will listen for packets after signaling using the channel that corresponds to the highest priority group that the non-surviving node sensed being used in signaling. If the broadcast priority group 103 is used then the non-surviving node uses the broadcast channel, otherwise, it uses its own receiver directed channel. There is one exception to this rule, however. The invention also allows a broadcast channel to be used for constant bit rate (CBR) transmissions. A node desiring to broadcast CBR traffic will first use the broadcast priority group 103 to gain access and as described above will then use the CBR priority group 101 in the same transmission slot 21 of subsequent CBR frames 22. In all of these transmissions this node will use the broadcast channel to transmit the packets. So, non-surviving nodes must also listen on the broadcast channel if they sense the CBR priority group being used in a transmission slot 21 of a CBR frame 22 when it had received a broadcasted packet in the same slot of the immediately preceding frame.

A network may not provide enough channels for every node to have its own unique channel. Some nodes may have to share a channel. In such cases, channel selection proceeds as follows. Each node must disseminate the channel it has selected as well as the channels of all of its immediate neighbors, nodes it can hear. From these packets each node can identify all the channels being used by nodes up to two hops away. With this list of channels, a node may take several actions. If the channel this node has selected is not being used by any of its neighbors then it does nothing. If a neighbor is also using the channel, then the node attempts to select a channel that is not being used. It randomly selects a channel from the set of channels that are not being used, broadcasts this channel to its neighbors and then begins using it. If there are no channels that are not being used then the node randomly selects a channel from the entire list of channels, broadcasts this channel to its neighbors and then begins using it. Since this latter mechanism can cause a node to flood the channel with these types of broadcasted channel selection packets (the new channel is guaranteed to interfere with another node's selection), some sort of throttling mechanism should be implemented. This invention's method for disseminating these channels and throttling their transmission is presented later in the description of node state routing. Until a node broadcasts a channel change it will continue to use its previous channel selection.

Coordinating the Use of Multiple Transmitters

The effect of signaling is to physically separate sources so that no signaling survivors are potential destinations. It is possible that multiple packets will exist at a signaling survivor for each of several nodes in this region of no sources. It is then possible for the signaling survivor to transmit separate packets to several of these nodes using separate transmitters. The CR signaling would be performed using just one transmitter but then the transmission of each packet would be executed using separate transmitters, each on a separate receiver directed channel. The signaling transmitter would be considered the master and the remaining transmitters would be slaves. Once the signaling transmitter has identified that it has survived signaling, it would direct the remaining transmitters to continue in the remaining activities of the transmission slot.

Coordinating the Use of Directional Antennas

The use of directional antennas reduces the geographic footprint of electromagnetic radiation. Since the success of the 4-way handshake, RTS-CTS-PDU-ACK, is dependent on the interference conditions, directional antennas can improve capacity because they reduce the geographic area over which a transmission interferes. Directional antennas can be employed in all transmissions but generally they are not used in CR signaling.

The challenge in using directional antennas in ad hoc networks is knowing where to point them. As a part of this invention, to be described later, sources have an understanding of where their destinations are and can then use this information to point their antennas. Destinations can point their antennas once they learn who their sources are or they can point their antenna based on direction of arrival calculations of received signals. The method used to determine direction of arrival depends on the type of directional antenna. Directional antennas may be sectorized antennas, each associated with a separate transceiver or be formed using multi-element arrays. In the first case, a destination determines direction of arrival by measuring which transceiver receives the strongest signal. In the second case, the transceiver would determine the direction of arrival using a signal processing algorithm such as the Multiple Signal Classification (MUSIC) algorithm.

The sequence of events would occur as follows. Once a node has survived signaling it would transmit the RTS using its best estimate of the direction of the destination. The destination would receive this signal, make an estimate of the direction of arrival and then transmit its CTS to the source pointing its antenna toward the source. From this point forward, both source and destination may point their antennas toward each other. The use of directional antennas is not dependent on all nodes having directional antennas. Any use of directional antennas will enhance the performance of the protocol.

Energy Conservation

The present invention provides three methods to assist transceivers to use low energy states, default dozing, periodic dozing, and coordinated dozing. Each method is designed such that a node waking from the dozing state can quickly determine if it may return to the dozing state.

Default dozing can be executed every transmission slot 21. At the conclusion of the RTS-CTS exchange, every node in the network knows whether it will participate in a packet exchange. If a node is not participating in a packet exchange, it can enter a low energy state up until the beginning of the next transmission slot. This default method of dozing has no effect on any other performance aspect of the protocol. A flow chart of the default dozing process is depicted in FIG. 14.

Figure 14:
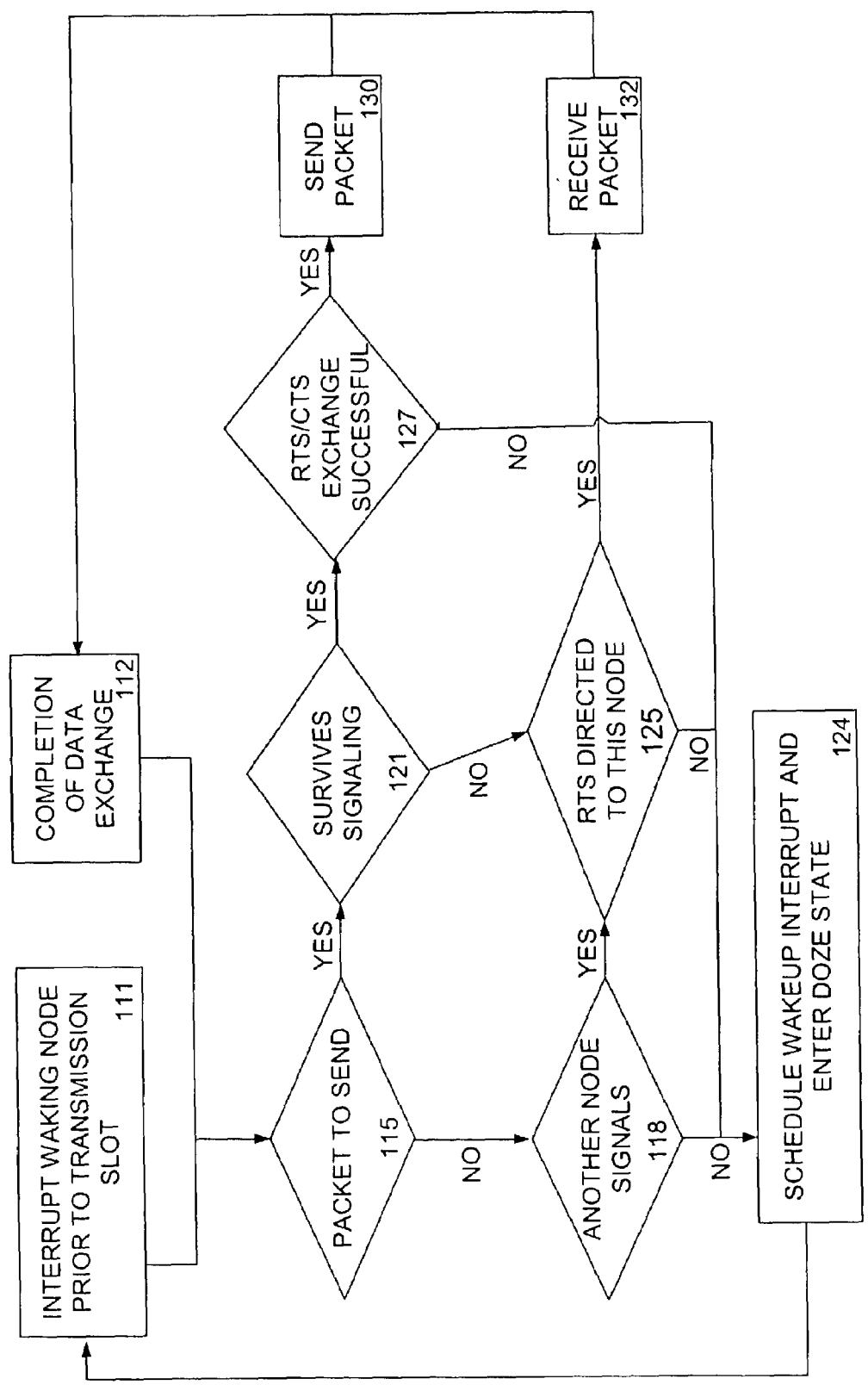
FIG. 14 is an illustrative flow chart of the default energy conservation process.

FIG. 14 is an illustrative flow chart of the default energy conservation process. The process begins just prior to a transmission slot when a node may have awakened 111 from a doze state or may have just completed 112 a data exchange. It enters the transmission slot querying if it should contend 115 to send a packet. If there is a packet to send then the node executes the contention resolution signaling portion of the contention process (refer to FIG. 7) and inquires 121 if the node survived the signaling. If it does not have a packet to send it then monitors 118 the channel to determine if another node signals. If this node does not survive signaling or if it has no packet and hears another node signaling it then listen and inquires 125 if an RTS is received. If the node is a contender and survives signaling 121 then it attempts to execute 127 the RTS/CTS handshake. If the handshake is successful then the node sends 130 a packet and repeats the process the next slot. If the node receives an RTS directed to itself 125 it responds with a CTS and receives 132 the subsequent packet, repeating this process after receiving this packet. If the node does not successfully execute an RTS/CTS handshake 127, failed to hear another node signaling 118, or did not receive an RTS directed to itself 125, it then schedules a wakeup interrupt and enters the doze state 124. The process repeats itself after the node wakes up 111 or after it participates in a data exchange 112.

In periodic dozing, nodes may enter a low energy state for a specified number of slots and then wake-up. It is intended for use in lightly loaded networks. A lightly loaded condition is easily detected by the absence of signaling in transmission slots. Nodes sensing low transmission rates may enter a low energy state. When the node wakes-up from dozing, it will remain awake so long as it senses signaling occurring in transmission slots. After if first senses a slot without signaling, an indication there is no traffic pending transmission in its vicinity, it returns to the doze state. This invention allows this type of dozing to use a network specific dozing period or a node selected dozing period. If the dozing period is node selected a mechanism must be in place with which the node disseminates its dozing period. A method of this type is provided in the node state routing protocol description of this invention. A flow chart of the periodic dozing process is depicted in FIG. 15.

Figure 15:
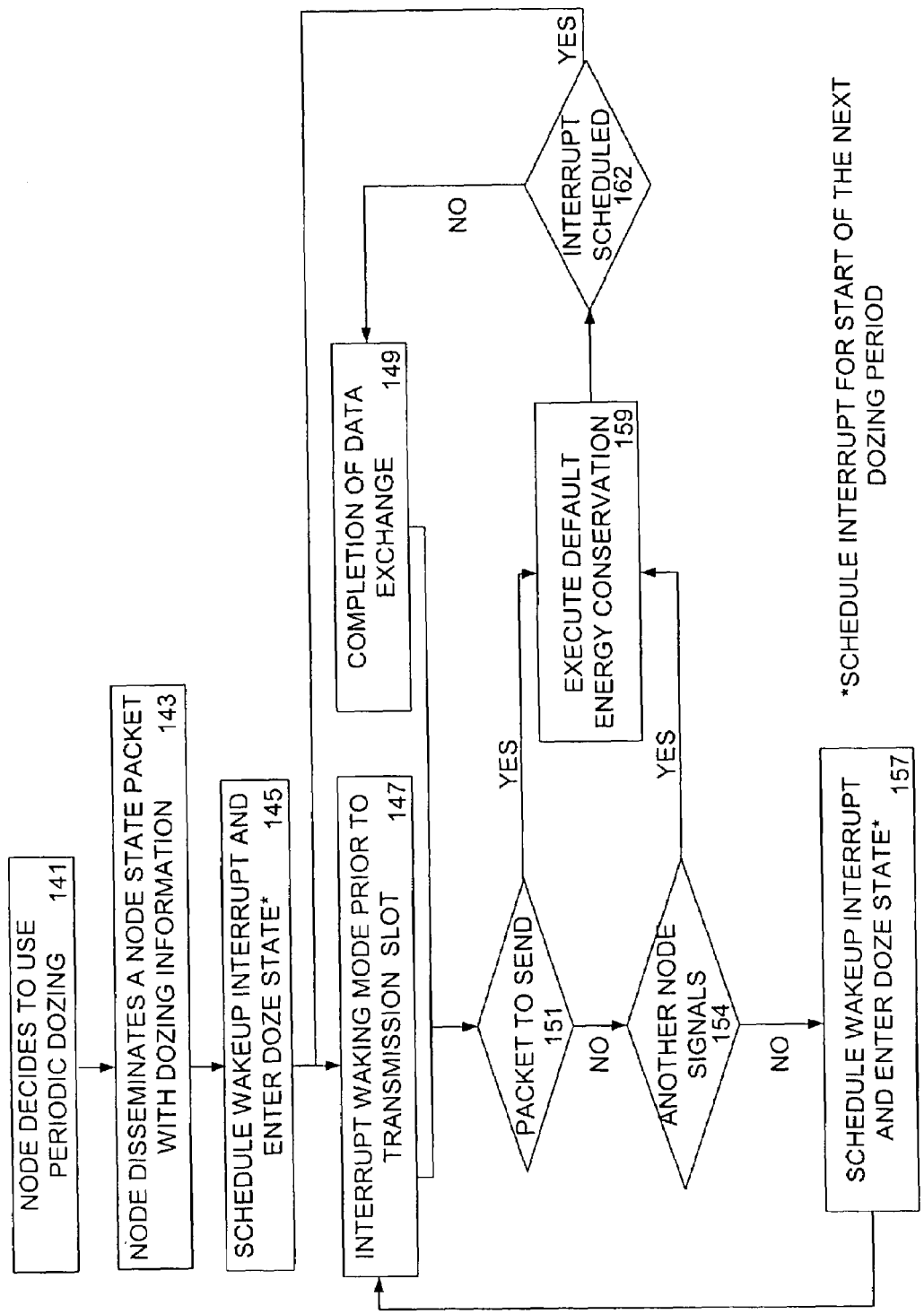
FIG. 15 is an illustrative flow chart of the periodic dozing energy conservation process.

FIG. 15 is an illustrative flow chart of the periodic dozing energy conservation process. The process begins when a node decides 141 to use periodic dozing. Before entering the doze state, the node sends 143 a node state packet that includes its dozing information. It then schedules a wakeup interrupt for the end of its dozing period and enters 145 the doze state. When the interrupt is executed, the node wakes up 147. The node then checks 151 to determine if it has a packet to send. If it does not, the node listens 154 to determine if another node is contending. If the node has a packet to send or if the node hears another node signaling, then it executes 159 the default energy conservation mechanism (refer to FIG. 14). The process inquires 162 whether the node scheduled a wakeup interrupt through the default energy conservation mechanism and if it did, it returns to a state of awaiting the interrupt wakeup. If it did not, it participates in a data exchange 149. If the node neither attempts to send a packet nor monitor's another node signaling then it schedules the periodic dozing interrupt for the beginning of the next period and enters 157 the doze state. Upon waking from this state, the node repeats the process of interrupting 147 the waking mode.

Coordinated dozing is a long term dozing period that may be executed in moderately loaded networks. A node will use this method if it senses that it is being used infrequently. Such a node will coordinate with a neighbor that agrees to collect its packets while it is dozing. The node broadcasts its dozing period and the address of the supporting node that has agreed to collect packets and then enters the dozing state. Nodes in the network have the choice to route packets to the supporting node or to a node in the vicinity of the dozing node. When the dozing node wakes up, it will remain awake so long as a priority group as high as the energy save priority group 105 is used to gain access to the channel (refer to FIG. 13). Nodes that have collected traffic for this node must use the energy save priority group 105 to forward best effort packets to the previously dozing node. The previously dozing node may then return to the dozing state as soon as it senses a priority group of lower priority, 106, 107, 108, than the energy save priority group 105 being used to gain access. A flow chart of the coordinated dozing process is depicted in FIG. 15.

The periodic and coordinated dozing processes are very similar. In the comparison of the processes shown in FIGS.

15 and 16, there are just two distinctions. In coordinated dozing the dozing node must first coordinate 171 with a p-supporter before dozing. Second, the two processes use different criteria to determine whether to remain awake. Periodic dozing uses the presence of any signaling as the indication 154 a node must remain awake. Coordinated dozing uses the priority of the signaling used in gaining access as the indication 184 of whether a node should remain awake. The most significant of these two differences is the requirement to coordinate the dozing process. Since dozing schedules must be disseminated before using either of these two dozing methods 143, 173, this requirement may be relaxed since all neighbors will have an explicit understanding of when the dozing node will next awake. The use of a p-supporter is an option that is included in an implementation of this invention if it will benefit the operation of the network.

Figure 16:
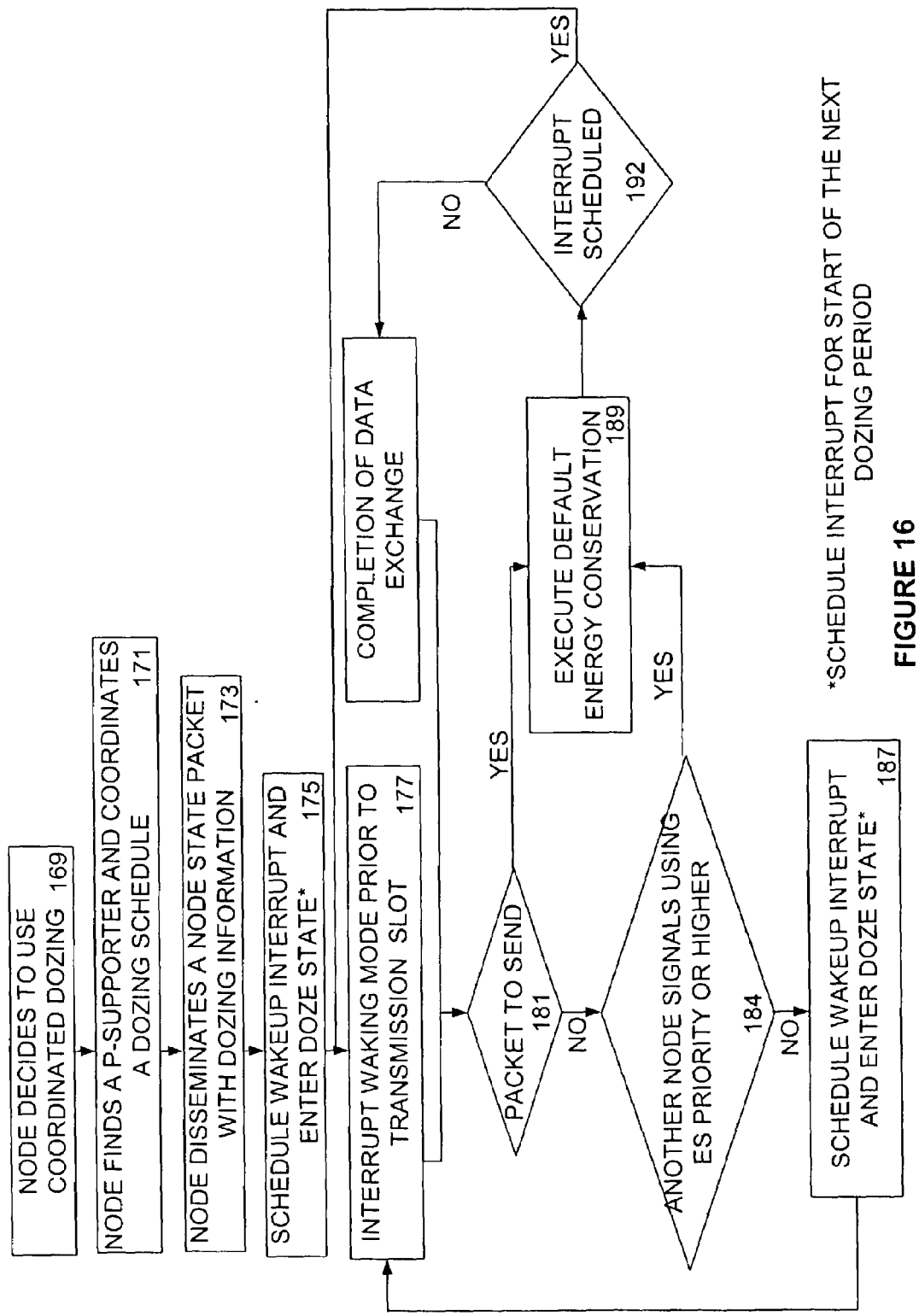
FIG. 16 is an illustrative flow chart of the coordinated dozing energy conservation process.

FIG. 16 is an illustrative flow chart of the coordinated dozing energy conservation process. The process begins when a node decides 169 to use coordinated dozing. Before entering the doze state, the node first identifies 171 a node that will serve as its p-supporter and then sends 173 a node state packet that includes its dozing information. (Identification of a p-supporter is an optional step.) It then schedules a wakeup interrupt for the end of its dozing period and enters 175 the doze state. When the interrupt is executed, the node wakes up 177. The node then checks to determine 181 if it has a packet to send. If it does not, the node listens to determine 184 if another node is contending with a ES priority or greater priority signaling slot. If the node has a packet to send or if the node hears another node signaling using a high enough priority, then it executes 189 the default energy conservation mechanism (refer to FIG. 14). The process inquires 192 whether the node scheduled a wakeup interrupt through the default energy conservation mechanism and if it did, it returns to the interrupt wakeup 177. If it did not, it participates in a data exchange 179. If the node neither attempts to send a packet nor monitor's another node signaling then it schedules 187 the periodic dozing interrupt for the beginning of the next period and enters the doze state. Upon waking form this state, the node repeats the process starting at interruption 177 of the doze mode.

Sizing of Signaling Slots and Interframe Spaces

Signaling slots and interframe spaces must be sized to account for variations in clock synchronization, propagation delays, transition times between receiving and transmitting and vice versa, and sensing time required to sense a signal is present. Table 2 below provides the design constraints and Table 3 provides design parameters for the selection of these slot sizes and interframe spaces.

TABLE 2

Timing constraints and results that affect signal slot size

| | |
|---|---|
| $\tau_p$ | Propagation delay between nodes displaced the maximum receiving distance from each other |
| $\tau_{rt}$ | Minimum time required by a transceiver to transition from the transmit to the receive state or vice versa |
| $\tau_{prt}$ | Minimum time to process a signal and then to transition from the receive to the transmit state |
| $\tau_{sy}$ | Maximum difference in the synchronization of two nodes |
| $\tau_{sm}$ | Minimum time to sense a signal in order to detect its presence |
| $\tau_{sn}$ | Time a node senses a signal in a particular slot as a result of constraints and chosen slot size |

TABLE 3

Design parameters

| | |
|---|---|
| $t_S$ | Duration of a slot |
| $t_{sf}$ | Selected minimum time to sense a signal in a first to assert slot to detect it. |
| $t_{sl}$ | Selected minimum time to sense a signal in a last to assert slot to detect it. |

FIGS. 17A-17E illustrate the relationship of these parameters. The choice of $t_S$ is constrained by the minimum time required to sense a signal to detect whether a signal is present, $t_{sf}$. In FIG. 17A, where the first to assert signal is sent late, $t_{sn}$ needs be longer than $\tau_{sf}$ in order for the signal to be correctly sensed. But in FIG. 17B, where the first to signal is sent early, it shows that if $\tau_{sn}$ is longer than $t_{sf}$ then there would be a false detection of the signal. From these two illustrations the following equations are derived for selecting the size of a first to assert signaling slot.

$$t_{sf} > \max(\tau_{sy} - (\tau_{rt} + \tau_p), \tau_{sm})$$

$$t_S > \tau_{sy} + \tau_{rt} + \tau_p + t_{sf}$$

By selecting a large $t_{sf}$ and $t_S$ one can account for differences in the synchronization of nodes. There is a similar result for the selection of the slot size of the last to assert phases. In FIG. 17C, where the a last to assert signal finishes late, $\tau_{sl}$ must be longer than $t_{sn}$ in order to avoid a false detection. In FIG. 17D, where the last to assert signal finishes early, $\tau_{sl}$ must be shorter than $t_{sn}$ in order to avoid a false detection. The following equations may be used to size the last to assert slots.

$$t_{sl} > \max(\tau_{sy} + \tau_p - \tau_{rt}, \tau_{sm})$$

$$t_S > \tau_{sy} + \tau_{sl} + \tau_{sl} - \tau_p$$

Again, by selecting a large $t_{sl}$ and $t_S$ one can account for differences in the synchronization of nodes. The result is that the last to assert slots can be shorter then the first to assert slots.

Finally, FIG. 17E may be used to size the interframe space between two packet transmissions. The next equation follows from the illustration.

$$t_S > \tau_{sy} + \tau_p + \tau_{prt}$$

From these results it is clear that the better the synchronization in the network the more efficient the protocol will be but that the failure to achieve perfect synchronization can be compensated for by allowing for larger slot times and detection periods.

Routing Introduction

The learning of the topology of ad hoc networks is created by routing protocols. Most approaches are based on the discovery of the existence of links. That is, protocols require nodes to send messages to identify connectivity. Each individual node uses the return messages to identify with which nodes it can communicate directly. To these nodes, it considers itself to have a link. The rest of the routing protocol is concerned with disseminating this view of link states and with the subsequent calculation of routes.

A disadvantage of this approach is that it requires commitment to a link metric and these metrics may have no relevance to the access mechanism nor take into consideration the myriad of physical characteristics of nodes.

In the case of SCR, several physical properties of other nodes are important to the SCR operation, most specifically each node's receiver directed channel. Similarly, multiple physical properties of nodes are useful to the routing problem such as location, energy conservation schedules, mobility, etc. The routing protocols consideration of these states contributes to the effectiveness of the access protocol.

Node states are also relevant to many of the applications that are envisioned for ad hoc networks such as situational awareness in military networks. FIG. 1 illustrates this relationship (note link between computer applications 17 and NSR protocol 2A). Due to node states being relevant to the access problem, the routing problem, and potentially to applications, the present invention builds a routing protocol upon the use of node states or node state routing (NSR). The combined use of NSR with SCR provides a synergistic effect that results in more services and better performance.

Node State Routing (NSR)

The node state routing protocol exists to manage the routing amongst nodes that share a common wireless channel. It is used in addition to the routing protocol that is used to manage IP routing 12A. NSR serves as a link discovery mechanism for this higher layer routing protocol 12A and informs the higher layer routing protocol 12A of those nodes to which it provides connectivity and provides an appropriate metric for these connections as required by the higher layer routing protocol 12A. The higher layer routing protocol is not involved in determining the routing connectivity amongst the wireless nodes, rather it abstractly views the wireless interface as having a link to each of the nodes that NSR protocol 2A reports to be connected. In cases where the higher layer routing protocol discovers an alternative lower cost path to one of the nodes on the wireless channel through a different interface, it informs the NSR protocol 2A and provides it the appropriate metric. The NSR routing protocol builds routing tables using node states and the alternate connectivity information provided by the higher layer protocol. When a better route exists through an alternate interface, then the NSR routing tables 2B forwards the packet up to the IP layer 11 for further routing.

Thus, two routing constructs are used with NSR. The first are nodes and the second is called a wormhole. The node construct is modeled as a point in space and is assumed to have connectivity with other nodes using wireless links. The wormhole gets its name from popular science fiction where it is conceptualized as an accelerator tube between two points in space that catapults whatever goes into it to the distant end using minimum energy in minimum time. Similarly, the wormhole construct in the present invention is defined as a directed path between two points in the network across which packets traverse with minimum energy. Wormholes account for the connections reported from the higher layer routing protocol 12A described above. The basic algorithm used to select which routing constructs to use in a route considers the cost of sending a packet to a construct, the cost of using the construct, and the cost of sending the packet from the construct. These costs are derived from the states of the nodes and the wormholes.

Figure 18:
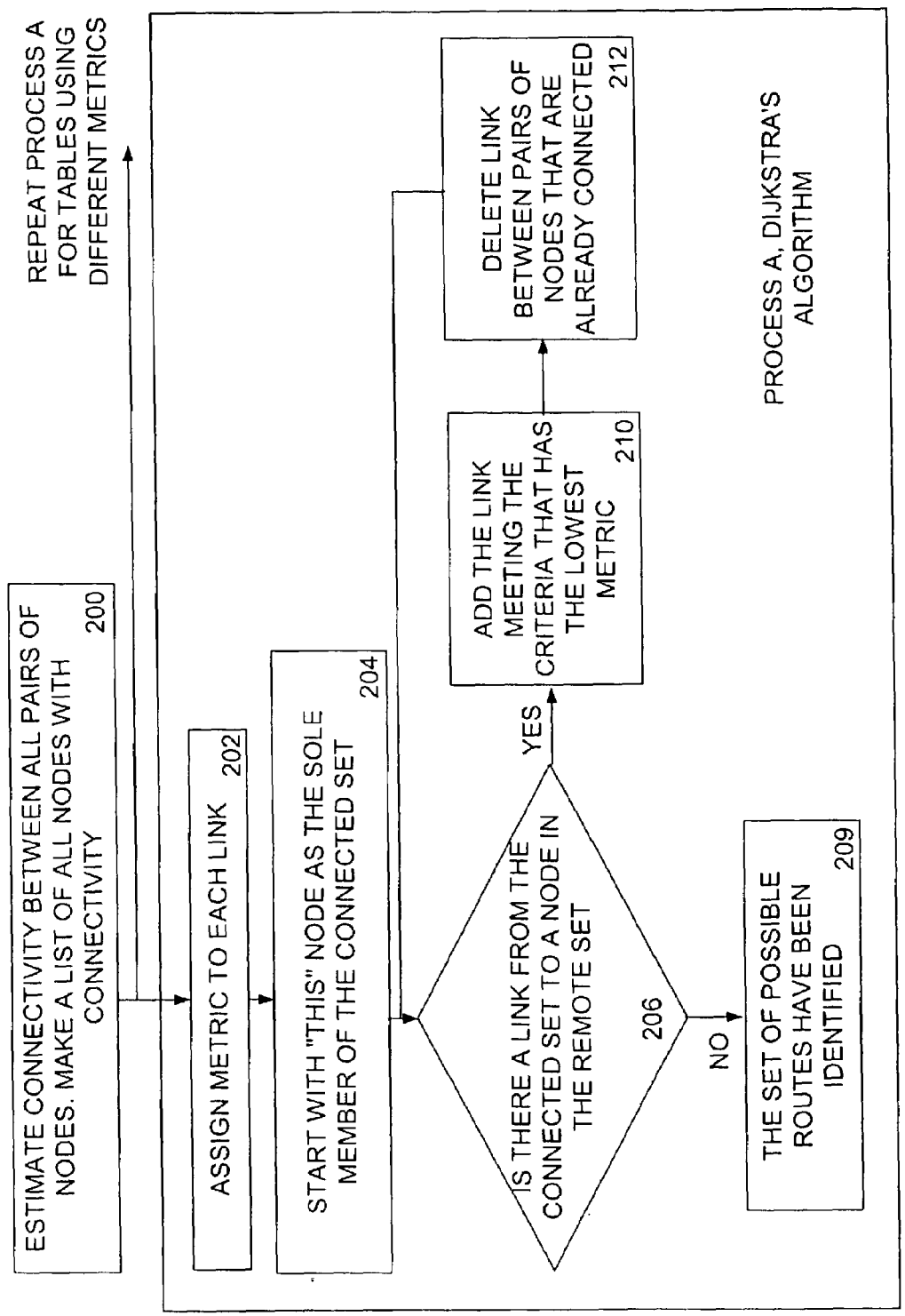
FIG. 18 is an illustrative flow chart of the routing table calculation process.

FIG. 18 is an illustrative flow chart of the routing table calculation process. At the beginning the node uses some method 200 to estimate the connectivity of all nodes in the network and makes a list of all pairwise connections. It then assigns 202 a link metric to each of these connections and executes Dijkstra's algorithm. This algorithm starts 204 with just "this" node in the connected set. It then searches the list of weighted links to determine 206 if there is a link from the connected set to a node in the connected set. If it finds one it then searches the list of weighted links for the smallest weighted link that starts in the connected set and leads to a node outside the connected set and adds it 210 to the connected set. The algorithm then prunes 212 the connected node list of all links that connect two nodes already in the connected set and repeats the process by returning to the search of weighted links 206. If the search of weighted links 206 results in the observation that there are no more links to distant nodes, then the routing algorithm stops 209. This process may repeated multiple times to create multiple routing tables each based on a different routing metric.

Referring to FIG. 18 a flow chart that illustrates this route calculation is provided. Nodes learn the topology and calculate routes in the following manner. First all nodes cooperatively collect and disseminate the node and wormhole states. The objective is for each node to have its own table of states for all nodes and wormholes in the network. Then each individual node uses these states to first predict connectivity between nodes and connectivity to and from wormholes 200. It then assigns a metric to these links 202. The weight of the link between the ends of the wormhole is included in the wormhole's states. With the identified links and their associated metrics, the protocol uses Dijkstra's algorithm to build routing tables. Since with node states there can be multiple metrics assigned to a given link, this process can be repeated to provide multiple routing tables that may be used for different purposes. Greater detail on this process is discussed below.

Node States

Node and wormhole states may be any characteristic about a node that a node can identify or measure. In the routing problem, these states must provide sufficient information to enable a routing protocol to predict connectivity amongst nodes. Additional states may be used for the generation of routing metrics. Still other states may be disseminated that are relevant to just the access protocol or an application. Each node measures and reports its own node states. Wormhole states are collected from the two end nodes by the node at the wormhole entrance, which then disseminate the wormhole. The following list of states is an example of a possible selection of states that may be disseminated. They help to illustrate the interaction between the NSR and SCR portions of this invention. These states are used in the explanation of an example method of predicting connectivity and a recommended method to calculate link metrics.

Address (ADD): The address of the node or the node at the front end of a wormhole.

Location (LOC): Defines where the node physically exists in the network. Given the location of two nodes the direction and distance between the two nodes must be computable.

Path Loss Exponent (PE): Propagation conditions can vary based on the location of nodes. To account for this variation, nodes measure and estimate a path loss exponent for the path loss model. Each node that broadcasts a packet announces the power level it is using. Each destination node that hears the broadcast determines the power level of the received signal. This destination uses the loss in signal strength and the distance between the nodes to estimate a path loss exponent. The path loss exponent is n in the equation $$p_r = k \cdot p_t / d^n \qquad (5)$$

where $p_t$ is the power used by the transmitter, $p_r$ is the power of the received signal, k is a constant accounting for the path loss of the first unit of distance, and d is the distance between the two nodes. A node may advertise a single path loss exponent that is representative of the path loss to all of its neighbors or it may provide multiple exponents together with sector information to specify different path loss exponents to different locations. The example herein considers the simpler single path loss exponent.

Interfaces (IN): This field identifies an interface, 16 in FIG. 1, in addition to the wireless interface on which NSR operates. This field may be repeated for each additional interface.

Channel Identifier (CI): Nodes announcing their own states or the states of their one hop neighbors, also announce the channel identifier that these nodes are using to receive peer-to-peer traffic. Channel identifiers for nodes further than one hop away are not advertised. Through these advertisements, each node learns all the channel identifiers being used by its neighbors that are up to two hops away. Each node uses this information to select its own identifier. The use of different channels, e.g. frequency or spread spectrum codes, is described above.

Energy State (ES): This is the state of the power supply being used by the node. It is the number of packets that the node can transmit using the maximum transmission power level. In the case of unconstrained energy nodes, this level is set to the maximum value. Methods for estimating energy reserves are not part of this invention.

Receive Fraction (RF): This is the fraction of the maximum transmission power that is used by the node to receive a packet.

Class (CLS): This is a single bit that defines whether the node will always remain stationary or whether the node has the ability to move. The stationary nodes may be located at an office building or be infrastructure nodes that are permanently located on towers in the network area.

Velocity (V): In this field, moving nodes advertise their current velocity.

Direction (D): In this field moving nodes advertise the direction of their movement.

Dozing State (DS): This field identifies in which of the three dozing states the node is participating, the default state, the periodic waking state, or the coordinated dozing P-Supporter Address (PS): This field is used if the node is using coordinated dozing. It is the address of the node that is the p-supporter.

Doze Offset (DO): This field is the offset in number of transmission slots from the time stamp that the dozing node will next wake up.

Doze Period (DP): This field is the period at which the dozing node wakes. It is measured as an integer number of transmission slots.

Time Stamp (TS): This is the time that the reported information was announced by the node. We assume time is absolute and synchronized throughout the network. Time is incremented for each transmission slot.

FIG. 19 illustrates a set of the states that may be used for a node and a corresponding set of states for a wormhole.

Determining Connectivity

As an example, connectivity between all nodes can be estimated using Equation 5 (above). The link prediction algorithm starts by choosing the path loss exponent. It uses the larger of the two exponents proposed by the source and destination nodes. It then estimates the received power of a transmission made with the maximum allowed transmission power. If this estimated received power is above some threshold then a connection is assumed. The threshold is a configurable parameter of the protocol and may be selected to achieve a degree of confidence that the predictions are correct. Higher thresholds are more conservative but may exclude some links. Lower thresholds may predict links that are not feasible.

Multiple different approaches can be applied to this part of the algorithm. It is expected that more sophisticated models for predicting connectivity will be developed and these in turn will dictate what node states should be disseminated.

Assigning Link Metrics

Multiple methods may be used to assign metrics to links. The following is an energy conservation approach. The objectives of this routing metric are to conserve energy and to promote network longevity. These objectives result in choosing links between nodes that are close to each other and in avoiding energy constrained nodes with low energy reserves. The energy consumption of a link considers the energy consumed by the node transmitting the packet and the energy consumed by the node receiving the packet. Longevity is associated with the source node of each link. The metric for the link from node i to node j is provided by $$w_c(i, j) = \frac{c_{2j} + p_r \cdot d_{ij}^n}{\frac{e_{ri}}{e_m}} \quad (6)$$

where $c_2$ is the energy consumed by a node receiving a packet, $p_r$ is the required signal power at a destination to receive a packet, d is the distance that separates the two nodes on the link, n is the largest path loss exponent of the two nodes on the link, $e_r$ is a measure of the energy reserve and $e_m$ is a constant larger than $e_r$ that weights the influence of the energy reserve on the link metric. Each of these model parameters can be obtained from the node states. In application, equation 6 changes based on whether either the source or the destination is energy unconstrained. When the source is energy unconstrained the denominator in equation 6 is 1 (i.e. the energy reserves are not a concern) and if the destination is energy unconstrained then $c_2$ is 0 (i.e. the destinations energy consumption is not a concern). So the metric calculated be 6 applies when both ends of the link are energy constrained nodes. When just the source is an energy constrained node then the link weight is determined by $$w_c(i, j) = \frac{p_r \cdot d_{ij}^n}{\frac{e_{ri}}{e_{mi}}},$$

when just the destination is energy constrained then the link weight is determined by $$w_C(i, j) = c_{2j} + p_r \cdot d_{ij}^n,$$

and when neither end nodes are energy constrained the link weight is determined by $$w_C(i, j) = p_r \cdot d_{ij}^n.$$

This basic link-weighting algorithm may be modified to account for other physical properties of nodes or their activity. The following are some examples.

Handling of movement of nodes is an aspect of the present invention. The example states include the location, direction, velocity, and the timestamp of when each node's states were recorded. With this information any other node can make a prediction of where any other node will be at the time that the routing tables are calculated and so compensate for expected movement.

Another aspect of the present invention is how to handle the entry of some nodes into dozing states. Nodes that enter the dozing states may not be available when data is ready to be routed through their location. The result could be a substantial delay in delivery because of nodes waiting for these dozing nodes to wake-up and, even worse, could result in unwanted contentions that have no possibility of success if nodes are unaware that adjacent nodes are dozing. The example states include several pieces of information that enable routing protocols to avoid these results. The states included a flag indicating if a node is dozing, then the time the node will next wake-up with respect to the timestamp and a dozing period. Nodes can route their data to avoid dozing nodes by penalizing the metrics of links through the dozing nodes. The penalty should exceed the cost of using any other non-dozing nodes. Nodes may still use these links if no other routes exist but the node routing a packet through a dozing node has to wait until the time that the dozing node wakes-up. Since dozing schedules are disseminated within the states, no contentions need be wasted.

Ensuring route stability is a feature of the invention. Frequently streams of packets are routed between nodes. For a route to support the whole stream, it is desirable that it have longevity. Routing through nodes that do not move much offer the best characteristics. Preference is given for longer lasting links by penalizing links between nodes based on their relative mobility. The links between nodes that are stationary with respect to each other would receive no penalty, links between nodes that are moving apart from each other would receive a large penalty, and links between nodes that are moving toward each other may receive a weight reduction.

Trustworthy routes are routes that are considered reliable from a security point of view. Trusted nodes are those nodes that will reliably forward packets to their destination without extracting information or altering the content of packets. Over time, nodes can trace the activity of their neighbors. From this activity and information from node states, they can assess the trust of nodes. For example, nodes that are associated with particular users that have been part of the network for a long traceable time would be considered trust worthier than new nodes recently associated with the network. In this case, trusted routes would be calculated using the subset of nodes states of nodes that are considered trustworthy.

Node State Dissemination

The objective of the node state dissemination process is to provide sufficient information to all nodes in the network so that they can then determine a suitable next hop for a route to every destination. A concurrent objective is to control overhead so the protocol may scale well with network size. NSR attempts to achieve these simultaneous objectives by decreasing the frequency of updates for the states of nodes that are far away. This process trades-off the accuracy on multihop routes for reduced overhead. When destinations are distant, accurate routes are not as important so long as packets are forwarded in the general direction of the destination. As packets come closer to the destination, it is expected that they will follow more accurate routes.

Figure 20A:
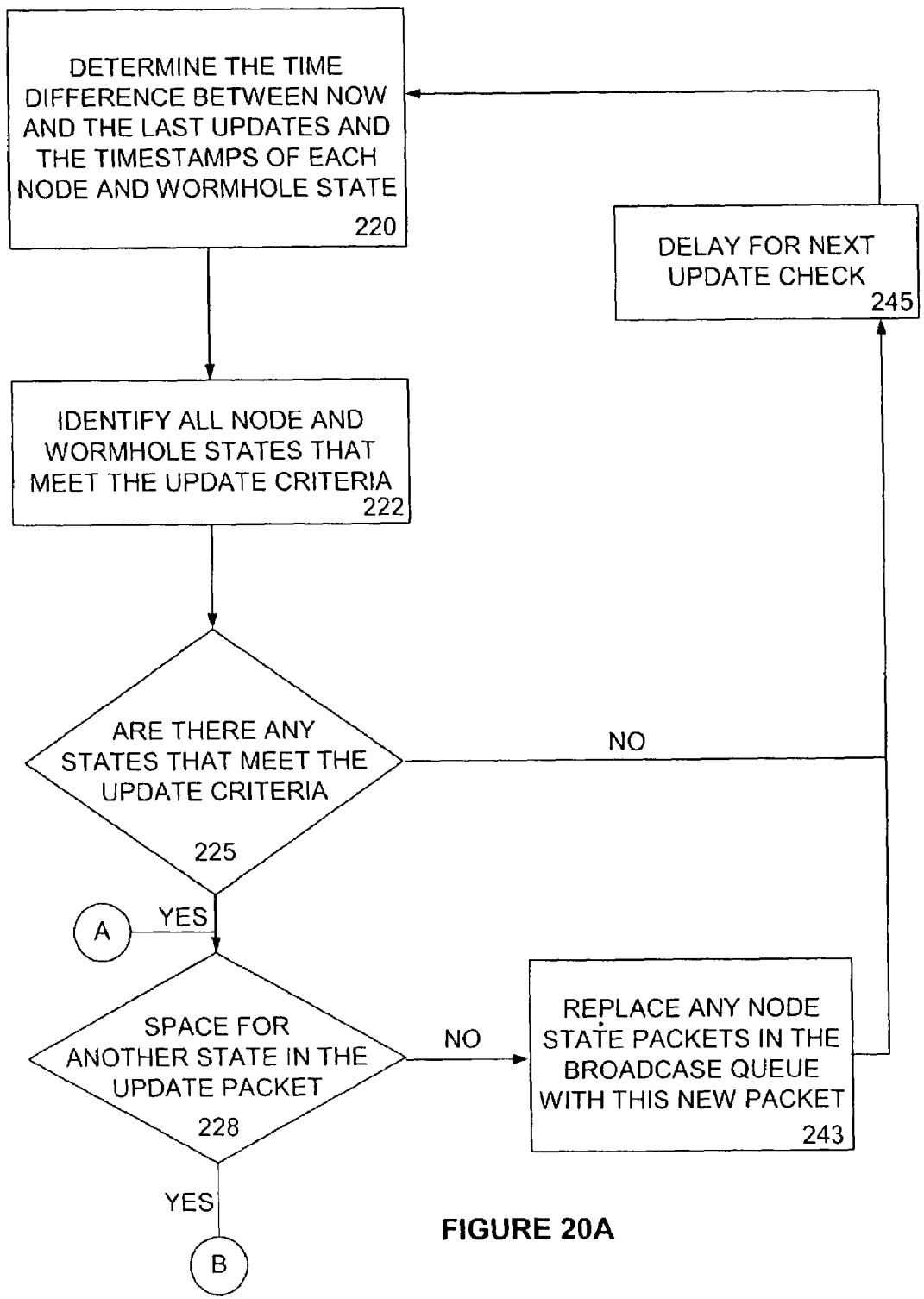
FIGS. 20A and 20B show an illustrative flow chart of the node state packet creation process.
Figure 20B:
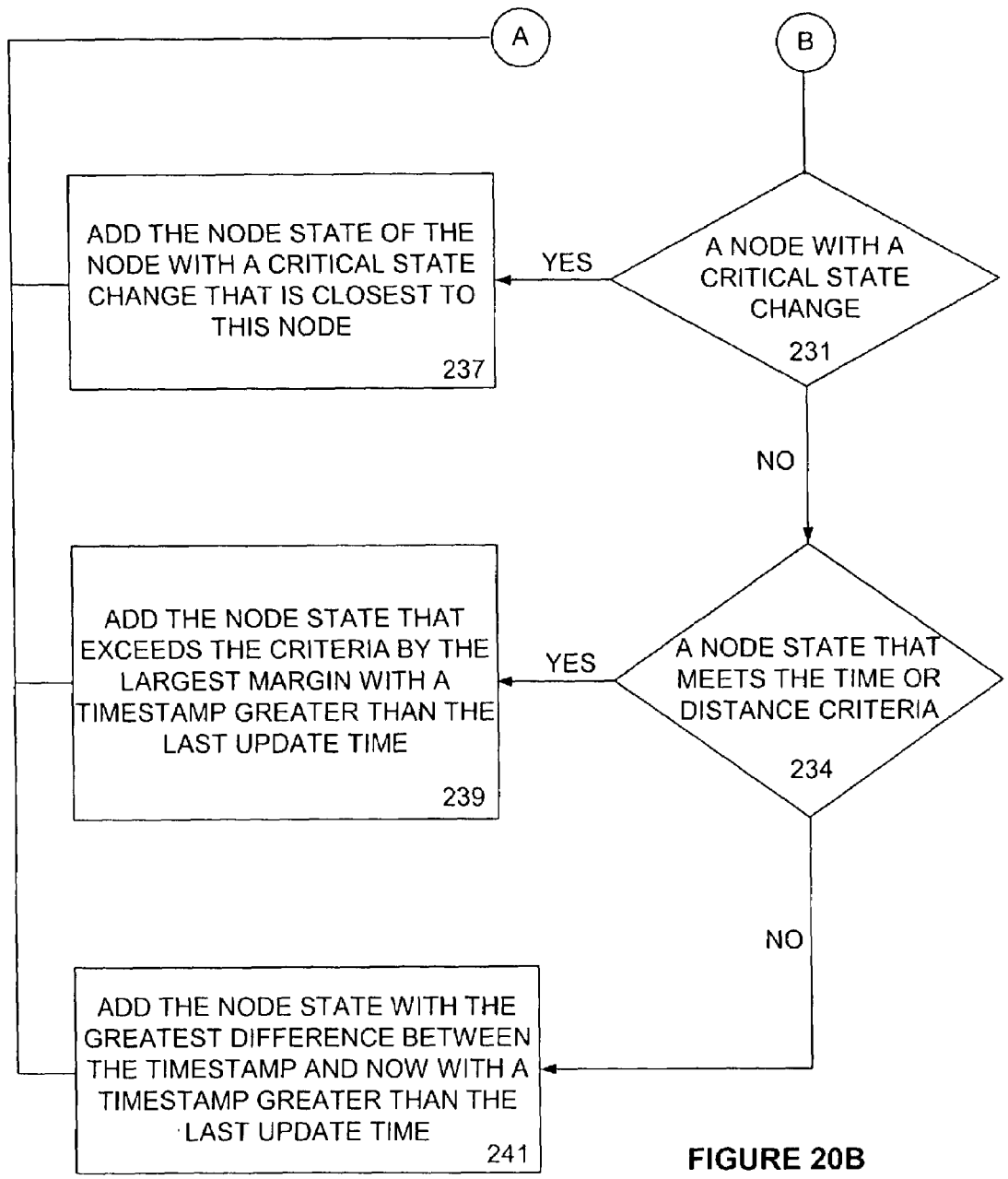

FIGS. 20A and 20B illustrate a flow chart of the node state packet creation process. The process begins after a node identifies it is time to determine if a nodes state packet should be sent. The individual node first determines 220 the time difference between the present time and the last update as well as the time difference between the present time and the time stamps of each node and wormhole state. This information is then used to identify 222 all nodes and wormhole states that meet the update criteria. The node then inquires 225 if there are any states that meet the update criteria. If the answer is yes, the node then starts to build a node state packet. If the answer is no the node delays 245 for a period of time and returns to determine 220 the time difference between the present time and the last update.

The node starts the packet building process by inquiring 228 if there is space for another state in the packet. If there is space, the node first inquires 231 if there is a node with a critical state change. If the answer is yes the node adds 237 the state with the critical state change of the node that is closest to itself and then returns to the block to determine if there is another space in the packet. If there are no nodes with critical state changes then the node inquires 234 if there are any nodes that meet the time or distance criteria. If the answer is yes, the node adds 239 the node state that exceeds the criteria by the largest margin with a timestamp greater than the last update time and then returns to the block to determine if there is another space in the packet. If there are no packets the meet the time or distance update criteria, then the node adds 241 the state with the greatest difference between its timestamp and its last update time. It then returns to the block to determine if there is another space in the packet.

This process continues until the answer to the inquiry 228 of whether there is room for another state in the node state packet is no and then it places the newly formed node state packet in the broadcast queue while simultaneously removing 243 any older node state packets that are in the queue that have not been transmitted. The process concludes by entering 245 a delay period waiting to next check if a node state update packet needs to be transmitted.

Figure 21A:
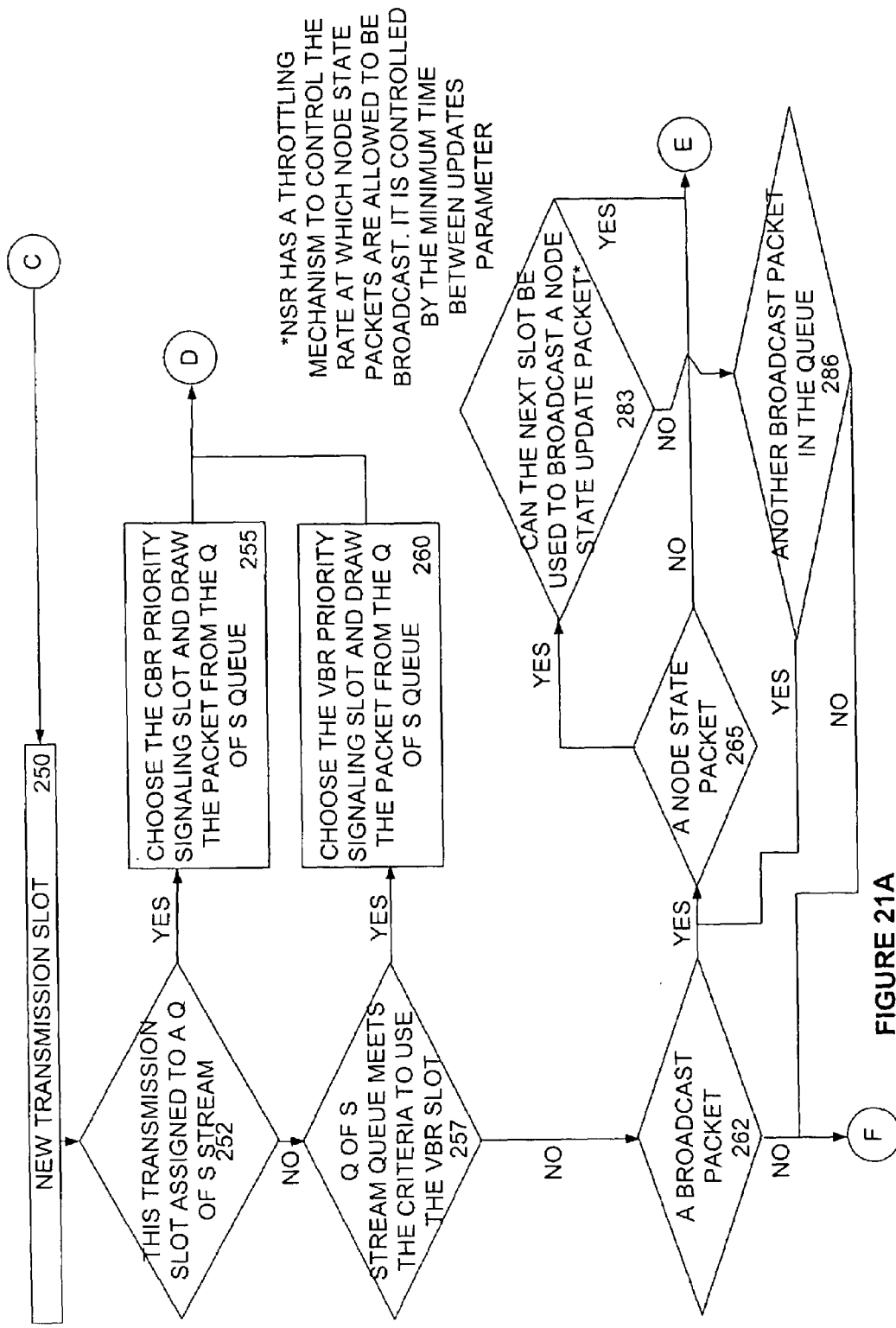
FIGS. 21A-21C show an illustrative flow chart of NSR's packet selection process that is executed with each transmission slot.
Figure 21B:
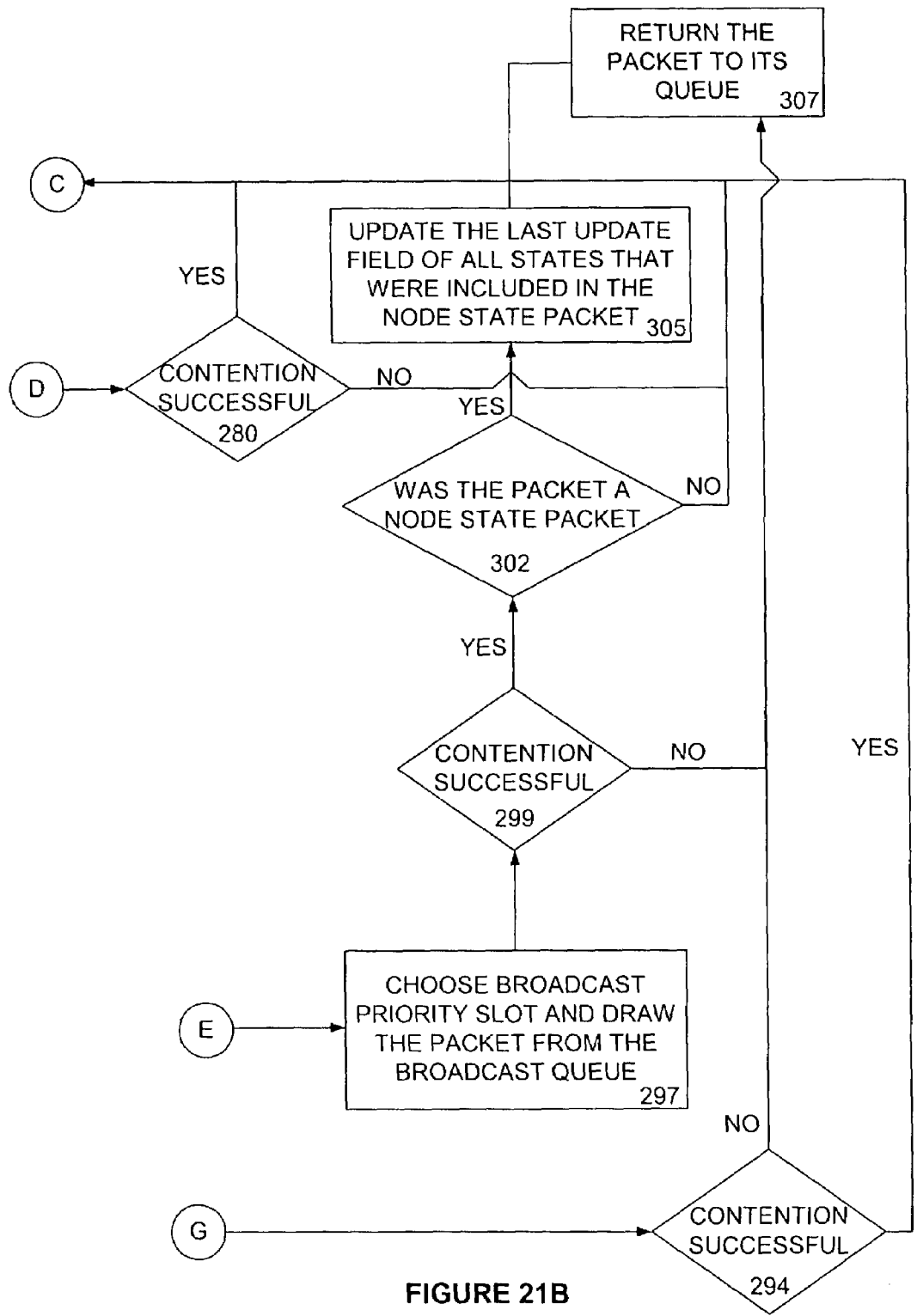
Figure 21C:
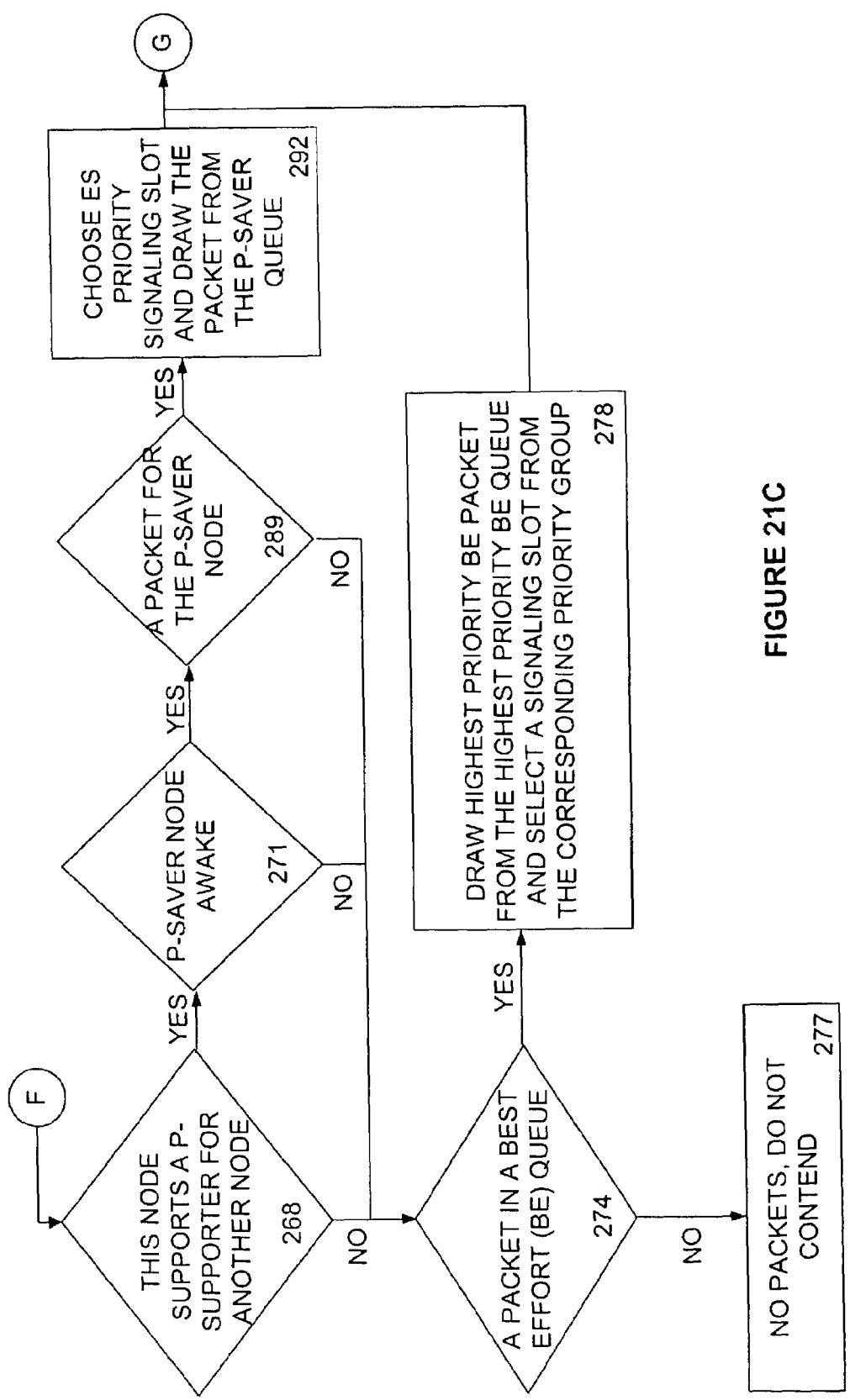

FIGS. 21A-21C illustrate a flow chart of NSR's packet selection process that is executed with each transmission slot. The process begins just prior to the next transmission slot 250. The node first checks 252 if there is a stream that is using this particular slot in the frame. If the answer is yes the node chooses to contend 255 using the CBR priority signaling slot. If the answer is no, the node inquires 257 if there is a QoS stream queue that meets the criteria to use a VBR signaling slot in the current transmission slot. If there is a queue needing to use a VBR slot, then the node chooses 260 the VBR signaling slot to start its contention and draws the packet from the appropriate QoS queue. If there are no QoS queues requiring VBR service then the node inquires 262 if there are any packets in the broadcast queue. If the answer is yes then the node tries to determine if it should send that packet this transmission slot. The node inquires 265 if the broadcast packet is a node state packet. If it is a node state packet the node then inquires 283 if the next transmission slot can be used to transmit the packet. If the broadcast packet is not a node state packet or if it is and the next slot can be used to transmit it then the node chooses 297 a broadcast priority signaling slot for contending in the upcoming slot If the packet is a node state packet but the node cannot use the next transmission slot to send the node state packet then the node inquires 286 if there is another broadcast packet and repeats the process of checking 265 if the packet is a node state packet. If there is not another broadcast packet or if there is no broadcast packet then the node inquires 268 if it is the p-supporter of another node. If the answer is yes the node inquires 271 if this p-saver node will be awake in the upcoming transmission cycle. If the answer is yes, then the node determines 289 if there are any packets queued for this node. Finally, if the answer to this question is yes then the node chooses 292 an ES priority signaling slot and draws a packet from the p-saver queue. If the answer to any of the inquiries, whether 268 this node is a p-supporter, whether 271 the p-saver is awake, and whether there is a packet for the p-saver node, is no, then the node checks to determine if there is a best effort packet to transmit. The node then draws 278 the highest priority best effort packet from the highest priority best effort queue and selects a signaling slot from the corresponding priority group. If there are no best effort packets in a queue 277 then the node has no packets to transmit and does not contend. At this point the node is either contending for access or not contending for access.

Nodes then contend for access 280, 294, 299. If the node contended using a CBR or VBR priority slot 280, or contended using an ES or best effort priority slot 294 and the contention was successful in that a packet was successfully exchanged, then the process advances to the beginning 250 and repeats itself. If these types of contention were unsuccessful then the node returns 307 the packet to the NSR packet queues and the process advances to the next transmission slot 250. If the node used a broadcast priority slot the process is a bit more complex. If the broadcast contention 299 was successful then the node inquires 302 if the packet was a node state packet. If it was a node state packet, then the node updates 305 the last update field of all states in this nodes node state lists that were included in the node state packet. After completing this task or after determining that the successful transmission was not a node state packet the node advances to the next transmission slot 250. If the broadcast contention was unsuccessful, then the node returns 307 the broadcast packet to the broadcast queue and starts the process over again for the next transmission slot 250.

Figure 22A:
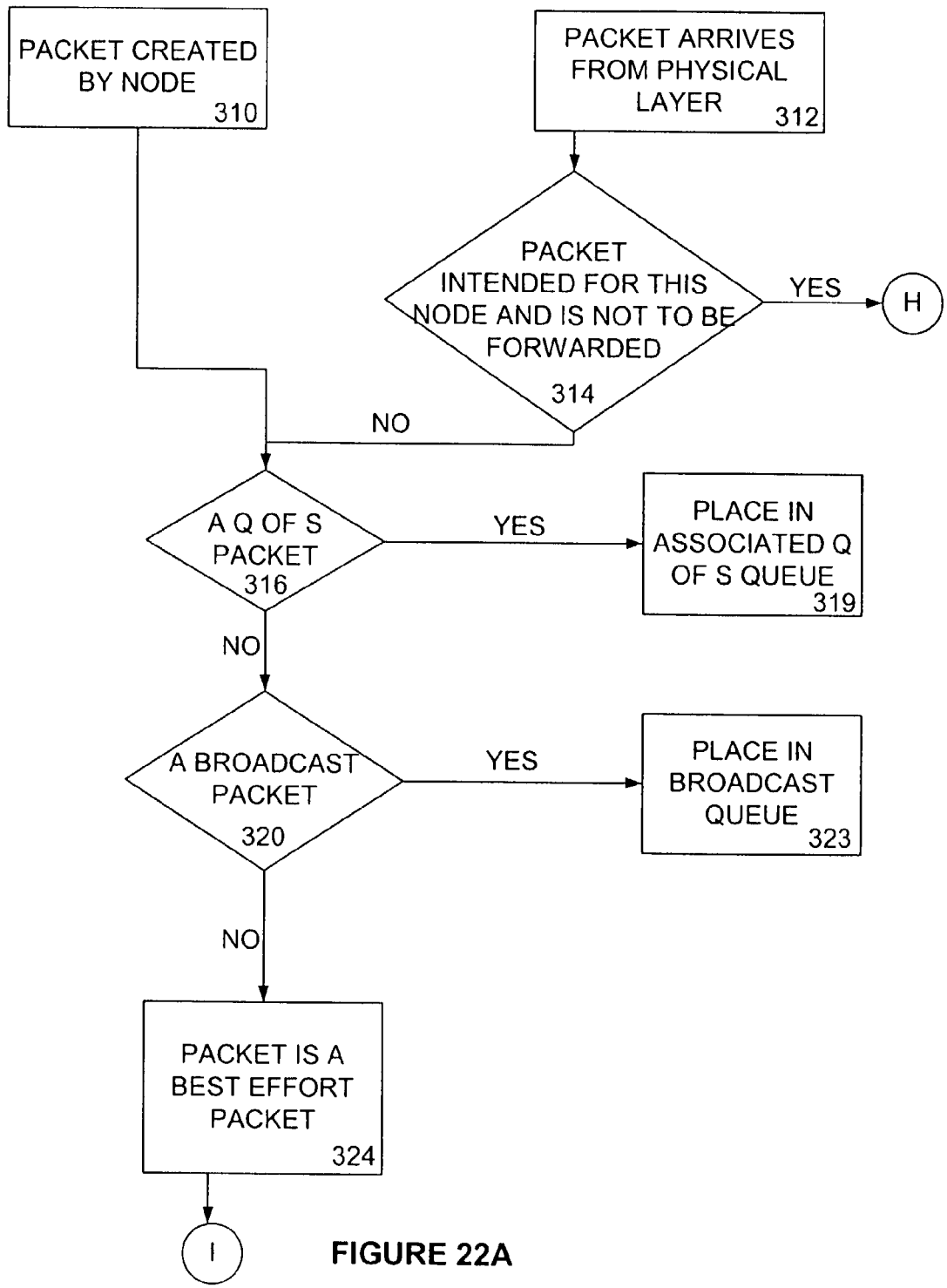
FIGS. 22A-22C show an illustrative flow chart of NSR's packet queuing process.
Figure 22B:
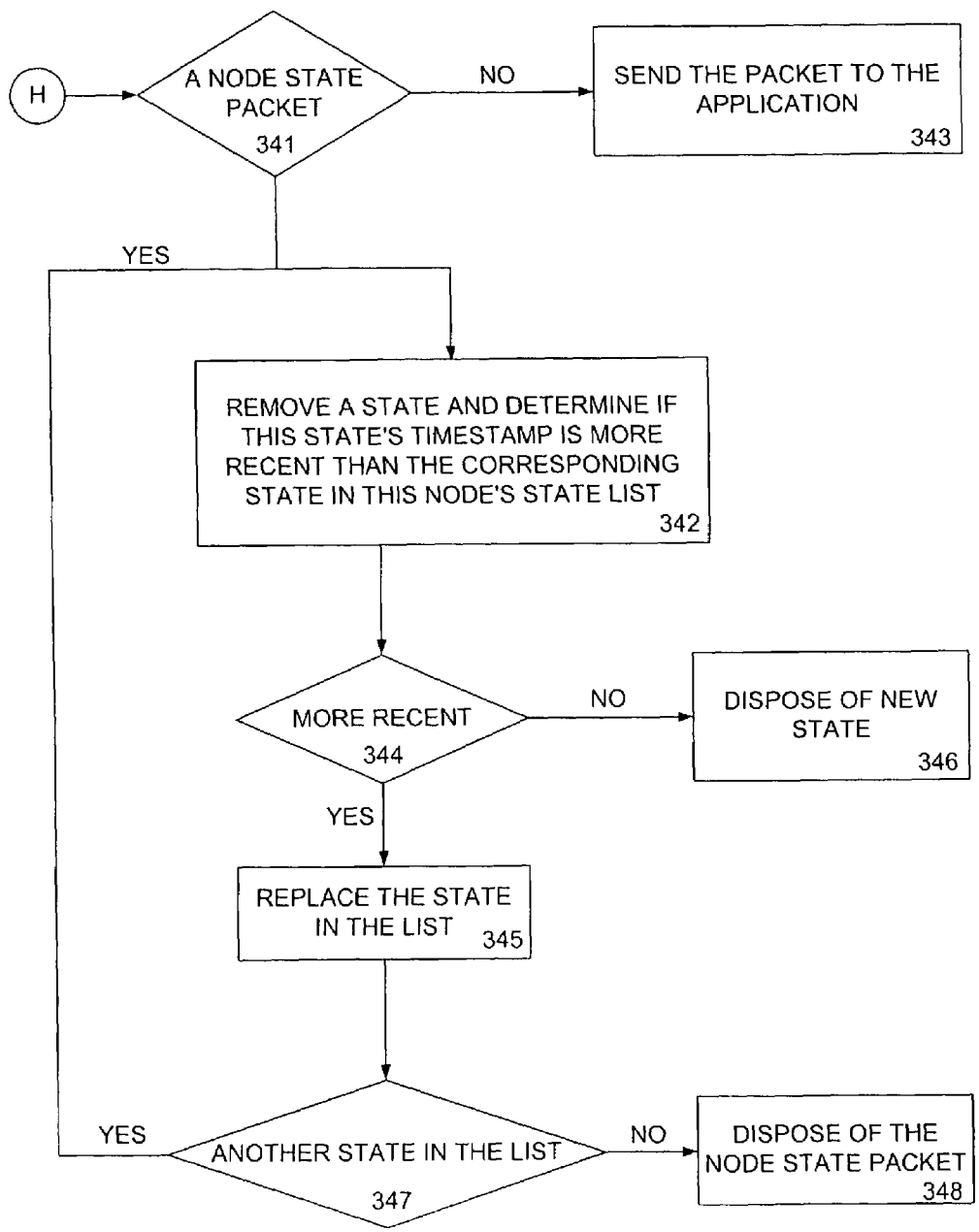
Figure 22C:
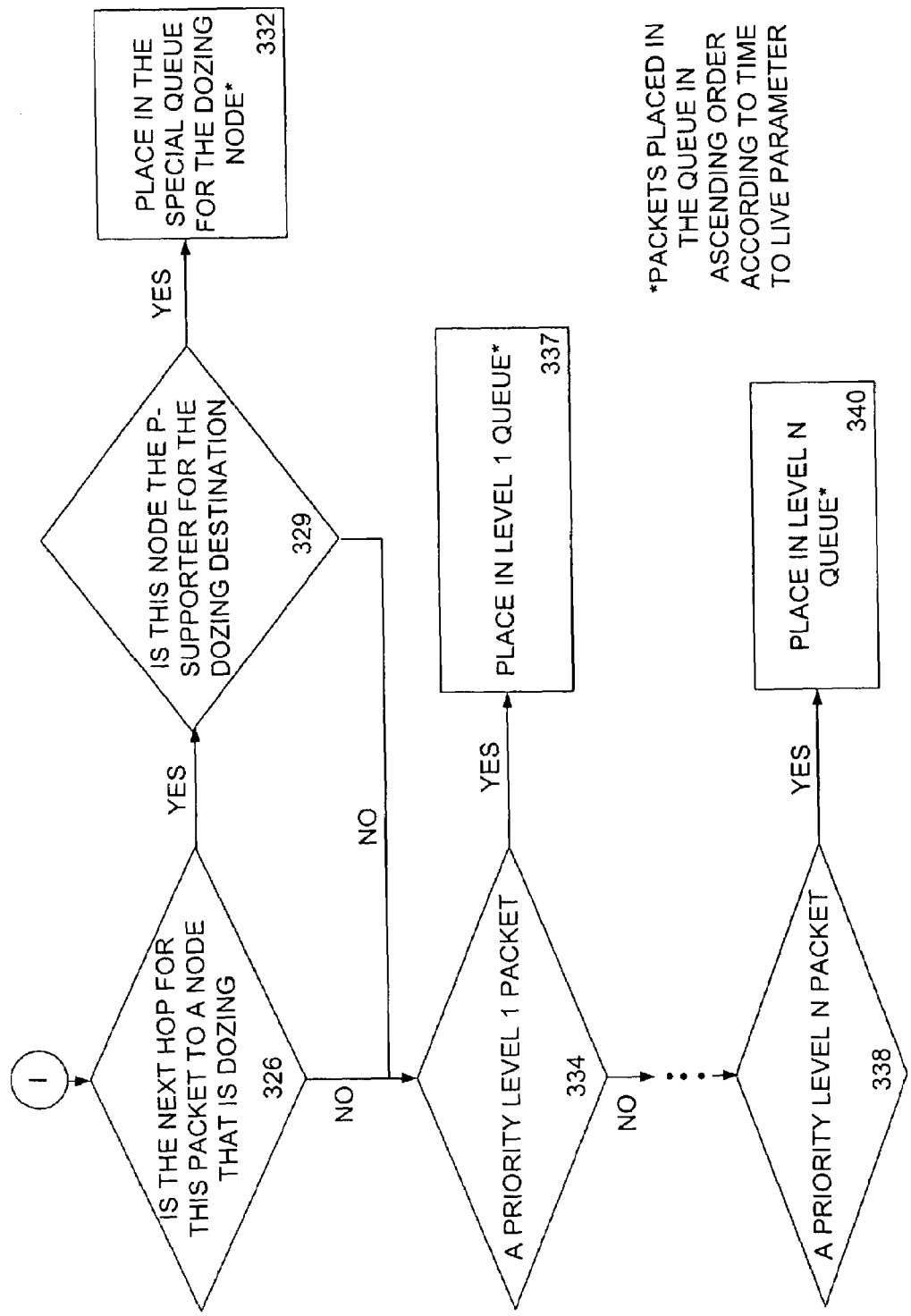

FIGS. 20A and 20B illustrate the process used to build node state packets. FIGS. 21A-21C illustrate the method NSR uses to select the packet for the next transmission slot. FIGS. 22A-22C illustrate how a node processes a packet after it's reception. The combination of these figures portrays the process with which node states are disseminated and updated.

FIGS. 22A-22C illustrate a flow chart of NSR's packet queuing process. The process begins with a packet arriving at NSR's routing tables and queues 2B from the physical layer 312 or from this node 310. If the packet is received from the physical layer the node inquires 314 if the packet was intended for itself. If the answer is no or if the packet is from this node, the node inquires 316 if the packet is a QoS packet. If the packet is a QoS packet it is placed 319 in the associated QoS queue. If the packet is not a QoS packet then the node inquires if it is a broadcast 320 packet. If it is a broadcast packet then it is placed 323 in the broadcast queue. If the packet is not a broadcast packet, then the node tags 324 the packet as a best effort packet. The node then inquires 326 if the packet has a next hop route to a node that is dozing. If the answer is yes the node inquires 329 if this node is the p-supporter for the dozing destination. If the node is the next hop destination's p-supporter then the node 332 is placed in the special queue for the dozing node. If the packet is not for a dozing node then the process goes through a series of inquiries 334, 338 to determine whether the packet has a priority that matches that of the inquiry. If the answer is yes, the node is placed in the queue with that same priority 337, 340. If the answer is no, then the inquiry for the next lowest priority is executed until the lowest priority when the packet is guaranteed to be placed in its queue. When packets are placed in a queue, 319, 323, 332, 337, 340, the queues are sorted in ascending order according to the time to live parameter of the packet.

If a packet arrives from the physical layer that is intended for this node, the node inquires 341 if the packet is a node state packet. If it is not a node state packet the node simply forwards 343 the packet to the appropriate application. If the packet was a node state packet then the node must extract the states and update the node state table. The node processes the node state packet by first removing 342 a state and determining if this state's timestamp is more recent than the corresponding state in this node's node state table. The node inquires 344 if the received state is more recent. If the new state is more recent then the older state in the node state table is replaced 345 with this new state. If the node state in the node state table is more recent the node disposes 346 of the state just received in the node state packet and does nothing to its nodes state table. After handling the node state last extracted from the node state packet the node inquires 347 if there are anymore states in the node state packet. If there are more states then the process returns to repeat the process of extracting 342 a state and checking if it is more recent. If the answer to this inquiry is no, the empty node state packet is disposed of 348.

Individual nodes maintain lists of node and wormhole states and then rebroadcast individual states at a rate dependent on the separation distance between nodes, specifically the distance between the node or wormhole associated with the state information being relayed and the node doing the relaying. (In the case of wormholes, distance is calculated to the front end of the wormhole.) Individual nodes announce their state in a node state broadcast on a periodic basis or whenever there has been some threshold change in the location, energy status, or path loss exponent of the node since the last update, or whenever a discrete state has changed such as the channel identifier or dozing status. Nodes broadcast the state of their one-hop neighbors on a periodic basis or whenever their channel identifier has changed. These neighbor broadcasts are the only NSR broadcasts that include the channel identifiers of nodes. When a node disseminates another node's channel identifier it indicates that the node is a neighbor. Nodes use these broadcasts to determine any conflicts with their own channel identifiers and to determine the explicit connectivity of all nodes up to two hops away. Node states for nodes further than one hop away are advertised at a rate dependent on their separation distance and changes in their reported states. Nodes that are stationary and have unconstrained energy status are advertised less frequently than those that are mobile and operating on batteries. Equation 7 is an example update criteria. It uses a single threshold to determine when to send the update, which is adjusted based on separation distances of the nodes.

$$\Delta T(d_{ij}) = \begin{cases} \Delta T_1 & d_{ij} \leq 1 \\ C \cdot d_{ij} \cdot \Delta T_1 & d_{ij} > 1 \end{cases} \quad (7)$$

In this equation, $\Delta T_1$ is the period at which one hop neighbors are advertised, $d_{ij}$ is the separation distance between the node transmitting the state, node i, and the node whose state is being disseminated, node j, and $\Delta T(d_{ij})$ is the period at which node i advertises the state of node j. The factor C is a constant that adjusts the rate the states are updated. Different values for C can be used based on other states of the node. For example, the value of C would be greater for stationary nodes as opposed to mobile nodes.

In some cases, an update comes due prior to any update in the node state that needs to be forwarded. Node states that have not been updated since they were last forwarded should not be forwarded again. When the criterion of Equation 7 is met the node first checks that the state was updated since it was last forwarded otherwise it does not forward it.

Node state packets have precedence for access 262 over all payload packets, 268, 274, except those that are part of streams that have CBR 252 or VBR 257 QoS. Individual node state packets may accommodate only a few sets of states. Therefore, the frequency at which node state packets are generated is a function of both the volatility of the network and its size. In highly volatile networks or very large networks with lots of nodes, node state update packets may overwhelm the network and prevent the transmission of payload packets. To prevent this undesirable situation the protocol provides a configurable parameter called the mean time between updates (MTBU). Nodes may transmit node state packets no faster than one packet per MTBU. This restriction does not apply when the looping recovery mechanism is executed.

A node that receives a node state packet updates its list of node states on a state-by-state basis. It will only replace 345 states in its list with information from the node state packet if the timestamp of the node/wormhole state is more recent than the timestamp on its corresponding list entry. The criteria for forwarding the state do not change even though the state is updated.

Calculating Routing Tables

Nodes calculate their routing table(s) in a three-step process, referring to FIG. 18. First, they predict 200 pairwise connectivity of all nodes using Equation 5 as defined above. Second, they assign a weight to 202 each link that is identified. Finally, nodes use Dijkstra's algorithm 204 to 213 to calculate the routes to all other nodes in the network. At the conclusion of the first two steps, a node has a list of all links with an assigned metric. Dijkstra's algorithm finds the least cost routes from a node to all other nodes in the network by finding paths to these nodes in order of increasing path cost. At the start of the algorithm there are two sets of nodes, say N, the set of all nodes in the network, and R, the set of all nodes incorporated into routing tables. In the beginning only the source node is in the set R, 202. With each iteration of the algorithm an additional node is added to R. The algorithm simply adds 210 the least cost link from the set of links above that connects a node in set R to a node not in set R. To simplify later iterations, the list of links formed in step two is then pruned 213 of all links that also extend to destination node just added. The algorithm continues until all nodes in N are in R or there are no possible links to additional nodes that can be added 209.

The calculation of routing tables may be triggered in one of three manners, on demand when a packet needs to be routed, on detection of a state change, or on a period. Calculating a routing table is computationally intensive and so it is undesirable to do too frequently. The best trigger depends on the use of the network. The on demand trigger would be best in a lightly loaded networks, the state change trigger would be best in networks where there is little movement and thus changes in states, and the periodic method would be used in situations where neither of the above conditions apply. Since the periodic method is the most general, it is the recommended method for this invention.

Countering Looping

Loops occur in routing when nodes have different views of the network topology and intermediate nodes route the same packet back and forth to each other thinking that the best route to the destination is through the other node.

Dijkstra's algorithm does not suffer loops if all nodes have the same list of states, but NSR's diffusion of state information will not achieve this common picture. This is especially true when the MTBU mechanism chokes off the flow of state information. To further complicate matters the periodic calculation of routing tables may result in tables that are based on stale information. Thus, loops are likely to occur. Identifying the fact that a loop is occurring becomes a detection mechanism that indicates that the update process has failed to disseminate states rapidly enough or routing tables are not being calculated frequently enough. The solution is for nodes that are participating in the loop to synchronize their state tables and recalculate their routing tables. The process recommended by this invention is illustrated below.

The return of a packet to a node that has previously handled it is an indication that a looping condition exists. Upon identification of a returned packet a nodes executes a three step correction process. First, prior to transmitting any payload packets except CBR and VBR packets, the node broadcasts all of the node/wormhole states in its node state tables in consecutive contentions. (The MTBU constraint does not apply to these node state packets.) Upon completing the transmission of all the node states in its node state table, the node then recalculates its routing table. Finally, the node reroutes the returned packet using the new routing table. This three-step process is executed so long as the payload packet is looping along the same route. Eventually, all nodes on the loop will synchronize their list of node states and the packet will break from the loop.

NSR's Coordination of SCR's Services

NSR supports two special services that are based on the coordinated use of SCR services, routing that accounts for the use of low energy states at nodes and multihop use of the CBR link reservation mechanism. The routing service that adapts to the use of low energy states at nodes was described in the section on alternative metrics for dozing nodes. Routing tables are built to avoid nodes that are dozing. The routing service that manages the use of SCR's CBR link reservation mechanism, however, involves much more than just manipulating routing metrics before calculating routes. It must incrementally reserve links on a path to a destination and this must be done such that the overall time for a packet to traverse the path is less than some delay constraint. A description of the connection oriented routing service follows.

Connection Oriented Stream-Based Services

Figure 23A:
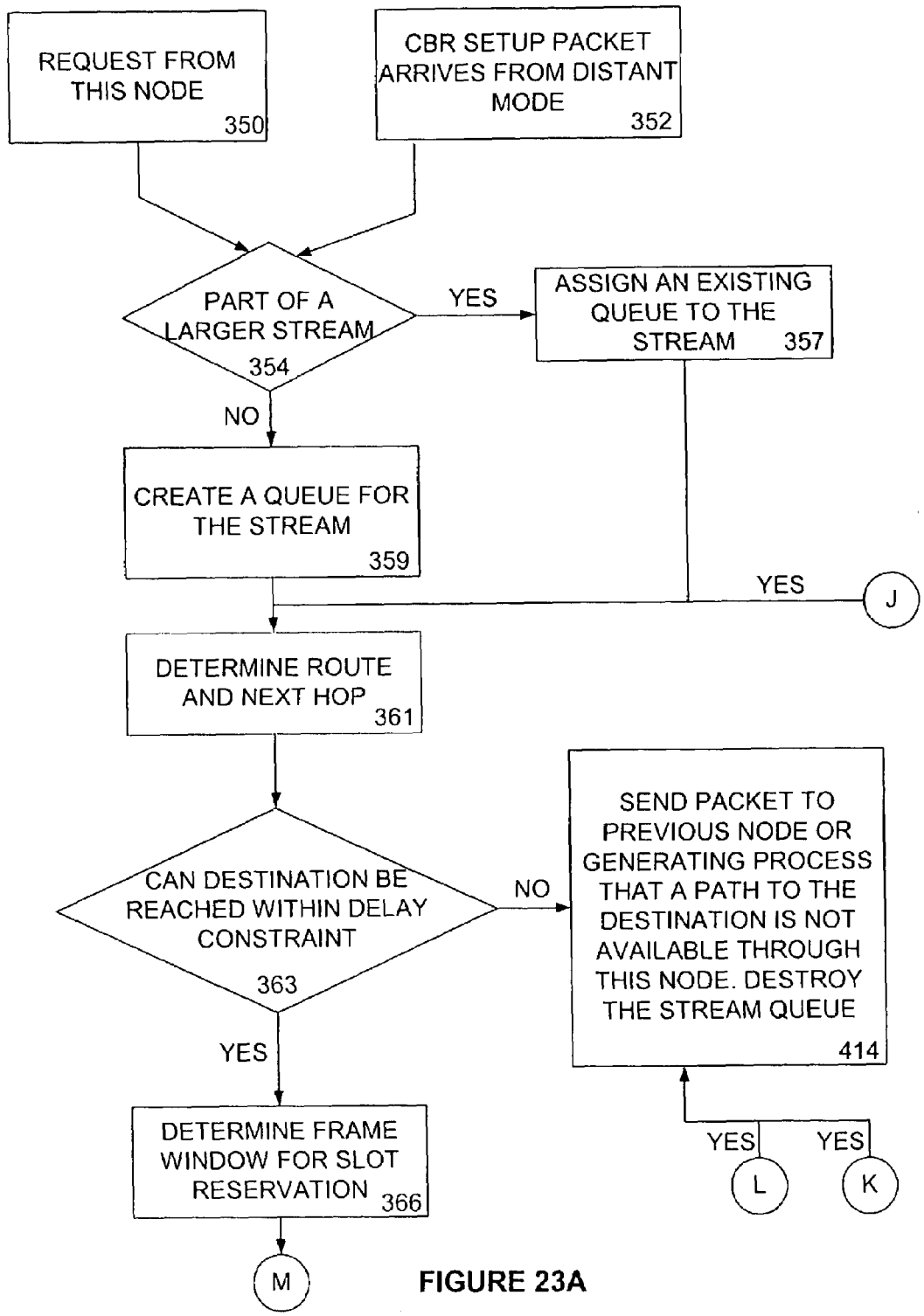
FIGS. 23A-23C show an illustrative flow chart of NSR's path reservation process.
Figure 23B:
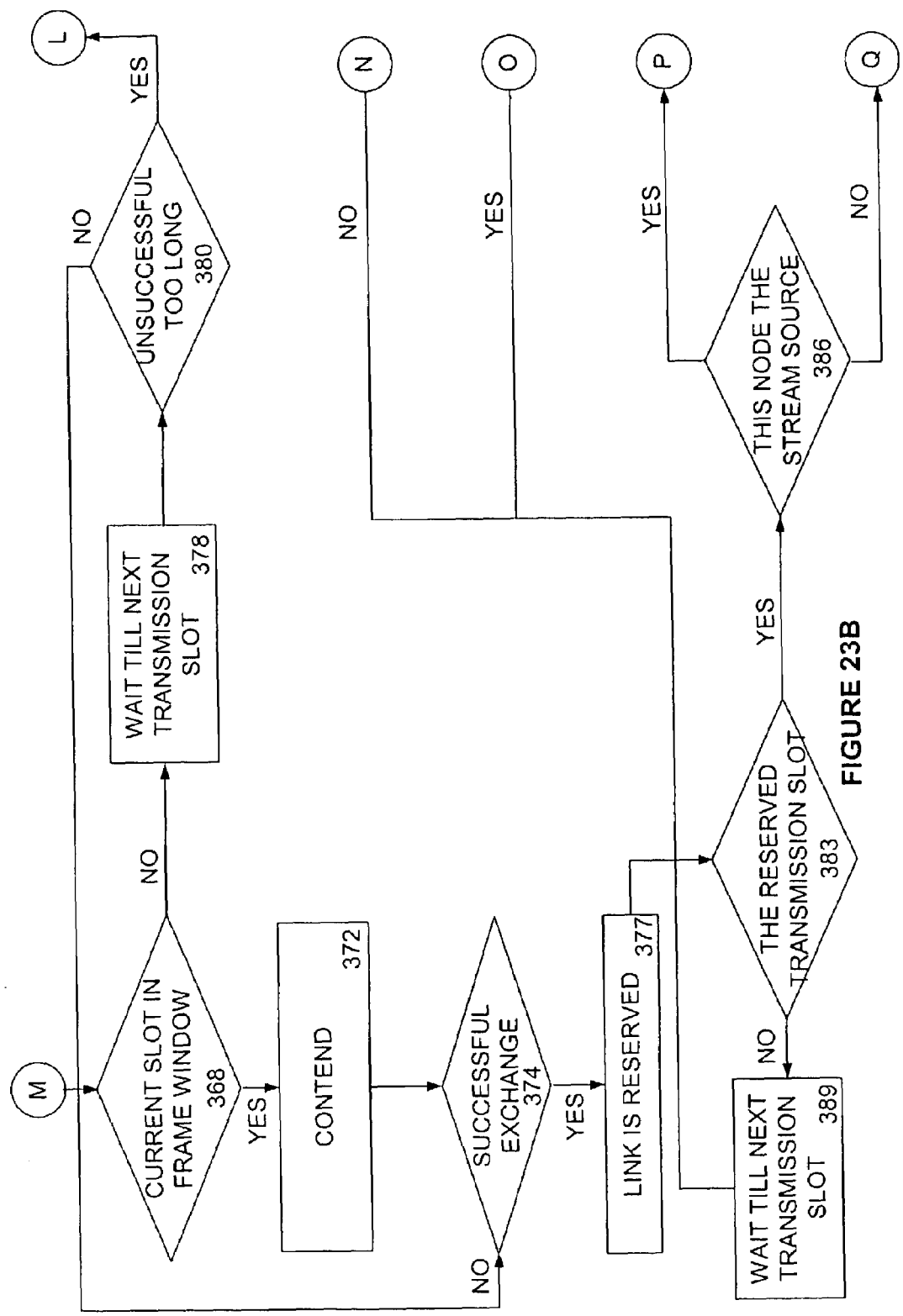
Figure 23C:
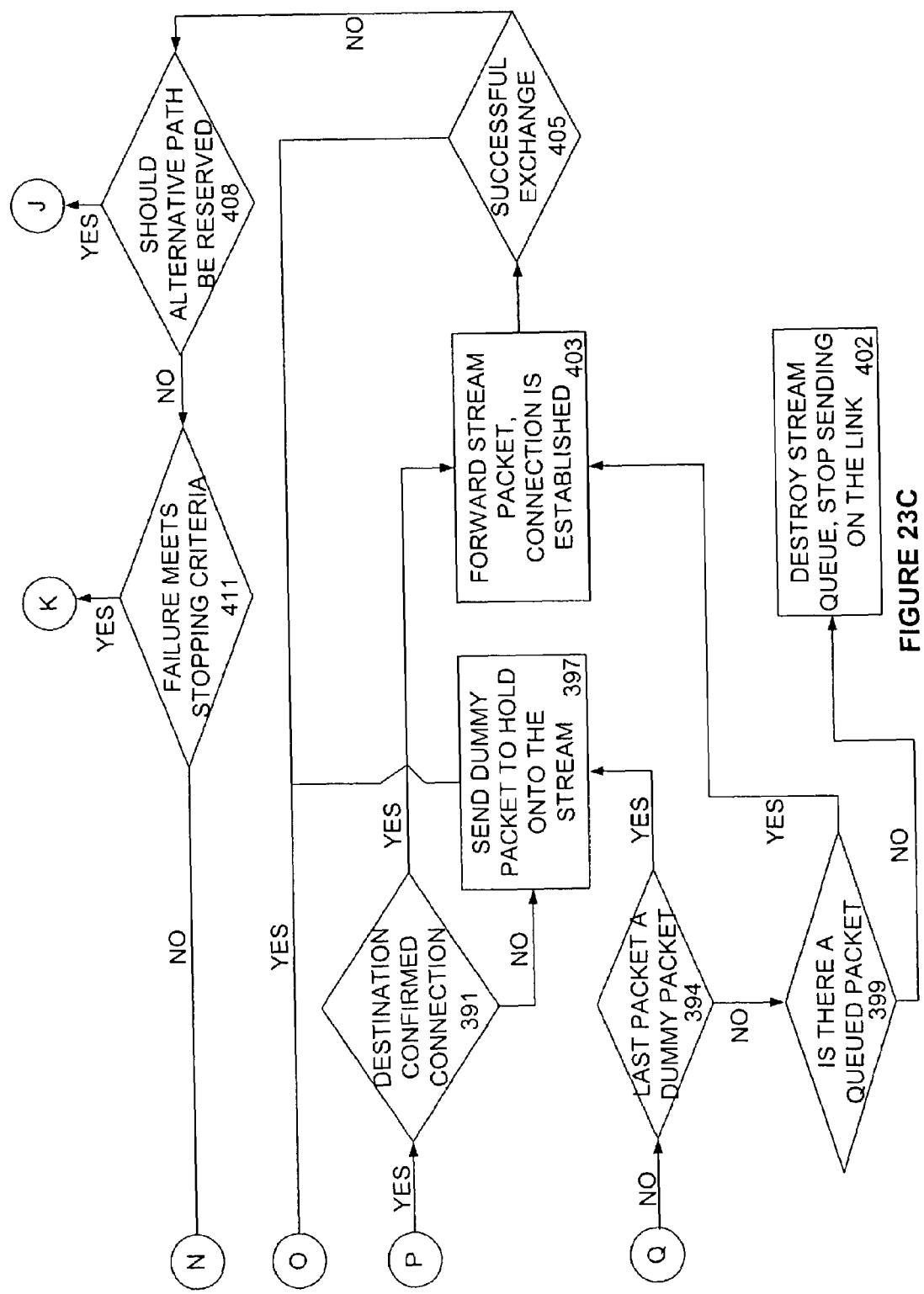

NSR together with SCR easily accommodates most QoS routing concerns. FIGS. 23A-23C illustrate the process.

FIGS. 23A-23C illustrate a flow chart of NSR's path reservation process. A node starts its participation in the path reservation process when an application at "this" node requests 350 the service or when the node first receives 352 a CBR setup packet from a distant node. The node then inquires 354 if this reservation is part of a larger stream, i.e. a stream requiring more than one transmission slot per frame, with a queue already assigned to another slot. If the answer is yes then this stream's queue is also used 357 for this slots packets. Otherwise the node creates 359 a new queue for this stream. The node then determines 361 the full route to the destination and its next hop. The node then inquires 363 if the destination can be reached within the delay constraint specified for the stream. If the answer is yes, the node determines 366 the window of slots within a frame that it can use for the stream and then proceeds to try to reserve one of these slots. As the next transmission slot starts the node asks 368 if the current slot is within the window.

If the answer is yes the node contends 372 using the QoS priority slot. The node then inquires 374 if the contention was successful. If the answer is yes, then the node advances considering the link successfully reserved 377. If the slot was not in the frame window or if the contention was unsuccessful the node waits 378 until the next slot. Before proceeding the node inquires 380 if it has take too long to reserve the slot. If the answer is no then the process returns to the point where it inquires if the transmission slot can be used for the stream.

Once a link is reserved, the node cycles through the transmission slots and inquires 383 at each slot if it is the reserved transmission slot. If the answer is no the node waits 389 until the next transmission slot and asks again. If the answer is yes the node tries to determine what type of a packet to send. It first asks if this node 386 is the stream source. If the answer is yes the node inquires 391 if the connection is still being constructed or if it has received confirmation that there is a connection. If the node is not the stream source it inquires 394 if the last packet it received from the first node upstream was a dummy or payload packet. If the node is the source and a connection has not been established or if the last packet received from the node upstream was a dummy packet then this node too will send 397 a dummy packet in this reserved slot. After sending the dummy packet the node returns to the inquiring 383 if each slot is part of the reservation. If the node last received a payload packet from the upstream node then the node inquires 399 if there is queued packet available for transmission. If the answer is no, then the stream is considered to be dead and the node destroys 402 the queue associated with the stream. If there is a queued packet or if the node is the stream source and a connection has been established then the node forwards 403 the packet to the next node. The node then inquires if the exchange was successful and likely to remain successful for future slots 405. It the answer is yes then the node returns to the block that inquires 383 whether each slot is a reserved slot for the frame. If the answer is no, the node inquires 408 if it should begin finding an alternative path to the destination. If an alternative path should be sought, the node returns to the block that determines 361 a route to the destination. If the answer is no then the node inquires 411 if the current link condition warrants breaking the connection. If the answer is no, then the node returns to the block that inquires 383 whether each slot is a reserved slot for the frame.

If a route cannot be found to the destination, if it takes too long to reserve a link, or if the connection fails and this meets the stopping criteria then the node will consider there to be no path to the destination. The node sends a packet to the previous node or the generating process that a path is not available through this node and it also destroys the stream's queue 414.

The basic unit of a QoS connection is a transmission slot reserved for a hop each CBR frame. Reserving multiples of these transmission slots reserves bandwidth. To create a multihop connection, a node starts by reserving a transmission slot on the first hop of the route. If the node is successful in its contention then it sends a packet describing the connection required that includes the delay constraint and the destination ID. The source node continues to send 397 this packet in the same slot of each subsequent frame until a connection is established or it receives feedback that a connection cannot be made 414. In turn, the first hop destination attempts to reserve a transmission slot along the next hop of the path in the same manner and then sends the same setup packet. This continues until a connection is established to the final destination. If the connection requires a bidirectional link the process repeats itself in the reverse direction. Nodes send their payload once they receive confirmation that the connected path has been established. The connection is maintained so long as it is used.

Delay constraints are met in the manner the slots are reserved on each hop. Each node on a route is selective as to which transmission slots it attempts to reserve within a CBR frame 363-382. Each node first estimates 361 how many hops there are to the final destination. It uses this estimate and the path delay constraint to identify 366 a suitable range of transmission slots within which to reserve a transmission slot. For example, say there are 3 hops to the final destination and the connection will allow 15 slots of delay. The first node would then attempt to reserve one of the first 5 slots that follow the slot on which a packet arrives. If the node is unsuccessful at reserving one of these five slots in the first frame it waits until the subsequent frame and attempts again. If, for example, the node is successful at reserving the third slot following the arrival, then the next node would have a window of 6 slots, half of the 12 remaining, from which to reserve the next hop link. Variants of this connection protocol can be created to account for congestion and other factors so that nodes upstream are allowed a larger window of slots to choose from.

Physical Layer Integration

NSR and SCR exploit certain physical layer capabilities if they are available. Similarly, these physical layer capabilities can enhance the performance of this invention.

Synchronizing and Locating Nodes

Synchronizing and locating nodes may be services that are provided by external physical devices 4, from the physical layer itself 3, built on top of the present invention, or through a combination of these factors. When the service is externally provided, SCR synchronizes its clock to that of the external device and NSR collects location readings as necessary. To provide services on top of this invention requires two or more nodes to be surveyed into position and then for one node to serve as the clock reference. Location and time synchronizing is achieved using multi-collateration algorithms. Multi-collateration algorithms use the time of arrival of signals and reported locations of sources. Separation distances amongst nodes can be calculated using the propagation delay amongst multiple signals. The signals that SCR provides for these measurements are the RTS 24 and the PDU packet transmissions 26 of node state packets. Node state packets would be used since they contain the location of the source and are received by all neighbors. RTS and PDU packet transmissions are used since they occur at fixed times. Integrated use of the physical devices and services on top of this invention eliminates the requirement to survey nodes into positions and for any node to serve as a reference clock. Rather the physical devices provide these functions. Both methods would be applied when some network nodes do not have the physical device or when the reliability of the physical device may deficient on account of the environment. Nodes with reliable information from the physical devices would be references and all other nodes would synchronize and locate themselves using the services of the protocol built on top of this invention. States may be added to the node state packets to support these methods.

Received Signal Strength Measurement

In order for nodes to measure propagation conditions it is necessary for the physical layer to provide received signal strength measurements. At the very least, nodes would use these measurements to calculate path loss exponents for their node states. Algorithms that are more complex may be developed and used to characterize the propagation conditions across the network area for more accurate connectivity predictions.

Power Control

SCR can exploit the power control capabilities of transceivers in three ways. First, the power level used in signaling can be adjusted to control the separation distance amongst signaling survivors. Second, power can be used to control the average degree of the network. (Degree of a network is the average number of neighboring nodes that nodes can communicate directly without routing through intermediate nodes.) Some method is used to determine the range of a transmission that is necessary to achieve the appropriate degree. The maximum transmission power level is then selected to achieve this range. The final use of power control is to conserve energy and to improve network performance. After receiving the RTS from a source, the destination provides feedback to the source if it can reduce its transmission power level for the subsequent packet transmission. Since nodes may only reduce their transmission power between the RTS and the PDU, interference from distant nodes can only decrease for the PDU packet exchange.

Code Division Multiple Access (CDMA)

If transceivers provide CDMA capabilities then this invention can exploit them. As described above, SCR's signaling separates nodes and through NSR nodes can select their own receiver directed spread spectrum codes and disseminate them. After winning a contention, survivors can code-multiplex different packets for different destinations since each packet can be spread with a unique code. Survivors learn the codes of their neighbors through the NSR protocol. The RTS packets to these destinations can specify which codes the distant nodes should use in transmitting their CTS packets.

Directional Antennas and Space Division Multiple Access (SDMA)

If a node can steer a beam, then the node states of transmission destinations can be used to identify the direction to steer the beam. Beam steering can improve the success of packet exchanges by reducing the interference experienced by other nodes that are exchanging data.

The present invention can also exploit the use of smart antennas. A smart antenna system combines multiple antenna elements with a signal-processing capability to optimize its radiation and/or reception pattern automatically, such as acting either omnidirectional or directional, in response to the signal environment. Smart antennas enable a single a single node to steer multiple beams to different destinations and thus multiplex the transmission and reception of packets. Smart antennas can be used together with any deliberate attempt to transmit to or receive from multiple neighbors. Smart antennas can be used together with the CDMA to better isolate the transmitted and received multiplexed signals.

According to one embodiment, each node has plural transceivers on the wireless channel, each of the transceivers having its own antenna. One of the plural transceivers serves as the master transceiver for the ad hoc network and the remaining transceivers serves as slaves transceivers. Preferably, the master transceiver has an omni directional antenna and a directional transmission antenna; the slave transceivers each have a directional transmission and directional reception antenna.

Network Optimization Techniques

The present invention provides two network optimization mechanisms that can be used to actively manage networks during their use to improve their performance. The first method has been described above. The power level used in signaling and for transmissions can be controlled to select the average separation distance of signaling survivors and to select the network's degree of connectivity. Higher degrees of connectivity suffer fewer network partitions. Simulation results of the effectiveness of this technique are illustrated below. The second optimization technique is to use wormholes to engineer traffic. That is, wormholes are placed in the network for no other purpose than to provide alternative paths between points in the network. The metrics assigned to each wormhole would encourage nodes to route traffic through it rather than the multihop paths through nodes. It is assumed that some sort of network management facility would monitor network use and then direct the traffic engineering activity. Wormholes may be dedicated links across a different interface at each node but may also be formed using the multihop stream based connections described earlier. Upon identifying a need for such a wormhole and identifying the availability of resources, the network management entity would direct the construction of the wormhole. When using resources on different interfaces, the network management facility simply directs the nodes at the wormhole ends to set-up the connection.

The node at the wormhole entrance then has the responsibility to create and advertise the wormhole's state. The metric for the wormhole is specified, however, by the network management entity. When using stream based connections the management entity informs all nodes on the path that they will create a wormhole. The intent is to allow the management entity to select a path that will bypass congested regions of the network. The management entity then specifies the delay and bandwidth requirements for this connection. The node at the front end of the wormhole then begins the process of creating the connection as described earlier in the description of setting up stream-based connections.

After creation of this type of connection, the node at the entrance starts to advertise it as a wormhole. It collects and disseminates the wormhole's state information. The network management activity, however, assigns the metric for the wormhole. The node at the wormhole entrance also has the responsibility to maintain the wormhole once it is created.

When the wormhole is not being used to send data packets the entrance node sends dummy packets to hold onto the connection. These dummy packets may be node state packets. The algorithms used by the management entity to identify the need for these types of wormhole links and then to assign the wormhole metrics exceed the functionality of this invention.

EXAMPLES

SCR Performance in Flat Networks with Uniformly Distributed Nodes

Figure 24:
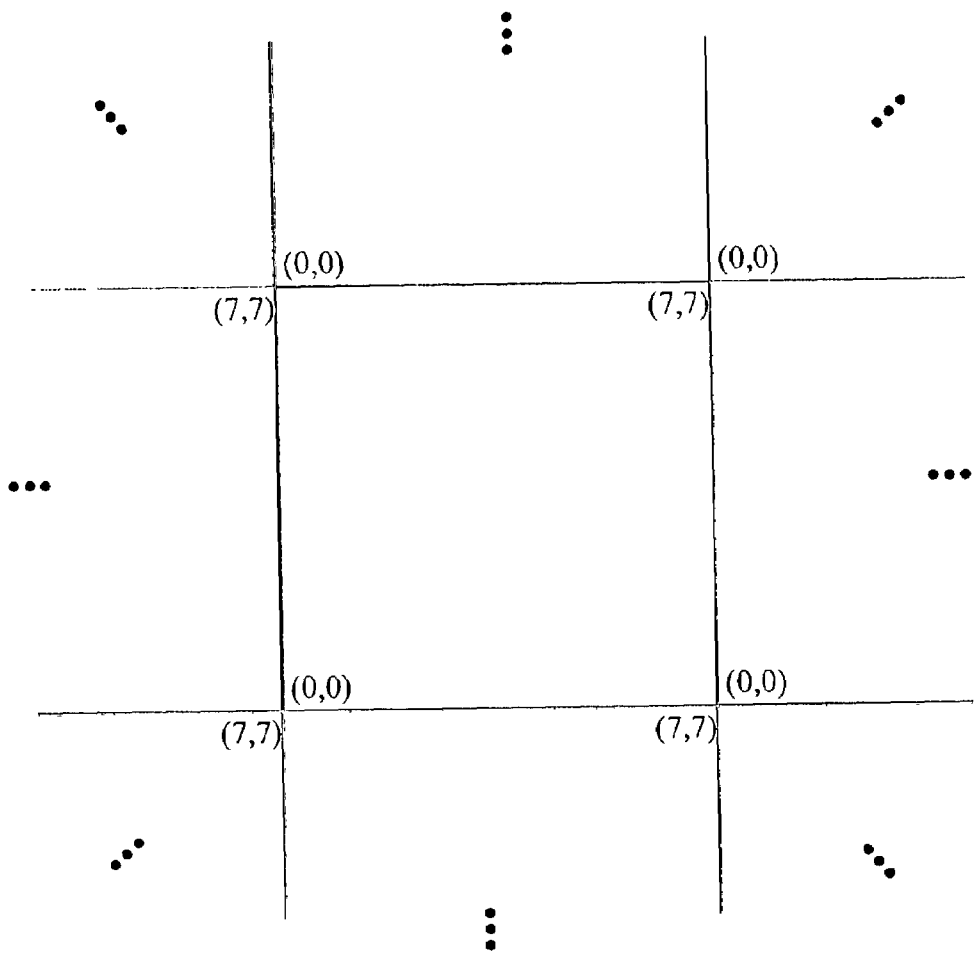
FIG. 24 illustrates the spherical wrapping of a network area that is used in simulation to obtain data without the influence of edge effects.
Figure 31A:
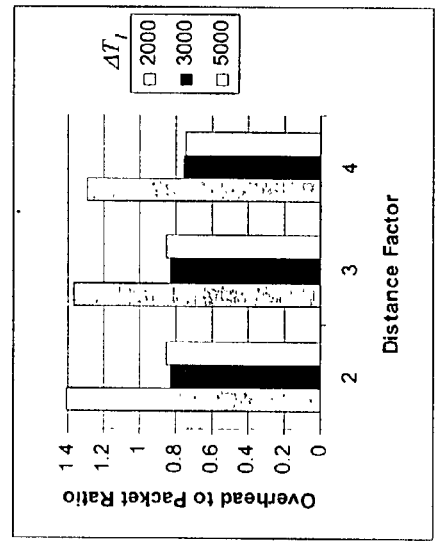
FIGS. 31A-31C illustrate simulation results of the performance of this invention in a network with density $\sigma_A=10$, where all nodes move at a rate of 0.00005 of transmission range per transmission slot, and new packets are created at nodes at a spatial rate of $\lambda_A=0.05$.
Figure 31B:
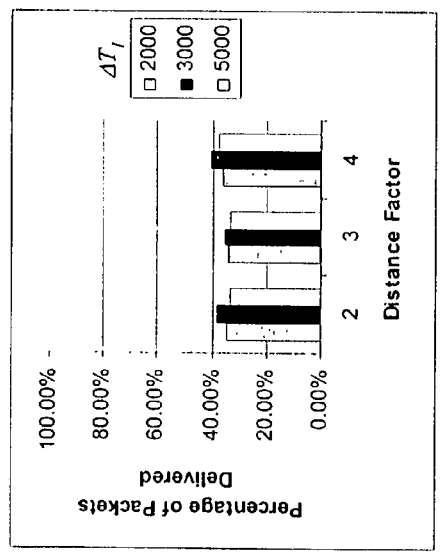
Figure 31C:
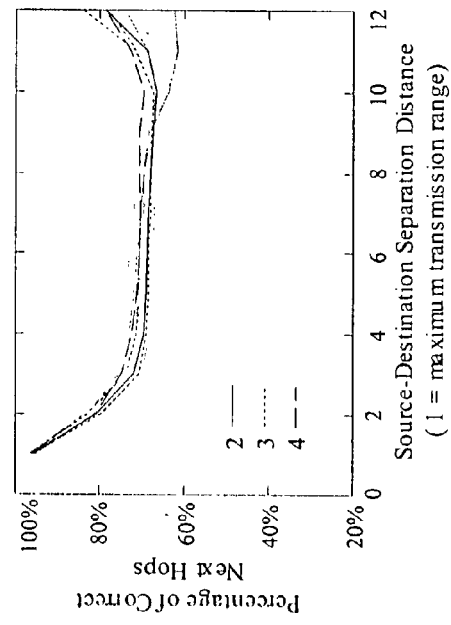

The performance of different signaling parameters was tested in a simulation environment. The simulation randomly placed nodes on a 7×7 unit square grid at the density specified for the simulation run using a uniform distribution. The length of a unit corresponds to the range of a radio. This simulation model considers the grid to be wrapped "spherically" so there are no boundaries. (A square grid is spherically wrapped around by considering all corners and opposite edges to be neighbors as illustrated in FIG. 24.) In this description $\sigma_A$ denotes the density of nodes in a network and is defined as the average number of neighboring nodes that are within range of each node in the network.

The first simulations demonstrate the effectiveness of different signaling parameters. Each set of signaling parameters were tested in a series of 30 placements and the 500 contentions at each placement. All nodes contended each time. FIGS. 25A and 25B illustrate the probability distribution and the cumulative distribution of the separation distance between a survivor and it's nearest surviving neighbor after signaling. The density of nodes in this example is $\sigma_A=10$. Several sets of signaling parameters were tested. Each curve is labeled by the total number of signaling slots that were used in the collision resolution signaling. The exact parameters for the signaling are listed in Table 3 below.

TABLE 3

Signaling parameters used in simulations

| SLOTS | h | l | m | R | Q | p |
|---|---|---|---|---|---|---|
| 23 | 2 | 9 | 12 | .92 | .65 | .88 |
| 14 | 2 | 5 | 7 | .90 | .45 | .84 |
| 10 | 2 | 4 | 4 | .90 | .36 | .75 |
| 8 | 2 | 3 | 3 | .90 | .24 | .71 |

The results demonstrate that the signaling is effective at separating survivors. The probability that a second survivor is within range of a survivor's transmission is consistent with that predicted by equation (4) and illustrated in FIG. 10. Also, the bulk of the survivors are within a range of 1 and 1.5 times the range of the radios. FIGS. 26A and 26B are more graphs of the simulations of the 23 and 8 slot cases but compares the results between when $\sigma_A=10$ and $\sigma_A=25$. These figures illustrate that the results are a function of the signaling parameters not the density of the contending nodes.

A second set of simulations use the same simulation scenario but tests the effect of load on the capacity of the protocol. The measure of capacity used is spatial capacity, $U_A$, with units of throughput per unit area, packets/sec/area. All measurements are normalized to the range of a transmitter so the unit of area is the area subsumed by a transmission, $\pi$ square units. The load is also measured as a function of area. $\lambda_A$ denotes the spatial arrival rate of packets. It is defined as the arrival rate of packets to all the nodes in a transmission area. Thus, the packet arrival rate per node within a transmission area is $\lambda=\lambda_A/\sigma_A$. Each simulation run included 10 node placements with 1000 transmission slots each. Contentions were driven by a Poisson arrival process with parameter $\lambda_A$. Packets that arrived at nodes were queued until they were successfully transmitted. The destination for each packet was randomly selected from those nodes within range of the source. Contentions were considered successful when the signal to interference ratio (SIR) between the source and destination and vice versa were both greater than 10 dB. The SIR was determined using the equation $$SIR_j = \frac{\frac{P_t}{d_j^n}}{\frac{N}{K} + \frac{1}{PG}\sum_{i \neq j}\frac{P_t}{d_i^n}}. \quad (8)$$

where K is a constant, $P_t$ is the effective radiated power from a transmitter, N is the background noise power, $d_j$ is the distance that separates the source from the destination, $d_i$ is the distance that separates the interfering source i from the destination, n is the path loss exponent (n=4 in all the simulations), and PG is the processing gain. Nodes signaled for access using the signaling parameters in row 1 of Table 3. FIGS. 27A and 27B illustrate the performance of the protocol when there is no processing gain and when the processing gain is 100. The results presented in FIGS. 27A and 27B demonstrate several significant traits of the SCR. First, that it does not suffer congestion collapse. Despite the increased load, the capacity of the access mechanism does not decrease. Second, it demonstrates that the density of contending nodes does not decrease the capacity. In fact, it increases the capacity. Third, it demonstrates that there is a diminishing return in capacity improvements as the density increases. A density of 10 nodes appears to offer the best performance. Finally, the performance of SCR can be improved by improving the capture conditions. The use of spread spectrum with a processing gain of 100 nearly tripled the capacity of the protocol.

Additional simulations were executed with the combined use of SCR and NSR. The simulation environment consisted of a square simulation area with a side dimension of 8 units. Nodes were placed on the simulation area according to a uniform distribution. In these simulations nodes moved. A simulation parameter for the nodes was there speed of movement. All nodes moved at the same speed and moved all the time. Each node randomly selected a point in the simulation area and moved directly to that point at the specified speed. Upon reaching the destination point the node then selected a different destination point and repeated the process. The effect of this type of movement is loss of the uniform distribution with a certain amount of congestion in the center of the simulation area.

Nodes use NSR to build and maintain their understanding of the network topology. Node states were disseminated using the diffusion process described by equation (7) with varying values of the parameters C and $\Delta T_1$. Only 9 sets node states were disseminated in each node state packet. Node states packet transmissions were governed by a minimum time between updates (MTBU). The node states included in these node state packets were selected using the following rules. (1) Send an update if at least one state meets the update criteria. (2) Advertise states with critical state information first (i.e. states of one hop neighbors that change their channel identifier). (3) Advertise states that meet the update criteria starting with states for nodes that are closest. (4) If no more states meet the update criteria, advertise the node states with the greatest discrepancy between their timestamp and the time that the node state was last advertised. The connectivity between nodes was predicted using equation (2) and the metrics for all predicted links were calculated using equation (3). The signaling parameters were the same as those in row 1 of Table 3.

The simulations considered three update rate, $\Delta T_1$, of 2000, 3000, and 5000 transmission slots, two MTBU constraints, MBTU=32 transmission slots when $\Delta T_1=2000$ and MBTU=50 otherwise, three distance factors, C, of 2, 3, and 4, two node speeds, 0.00001 and 0.00005% of the transmission range per transmission slot, and finally two sets of node densities, $\sigma_A=5$ and is $\sigma_A=10$. Table 4 lists the corresponding land speeds in kilometers per hour (kph) based on ranges and data transmission rates. New packets were created at nodes at a spatial rate of $\lambda_A=0.05$ and the destination for each packet was randomly selected from amongst all the nodes in the network.

TABLE 4a

Node velocities in kilometers/hour
(0.00001 of transmission range per transmission slot)

| Bit Rate | Radio Range (meters) | | | |
| --- | --- | --- | --- | --- |
|  | 200 | 250 | 400 | 1000 |
| 1000000 | 1.30 | 1.63 | 2.60 | 6.51 |
| 2000000 | 2.60 | 3.26 | 5.21 | 13.02 |
| 11000000 | 14.32 | 17.90 | 28.05 | 71.61 |

TABLE 4b

Node velocities in kilometers/hour
(0.00005 of transmission range per transmission slot)

| Bit Rate | Radio Range (meters) | | | |
| --- | --- | --- | --- | --- |
|  | 200 | 250 | 400 | 1000 |
| 1000000 | 6.51 | 8.14 | 13.02 | 32.55 |
| 2000000 | 13.02 | 16.28 | 26.04 | 65.10 |
| 11000000 | 71.61 | 89.52 | 143.23 | 358.07 |

FIGS. 28A through 31C show the results of the simulations. FIGS. 28A, 29A, 30A, 31A illustrate the percentage of packets of those generated that were delivered. FIGS. 28B, 29B, 30B, 31B illustrate the overhead to packet ratio for the different sets of simulation parameters. FIGS. 28C, 29C, 30C, 31C illustrate a comparison of routing table accuracy. The measure of accuracy is the percentage of time the route tables have the same first hop toward the destination as they would have if the nodes had perfect state information. Note that a different first hop is not an indication that the route it supports is bad.

These results illustrate that there is a very definite interaction between the network types and the performance of the different diffusion parameters. As expected, density affects connectivity. Indeed, at a $\sigma_A=5$, more than 50% of source-destination (SD) pairs did not have a path between them while at $\sigma_A=10$, less than 1% of the SD pairs did not have paths in low speed scenario and less than 10% in the high speed scenario. This greater connectivity results in more packets being delivered when the density is 10 as opposed to when it is just 5., but, this result is deceiving. Based on the connectivity, the 5 node density networks achieves better than 90% success in delivering the packets that can be delivered. In most cases, higher diffusion parameters improved performance in two of the measured characteristics, increasing the percentage of packets delivered and decreasing the overhead to packet ratio. The diffusion parameters had a minor effect on the routing table accuracy. The more interesting effects are those of speed on overhead ratios and density on routing table consistency. At the higher speeds the overhead increases dramatically. The increase in overhead is attributed to two factors, the increased occurrence of changing channel identifiers that result in the more frequent updating of neighbor states and the increased likelihood that the loop escape mechanism is triggered. We point out that a risk in diffusion updating is that nodes receive so many updates of close in neighbors that it precludes their having up to date states in their tables for distant 1 nodes. Neighboring nodes can have very different views of the network and looping is more likely. In such networks slower updates are appropriate as is demonstrated in our results. Clearly, increasing the diffusion parameters decreased the overhead, increased goodput, and had little effect on routing table accuracy. Higher densities of nodes can have a similar effect on the propagation of nodes states thus warranting higher diffusion parameters as well. The density of the networks affects the routing table accuracy on account of the metric used in the simulation. This metric prefers shorter hops to long hops. With higher densities, nodes are closer to each other, which results in fewer nodes being potential next hops. With next hops being closer, they will remain viable for longer periods of time so larger diffusion parameters are appropriate.

Figure 32:
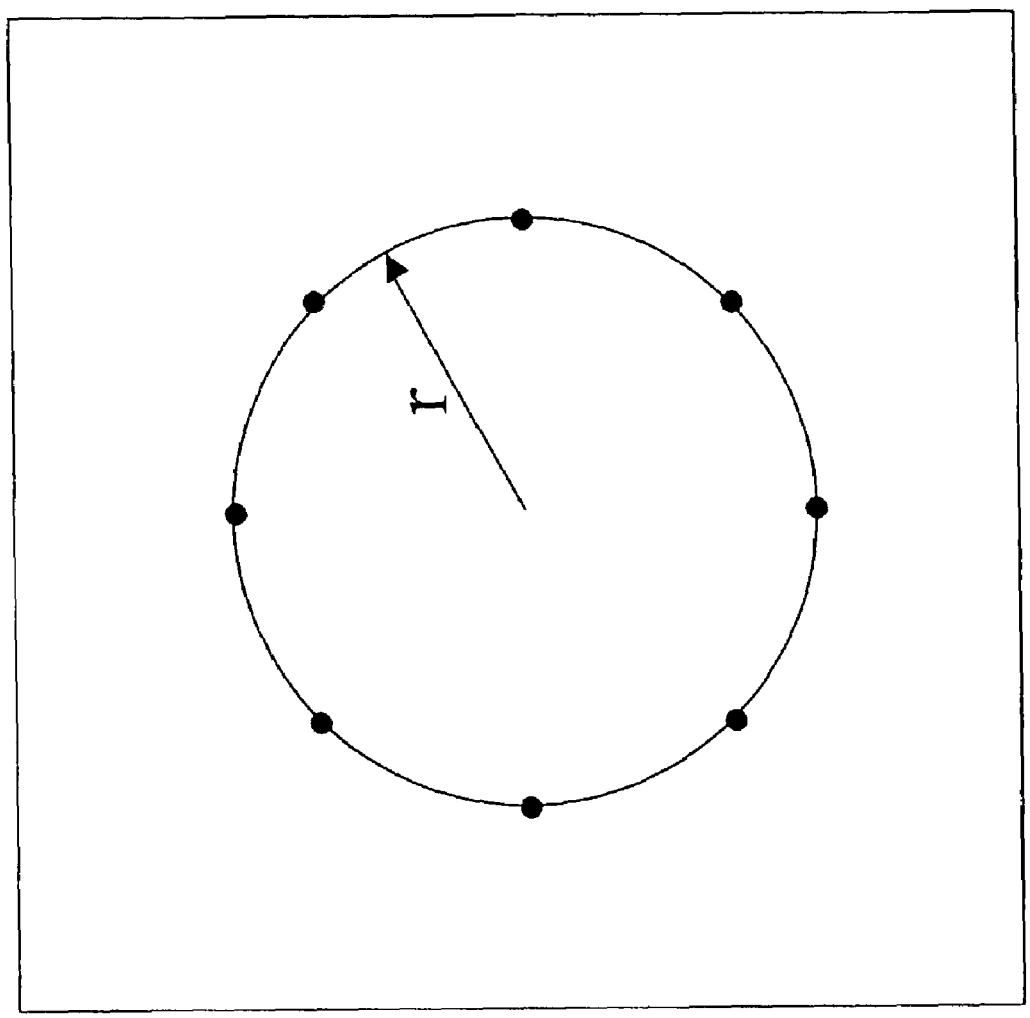
FIG. 32 illustrates a circular wormhole structure used to demonstrate the effectiveness of wormholes in improving the performance of ad hoc networks.
Figure 34:
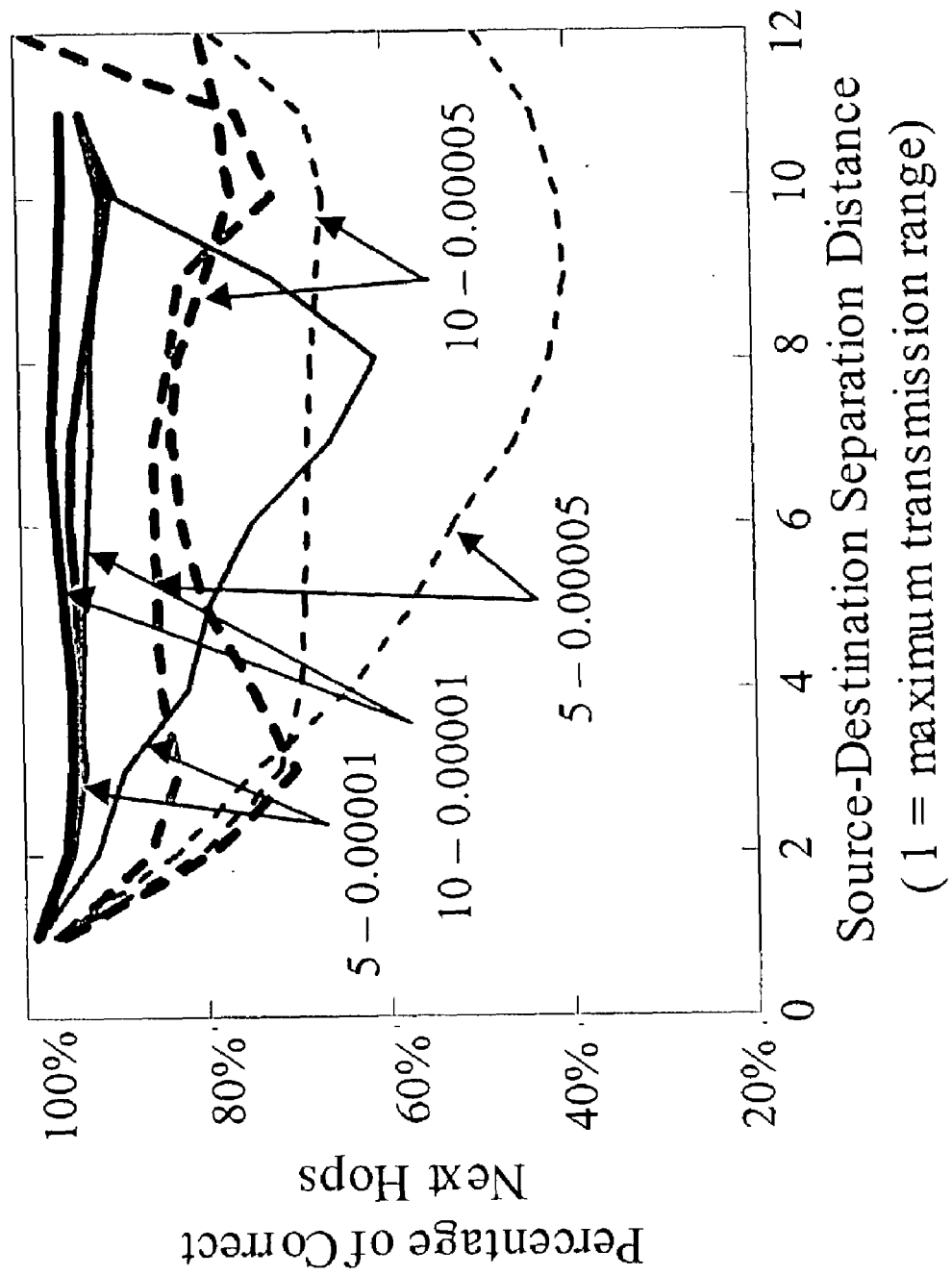
FIG. 34 illustrates the routing table accuracy of networks with and without wormholes for common scenarios of the mobile nodes.

As an additional example of the effectiveness of the present invention, the simulations above were repeated with the wormhole structure illustrated in FIG. 32. Eight endpoints are equispaced on a circle of radius r to form 56 wormholes. The simulations above were repeated with the very same movement patterns and packet arrival rates. FIGS. 33A-33C illustrates the effect on network performance. FIG. 33A illustrates the percentage of packets that are delivered to their destination before timing out. The low density networks greatly benefits from the use of the wormholes primarily on account of the improvement in connectivity. The percentage of source destination pairs without routes decreased from over 53% and 55% to less than 10% and 30% respectively for the low speed and high speed scenarios. In all cases, the low density wormhole networks delivered nearly 100% of the packets that could be delivered. The wormholes had little to no effect on the connectivity of the high density networks but, nevertheless, markedly increased the percentage of packets delivered. The cause of the improvement is seen in the next graph, FIG. 33B, which shows a marked decrease in channel usage. The wormholes pull a substantial amount of the traffic away from the ever-changing wireless links. FIG. 34 illustrates routing table accuracy. The measure of accuracy is the percentage of time the route tables have the same first hop toward the destination as they would have if the nodes had perfect information about the node topology. These stationary wormholes greatly improve the consistency of routes, especially at the longer distances and for networks with high mobility. Note that in FIG. 33C that the presence of wormholes had little effect on the state dissemination overhead. State dissemination is based on update parameters and is executed independently of payload delivery. The overhead to payload ratio increases on account of the decreased use of the channel to deliver payload. Clearly, wormholes can be used to improve the performance of networks and to engineer traffic.

Figure 35:
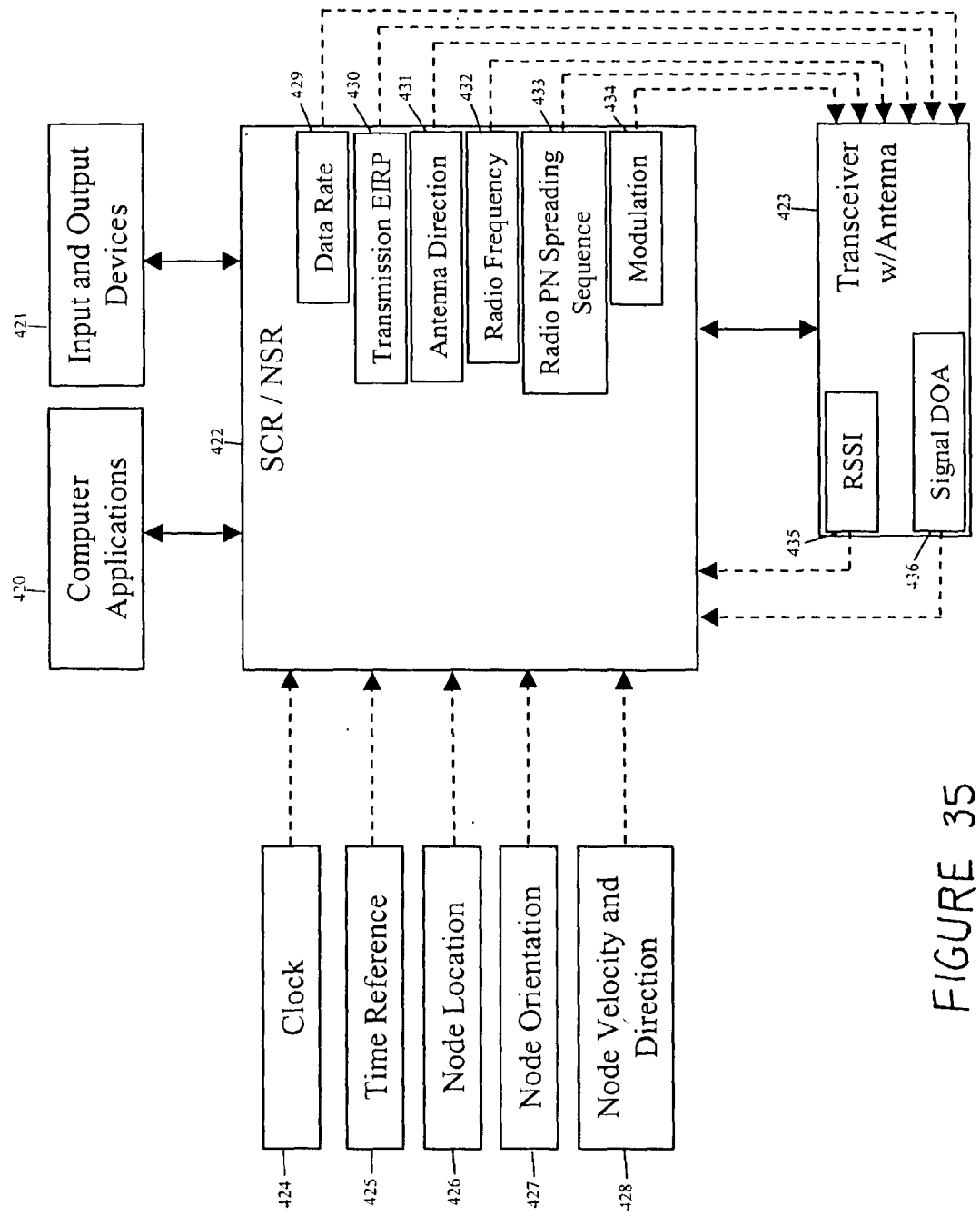
FIG. 35 illustrates the inputs and outputs of the invention with devices and software.

FIG. 1 illustrates the interfaces between the SCR and NSR protocol and between these protocols and other physical devices, computer applications, and networking protocols. As such, the methods of SCR and NSR are embodied in software with interfaces for physical inputs and outputs and the movement of packets to and from applications and the physical devices that this invention controls. FIG. 35 illustrates possible inputs to the protocol from devices, possible outputs from the protocol to control radio components, and packet interfaces to and from radios and other software components and hardware devices. The SCR/NSR 422 receives a clock signal 424, a time reference 425 for that clock that is used to synchronize nodes, the node's location 426, the node's orientation 427, and the node's velocity and direction 428. This information may come from one of several physical devices or may be algorithmically resolved by other protocols that operate on top of the SCR/NSR. The SCR/NSR 422 receives the receive signal strength indication (RSSI) 435 and possibly the direction of arrival (DOA) of a signal 436 from the transceiver 423. In turn, SCR/NSR 422 may set several of the transceiver's 423 transmission properties, for example, data rate 429, transmission effective isotropic radiation power (EIRP) 430, antenna direction 431, radio frequency 432, the pseudo-noise (PN) spreading sequence 433, and the modulation method 434, e.g. binary phase shift keying, quadrature phase shift keying, etc. The NSR/SCR 422 may exchange packets with a number of devices and applications. It may exchange packets with a local computer application 420, with attached input and output devices 421, e.g. cameras, microphones, sensors, video screens, speakers, actuators, appliances, etc., and with the transceiver 423.

Figure 36:
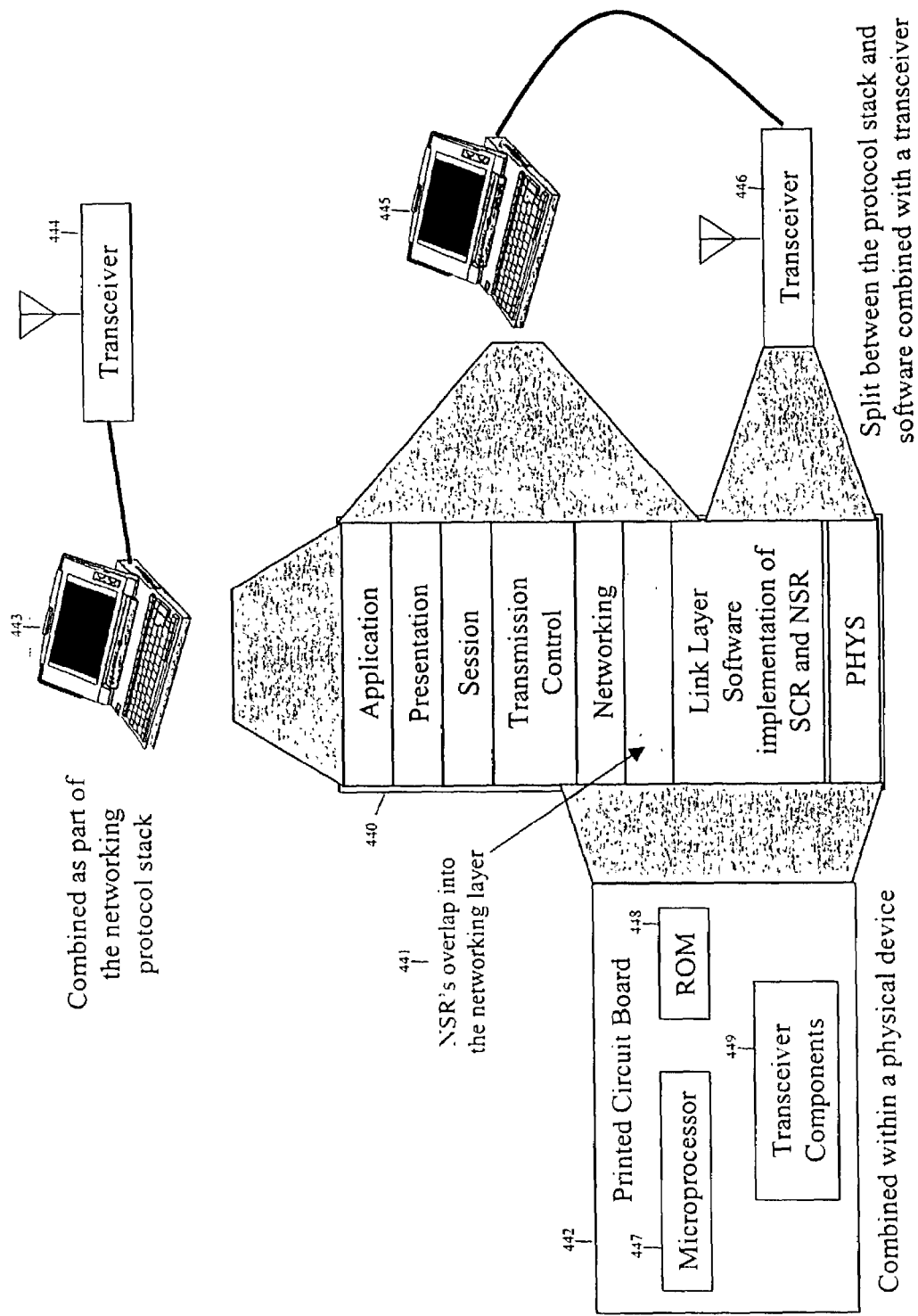
FIG. 36 illustrates the placement of this invention within the Open Systems Interconnection (OSI) protocol stack.

FIG. 36 illustrates the placement of this invention within the Open Systems Interconnection (OSI) protocol stack 440. SCR and NSR exist primarily as the link layer protocol although NSR clearly has functions that extend into those normally considered part of the network layer 441, namely routing. As a link layer protocol, SCR and NSR are tightly coupled with the physical layer. As such, the physical embodiment of this invention may take one of three general forms: first, as software in read only memory (ROM) 448 that is combined with a microprocessor 447 and transceiver 448 on a printed circuit board (PCB) 442; or, second, as software totally integrated with other networking software on a computer 443 that is then connected to a transceiver 444. Finally, the requirement to tightly control the timing of events may require practical embodiments to split the functionality of the invention between the ROM in a transceiver 446 and the networking software on a computer 445. The embodiment used would depend on the application. An application that supports input and output from sensors, actuators, appliances, and video and audio devices would most likely implement the invention on a PCB 442. An application for networking of personal computers (PC) may provide a transceiver card with a combination of the transceiver hardware and software 446 and then the bulk of the networking software would be loaded on the PC 445. A military application, where the radios are already well defined, may require the software to be loaded entirely within a computer 443 that attaches to and controls the transceiver 444.

Figure 37:
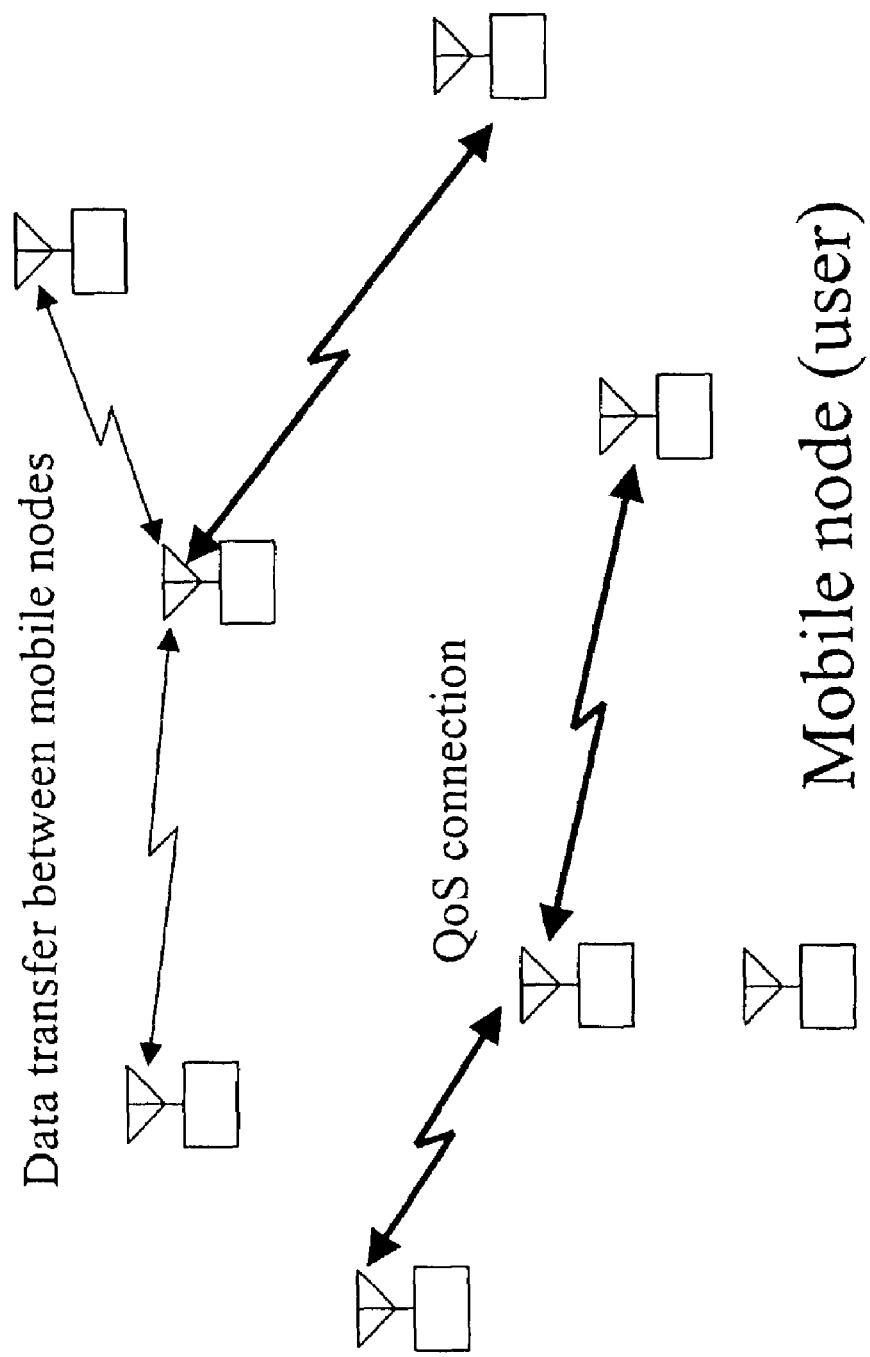
FIG. 37 illustrates an example ad hoc network made of mobile nodes.
Figure 38:
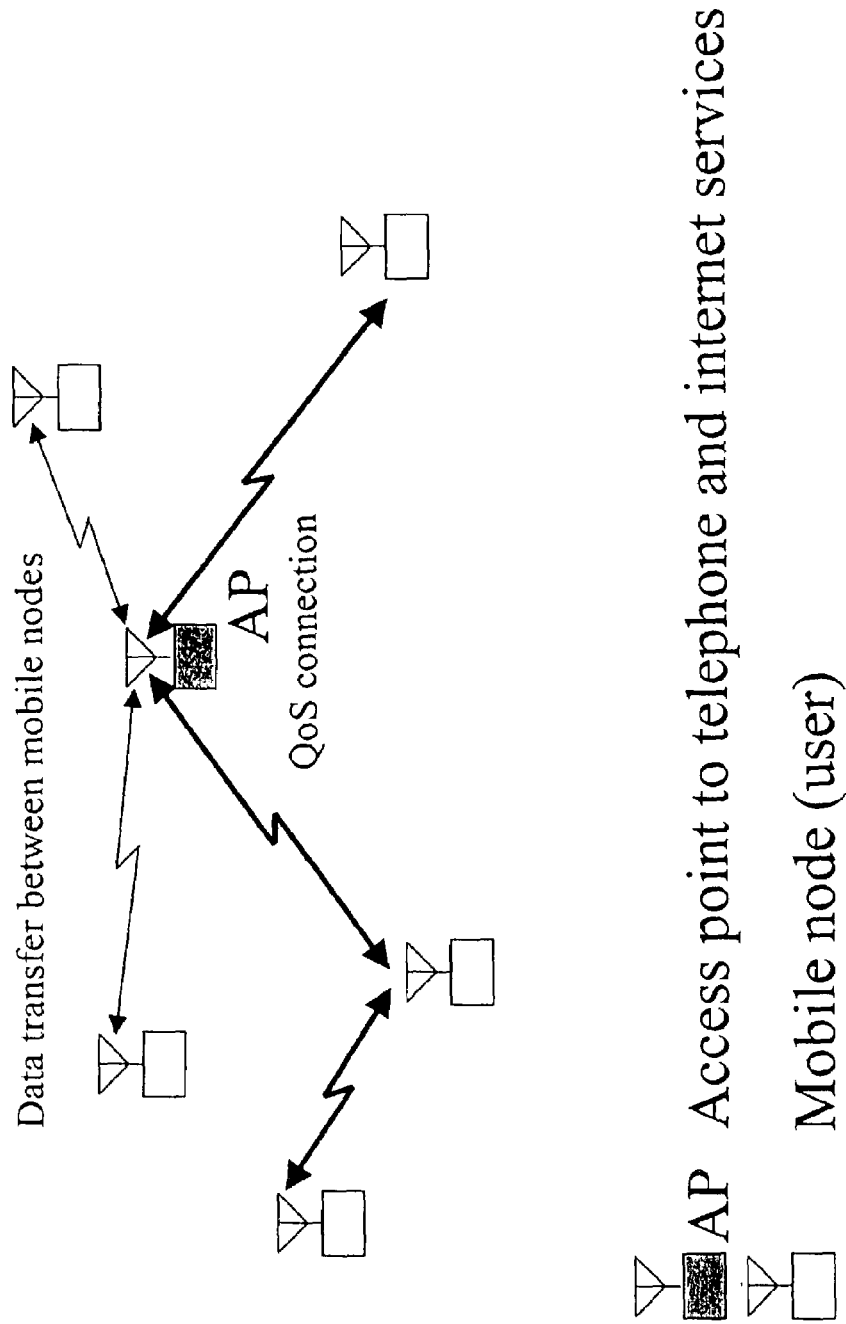
FIG. 38 illustrates an example ad hoc network made of mobile nodes communicating to a service access point.
Figure 39:
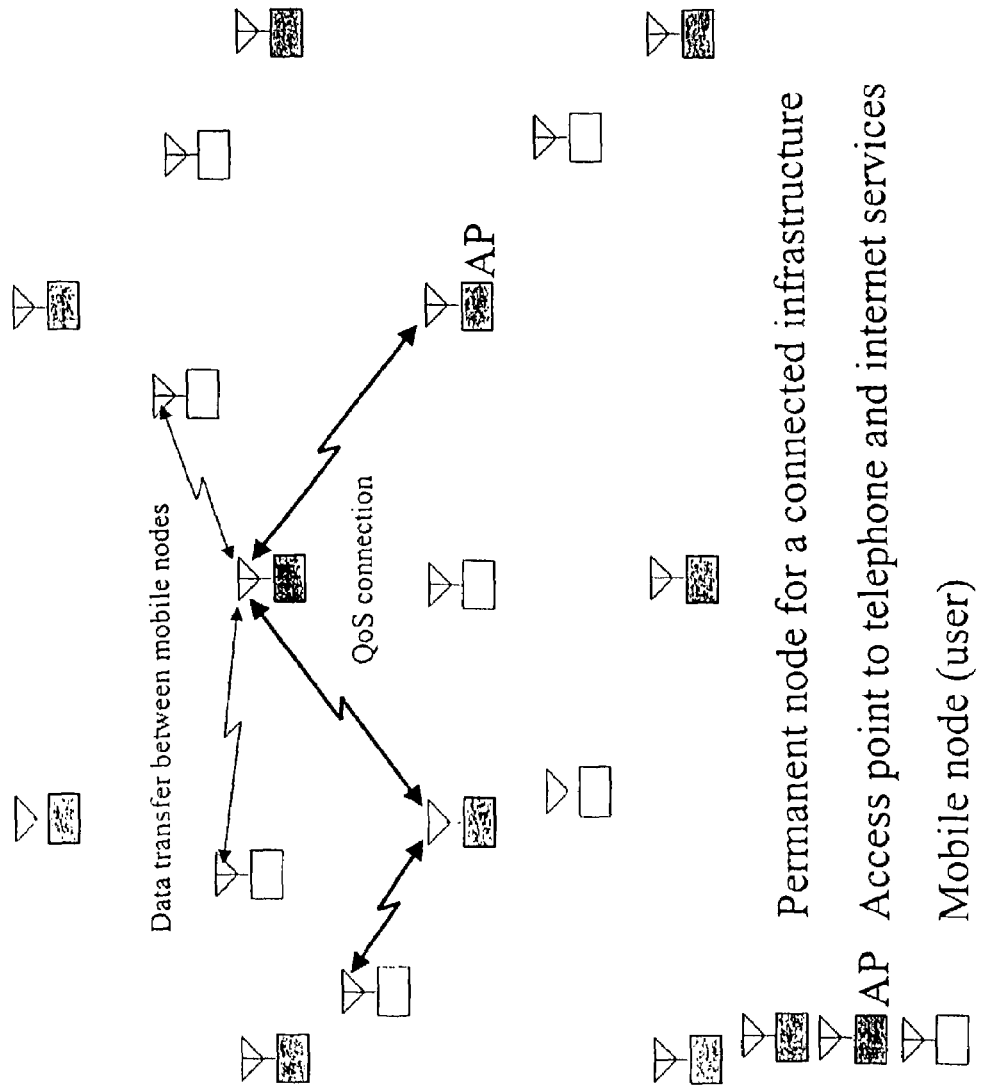
FIG. 39 illustrates an example ad hoc network of mobile nodes enhanced with an infrastructure of fixed nodes and access points.

FIGS. 37, 38, and 39 illustrate the most general of networking approaches where this invention could be used. FIG. 37 illustrates a purely mobile network where all nodes are equivalent. This type of ad hoc network could be created anywhere with any number of devices. FIG. 38 illustrates a network with an access point (AP). The distinction between this network and that depicted in FIG. 37 is that in FIG. 38 most traffic would go between mobile nodes and the AP. The AP is likely to provide special services such as access to the Internet, cable video, or the telephone system. FIG. 39 illustrates a wide area networking environment that may be found on a campus or in a city. It consists of mobile nodes, access points, as well as an infrastructure of fixed nodes. The role of the fixed nodes is to support connectivity in the network. These fixed nodes may be the endpoints of wormholes.

These networks have military, civil, and commercial uses. The ability to create a network without any fixed infrastructure as depicted in FIG. 37 makes the networks ideal for ad hoc creation of networks as would be required in military applications and civil emergency use. The fact that these purely ad hoc networks can be enhanced by the presence of infrastructure as depicted in FIGS. 38 and 39 makes this network an all purpose solution for mobile communications. The loss of infrastructure does not preclude communications. Infrastructure, merely enhances it. In this way, the present invention becomes the basis of an all-purpose communications device.

FIG. 40 illustrates the role this invention may play in a home. Any computer or computer peripheral in the home could be outfitted with this invention and thus be connected. This would allow direct communications between computers allowing computer-to-computer gaming, remote printing of documents, and access to Internet services provided from a central node in the home. The central node concept allows for the easy access to services that may be provided by a cable company. Television and telephones could be outfitted with this invention allowing them to communicate with an AP provided by a cable services provider. This device could support the networking of a completely automated home as devices can be put on anything for which there may be an advantage for remote control.

There are multiple commercial wide area networking applications. A computer or device outfitted for operation at home can also become part of a commercial infrastructure. A service provider would build the infrastructure of fixed nodes and access points. Through this infrastructure and the cooperation of other mobile nodes, users could have connectivity to any computer or computer subnetwork connected to the ad hoc network. Service providers can provide numerous services including, telephone access, limited video streaming, and location based warning and advice systems. The latter concept offers many interesting possibilities. The service provider may develop a system that keeps track of traffic patterns and then warns and advises motorists of traffic congestion and possibly recommends alternative routes based on the user's destination. It can provide location based advertising or tourism information so that users can be made aware of points of interest that are close to their location. Tags based on this device can be placed on people, animals, or things. Computers can be programmed to track specific tags. For example, tags could be placed on children in an amusement park and parents could then use such a device to find them when they become separated. Tags can be placed on automobiles, trucks, or emergency vehicles so that there location can be tracked within a city.

In an embodiment of the present invention, a method of operating an ad hoc wireless network comprises synchronizing nodes on a wireless channel of the ad hoc wireless network to a common time, synchronizing channel access attempts of all nodes, using signaling to resolve access attempts between contending nodes, disseminating node states among nodes on a wireless channel of the ad hoc wireless network, inferring connectivity links between nodes based on said node states, building routing tables based on route metrics of said connectivity links, and routing packets based on said routing tables.

In another embodiment of the present invention, the method further comprises assigning said route metric for each connectivity link selected from the group consisting of energy consumption, node mobility, node activity, and trust.

In another embodiment of the present invention, inferring connectivity links comprises inferring the link to exist if a specified received signal strength $p_r$ can be achieved using the path loss equation:

$$p_r = k \cdot p_t / d^n \qquad (5)$$

where, k is a constant, $p_t$ is transmission power, d is source destination separation distance, and n is a largest path loss exponent of the two nodes on the link.

In yet another embodiment of the present invention, the method further comprises assigning a weight to each connectivity link identified, wherein each weight is calculated by the equation:

$$w_c(i,j) = \frac{c_{2j} + p_r \cdot d_{ij}^n}{\frac{e_{ri}}{e_m}}$$

where $C_2$ is energy consumed by a node receiving a packet, $p_r$ is required signal power at a destination to receive a packet, d is distance that separates the two nodes on the link, $e_r$ is a measure of energy reserve and $e_m$ is a constant larger than $e_r$ that weights an influence of the energy reserve on the link route metric.

In another embodiment of the present invention, the method further comprises calculating a lowest cost path via Dijkstra's algorithm, where cost is the sum of the route metrics assigned to the connectivity links of a path.

In another embodiment of the present invention, the method further comprises dividing the wireless channel into transmission slots, organizing the transmission slots into constant bit rate (CBR) frames, and repeating the CBR frames at a rate where one slot per frame supports a lowest CBR service.

In another embodiment of the present invention, the method further comprises dividing the transmission slots into synchronous phases, selecting a preferred subset of contending nodes with a contention resolution (CR) signaling phase, signaling the preferred subset of contending nodes to announce their intended destination with a request-to-send (RTS) phase, destination nodes responding to sources acknowledging receipt of a RTS packets addressed to them with a cleared-to-send (CTS) phase, a protocol data unit (PDU) phase for source nodes to transmit payload packets, and an acknowledgement (ACK) phase for the destination nodes to acknowledge receipt of a PDU, thereby allowing spatial reuse of the wireless channel and avoidance of collisions in transmission of data over the wireless channel.

In another embodiment of the present invention, the method further comprises dividing the CR signaling phase into multiple signaling subphases governed by a policy where nodes may signal starting or ending in specified slots, each sub-phase comprising multiple signaling slots, the signaling slots further comprising a detectable signal, a first to assert signaling phase whereby the node that signals first survives the signaling phase, a last to assert signaling phase where the node that signals last survives the signaling phase, a discrete signaling approach where single pulses are sent in each phase, and a continuous signaling approach where continuous signals starts at a slot in a first to assert phase and continues until the end of the phase or starts at the beginning of a last to assert phase and continues until a subsequent slot in the same phase.

In another embodiment of the present invention, the CR signaling further comprises differentiating constant bit rate (CBR), variable bit rate (VBR), broadcast, quality of service (QoS), and multiple best effort services comprising a first to assert signaling phase where each service is assigned a slot or group of slots, and an ordering of slot assignments that matches service priority.

In another embodiment of the present invention, the method further comprises reserving transmission slots on a use-or-lose basis comprising implementing a QoS priority for initial access to a transmission slot in a CBR frame, implementing a CBR priority for subsequent access to the same transmission slot of the next CBR frame, implementing a policy whereby only nodes that have used a QoS or CBR signaling slot in a transmission slot of the previous CBR frame may use the CBR signaling slot in the same transmission slot of the current CBR frame, implementing a cooperative signaling slot in the first position of a subsequent first to assert signaling phase that is used in tandem with the use of the CBR signaling slot, implementing a policy whereby only a service that contends using the CBR signaling slot may also signal using the cooperative signaling slot, and implementing a policy whereby destinations also signal using the cooperative signaling slot when two conditions apply: a node received traffic in the same transmission slot of the previous CBR frame from a node that used either the QoS or CBR signaling slots to gain access and the CBR signaling slot was used in the priority phase of the current transmission slot.

In another embodiment of the present invention, the method further comprises reserving transmission slots on a use-or-lose basis comprises reserving a multihop connection between end nodes that meets predetermined delay and bandwidth constraints by incrementally reserving transmission slots between pairs of nodes along the path, further comprising limiting the transmission slots that a node may reserve based on delay effects across the path, implementing a policy whereby nodes along the path hold the reserved links while waiting for a complete path to be established, and implementing a policy to automatically cancel the reserved path as soon as it is no longer used.

In another embodiment of the present invention, the method further comprises each node queuing and scheduling packets by forming multiple queues, each associated with a different priority of service, including separate constant bit rate (CBR) stream queues and variable bit rate (VBR) streams queues, providing a queue for each new CBR and VBR stream, implementing a policy to send packets from highest priority queues first, and implementing a policy to associate CBR and VBR queues to specific reserved transmission slots in each CBR frame wherein the node contends to send packets from the queues using the CBR priority signaling group.

In another embodiment of the present invention, the method further comprises recovering from routing loops by nodes identifying a loop by detecting a return of a packet that the node has already handled, the node broadcasting all node states in its node state list in sequential node state packets upon identifying a loop, the node recalculating its routing table, and the node forwarding the packet.

In another embodiment of the present invention, the method further comprises minimizing energy consumption by allowing nodes to enter low energy states, implementing a default policy whereby a node can enter a low energy state for the remainder of a transmission slot once ascertaining it has no pending traffic that slot, implementing a policy whereby nodes can enter a low energy state for a predefined period if they detect no use of the wireless channel, and implementing a policy whereby nodes coordinate with other nodes to define their own period for entering and remaining in a low energy state.

In another embodiment of the present invention, the method further comprises further comprising associating signal tones with specific source node-destination node pairs and tone multiplexing additional information to the detectable signal.

In another embodiment of the present invention, the method further comprises recovering from a condition where multiple source nodes block each other at a destination node, wherein recovering is performed by a method selected from the group consisting of detecting multiple signals arriving for the node and signal echoing to suppress interfering contending nodes, and reducing the threshold of signal detection after a transmission slot where a node has survived signaling but failed to transmit data and increasing the power used in CR signaling after a transmission slot where a node has survived signaling but failed to transmit data.

In another embodiment of the present invention, the method further comprises further comprising engineering traffic with wormholes comprising identifying nodes to participate in a given path, directing the nodes to establish the path, disseminating the path within the ad hoc network as a wormhole state, and assigning a metric to wormhole links.

In another embodiment of the present invention, the method further comprises establishing multiple routing tables for routing packets selected from the group consisting of service requirements, other user objectives, and network objectives.

In another embodiment of the present invention, the method further comprises supporting the selection of a unique channel for the exchange of peer-to-peer traffic between nodes using signaling slots comprising providing a receiver directed channel for every node, providing a broadcast channel used by every node, providing a broadcast priority group comprising a subset of priority signaling slots, implementing a policy whereby nodes listen for packets on their receiver directed channel whenever any priority signaling slot other than the broadcast priority signaling slot is used, and implementing a policy whereby all nodes listen for subsequent packets in the broadcast channel whenever the broadcast priority group was used to gain access.

In another embodiment of the present invention, the method further comprises the nodes transmitting multiple different packets of data to different destinations simultaneously using multiple transceivers at the same node, each transceiver being on a different channel.

In another embodiment of the present invention, the method further comprises the nodes transmitting multiple different packets of data to different destination simultaneously using a single transceiver adapted to code-multiplex a signal from the single transceiver.

In an embodiment of the present invention, a method of operating a node on an ad hoc network comprises synchronizing a clock of said node with other nodes of the ad hoc network to a common time, synchronizing channel access attempts with other nodes, using signaling to resolve access attempts with contending other nodes, receiving node states of other nodes, broadcasting node states known to said node to other nodes on a wifeless channel of the ad hoc wireless network, inferring connectivity links between nodes based on said node states, building a routing table based on route metrics of said connectivity links, and routing any packets from said node based on said routing table.

In an embodiment of the present invention, an hoc network comprises a plurality of nodes on a wireless channel of the ad hoc network, wherein each node has a node clock, means for synchronizing the node clocks, means for synchronizing channel access attempts of all nodes, signaling means to resolve access attempts between contending nodes, means for disseminating node states among nodes of the ad hoc network, means for inferring connectivity links between nodes based on said node states, means for building routing tables based on route metrics of said connectivity links, and means for routing packets based on said routing tables.

What is claimed is:

1. A method of operating an ad hoc wireless network, comprising:
    synchronizing nodes on a wireless channel of the ad hoc wireless network to a common time;
    dividing a wireless channel into transmission slots;
    establishing a plurality of signaling phases on the wireless channel at the beginning of a transmission slot, wherein each of the plurality of signaling phases is associated with a signaling process selected from the group consisting of a first to assert signaling process and a last to assert signaling process, and wherein each of the plurality of signaling phases comprises one or more signaling slots;
    synchronizing transmission of access signals of contending nodes relative to the signaling phases, wherein each of the contending nodes comprises a packet to send and wherein each of the contending nodes contends simultaneously for access to the wireless channel;
    determining surviving nodes of a signaling phase among the contending nodes by applying the signaling process associated with the signaling phase to the access signals transmitted by the contending nodes;
    determining ultimate survivors of a channel access attempt among the surviving nodes by identifying the surviving nodes of each of the plurality of signaling phases among the contending nodes;
    authorizing the ultimate survivors of the access attempt to transmit packets;
    disseminating node state information among nodes;
    inferring connectivity links between nodes based on the node state information;
    assigning route metrics to the connectivity links using the node state information;
    building routing tables based on the route metrics; and
    routing packets based on the routing table.

2. The method of operating an ad hoc wireless network of claim 1, wherein the node state information comprises a node location, and a listing of node path loss exponents by directional sector, and one or more of the states selected from the list consisting of an interface, a channel identifier, an energy state, a receive fraction, a class, a velocity, a direction, a dozing state, a p-supporter address, a doze offset, a doze period, and a time stamp.

3. The method of operating an ad hoc wireless network of claim 1, wherein inferring a connectivity links between nodes comprises:
    determining the distance, d, between a first node and a second node;
    obtaining a first path loss exponent of the first node for a path from the first node to second node and obtaining a second path loss exponent of the second node for a path from the second node to the first node; and
    inferring a link to exist between the first node and second node if a specified received signal strength $p_r$ can be achieved using the path loss equation $$p_r = k \cdot p_t / d^n \qquad (5)$$

where, k is a constant, $p_t$ is transmission power, d is source destination separation distance, and n is the larger of the first path loss exponent and the second path loss exponent.

4. The method of operating an ad hoc wireless network of claim 1, further comprising:

determining a route for sending a payload packet from a contending node to a destination node using a routing table, wherein the route comprises a next hop node;

sending a request to send (RTS) message from the contending node for receipt by the next hop node;

sending a clear to send (CTS) messages from the next hop node if the RTS message is received by the next hop node;

sending the payload packet from the contending node to the next hop node if the CTS message is received by the contending node; and sending an acknowledgement (ACK) message from the next hop node for receipt by the contending node if the payload packet is received by the next hop node.

5. The method of operating an ad hoc wireless network of claim 4, further comprising:

recovering from a condition wherein multiple transmitting nodes block each other at a receiving node, wherein recovering is performed by a method selected from the group consisting of:

at a receiving node, detecting a node block caused by the simultaneous arrival of a plurality of signals for the receiving node; and implementing a recovery procedure to rectify the node block selected from the group consisting of signal echoing to suppress interfering contending nodes; and reducing the threshold of signal detection after a transmission slot in which a node has survived signaling but failed to transmit data and increasing the power used in CR signaling after a transmission slot where a node has survived signaling but failed to transmit data.

6. The method of operating an ad hoc wireless network of claim 1, wherein using a plurality of signaling phases to resolve the channel access attempts among the contending nodes comprises:

assigning a service priority to a signaling slot within a signaling phase based on a packet differentiator;

permitting contending nodes having packets to transmit comprising the packet differentiator to transmit a contention signal in the priority signaling slot based on the packet differentiator of a payload packet;

applying a first-to-assert preemption rule to the priority phase; and determining at the contending nodes whether the contending node survived the priority phase contention.

7. The method of operating an ad hoc wireless network of claim 6, further comprising:

organizing the transmission slots into constant bit rate (CBR) frames; and repeating the CBR frames at a rate where one slot per frame supports a lowest CBR service.

8. The method of operating an ad hoc wireless network of claim 7, further comprising reserving transmission slots on a use-or-lose basis comprising:

implementing a QoS priority for initial access to a transmission slot in a CBR frame;

implementing a CBR priority for subsequent access to the same transmission slot of the next CBR frame;

implementing a policy whereby only nodes that have used a QoS or CBR signaling slot in a transmission slot of the previous CBR frame may use the CBR signaling slot in the same transmission slot of the current CBR frame;

implementing a cooperative signaling slot in the first position of a subsequent first to assert signaling phase that is used in tandem with the use of the CBR signaling slot;

implementing a policy whereby only a service that contends using the CBR signaling slot may also signal using the cooperative signaling slot; and implementing a policy whereby destinations also signal using the cooperative signaling slot when two conditions apply: a node received traffic in the same transmission slot of the previous CBR frame from a node that used either the Qos or CBR signaling slots to gain access and the CBR signaling slot was used in the priority phase of the current transmission slot.

9. The method of operating an ad hoc wireless network of claim 8, wherein reserving transmission slots on a use-or-lose basis comprises reserving a multihop connection between end nodes that meets predetermined delay and bandwidth constraints by incrementally reserving transmission slots between pairs of nodes along the path, further comprising:

limiting the transmission slots that a node may reserve based on delay effects across the path;

implementing a policy whereby nodes along the path hold the reserved links while waiting for a complete path to be established; and implementing a policy to automatically cancel the reserved path as soon as it is no longer used.

10. The method of operating an ad hoc wireless network of claim 8, further comprising each node queuing and scheduling packets by:

forming multiple queues, each associated with a different priority of service, including separate constant bit rate (CBR) stream queues and variable bit rate (VBR) streams queues;

providing a queue for each new CBR and VBR streams;

implementing a policy to send packets from highest priority queues first; and implementing a policy to associate CBR and VBR queues to specific reserved transmission slots in each CBR frame wherein the node contends to send packets from the queues using the CBR priority signaling group.

11. The method of operating an ad hoc wireless network of claim 1, further comprising:

allowing a node to enter a low energy state;

implementing a slot-based policy whereby the node can enter the low energy state for the remainder of a transmission if it has no pending traffic for that slot;

implementing a channel-based policy whereby the node can enter a low energy state for a predefined period if the channel is not in use; and implementing a coordination policy whereby the node coordinates with other nodes to define a period for entering and remaining in a low energy state.

12. The method of operating an ad hoc wireless network of claim 1, further comprising:

associating signal tones with a specified node behavior; and a contending node utilizing the signal tones in a collision resolution signal to elicit the specified behavior from another node.

13. The method of operating an ad hoc wireless network of claim 1, further comprising:
   identifying a loop at a node by detecting a return of a packet that the node has previously sent;
   the node broadcasting all node states in its node state list in sequential node state packets upon identifying a loop;
   the node recalculating its routing tables; and
   the node routing the packet using a recalculated routing table.

14. The method of operating an ad hoc wireless network of claim 1, further comprising:
   identifying nodes to participate in a given path;
   directing the nodes to establish the path;
   disseminating the path within the ad hoc network as a wormhole state; and
   assigning a metric to the wormhole.

15. The method of operating an ad hoc wireless network of claim 1, wherein building routing tables based on the route metrics comprises:
   selecting a routing objective comprising routing objective criteria;
   selecting at a node eligible participating nodes that meet the routing objective criteria;
   inferring links between the node and the eligible participating nodes using the selected objective;
   assigning a metric to the inferred links using the selected objective;
   calculating routes among the node and the eligible participating nodes using the selected objective; and
   creating a table of the routes associated with the selected objective.

16. The method of operating an ad hoc wireless network of claim 1, further comprising supporting the selection of a unique channel for the exchange of peer-to-peer traffic between nodes using signaling slots comprising:
   providing a receiver directed channel for every node;
   providing a broadcast channel used by every node;
   providing a broadcast priority group comprising a subset of priority signaling slots;
   implementing a policy whereby nodes listen for packets on their receiver directed channel whenever any priority signaling slot other than a signaling slot from the broadcast priority group is used; and
   implementing a policy whereby all nodes listen for subsequent packets in the broadcast channel whenever the broadcast priority group was used to gain access.

17. The method of operating an ad hoc wireless network of claim 16, further comprising the nodes transmitting multiple different packets of data to different destinations simultaneously at the same node, each transceiver being on a different channel.

18. The method of operating an ad hoc wireless network of claim 16, further comprising the nodes transmitting multiple different packets of data to different destination simultaneously using a single transceiver adapted to code-multiplex a signal from the single transceiver.

19. The method of operating an ad hoc wireless network of claim 1 further comprising:
   creating multiple routing tables at a node, wherein each of the multiple routing tables supports a routing objective;
   selecting a routing objective for routing the packets; and
   selecting a routing table from the multiple routing tables that supports the selected routing objective.

20. A method of operating a node on an ad hoc network, comprising:
   synchronizing a clock of the node with other nodes of the ad hoc network to a common time;
   synchronizing channel access attempts of the node with other nodes;
   using a plurality of signaling phases on the channel at the beginning of a transmission slot to resolve access attempts with other contending nodes;
   receiving node states of other nodes;
   broadcasting node states known to the node to other nodes on a wireless channel of the ad hoc wireless network;
   inferring connectivity links between nodes based on a pathloss model whose parameters are included in the node states;
   building a routing table based on route metrics of the connectivity links; and
   routing packets from the node based on the routing table.

21. A method of operating an ad hoc wireless network comprising:
   disseminating node state information among the nodes, wherein disseminating node state information among the nodes comprises;
      applying a set of rules for selecting node states to be included in a node state packet; and
      transmitting the selected node states in the node state packet;
   inferring connectivity links between the nodes based on the node state information;
   assigning route metrics to the connectivity links using the node state information; and
   building routing tables based on the route metrics.

22. The method of operating an ad hoc wireless network of claim 21, wherein the node state packet is transmitted on a periodic basis.

23. The method of operating an ad hoc wireless network of claim 21, wherein the node state packet is transmitted when a change has occurred in the selected node states.

24. The method of operating an ad hoc wireless network of claim 21, wherein disseminating node state information among the nodes further comprises transmitting a set of wormhole states in the node state packet.

25. The method of operating an ad hoc wireless network of claim 21 further comprising:
   establishing a minimum time between transmitting the node state packet and a subsequent node state packet, and
   transmitting the subsequent node state packet after the minimum time.

26. A method of operating an ad hoc wireless network, comprising:
   synchronizing nodes on a wireless channel of the ad hoc wireless network to a common time;

dividing a wireless channel into transmission slots;

establishing a plurality of signaling phases on the wireless channel at the beginning of a transmission slot, wherein each of the plurality of signaling phases is associated with a signaling process selected from the group consisting of a first to assert signaling process and a last to assert signaling process, and wherein each of the plurality of signaling phases comprises one or more signaling slots;

synchronizing transmission of access signals of contending nodes relative to the signaling phases, wherein each of the contending nodes comprises a packet to send and wherein each of the contending nodes contends simultaneously for access to the wireless channel;

determining surviving nodes of a signaling phase among the contending nodes by applying the signaling process associated with the signaling phase to the access signals transmitted by the contending nodes;

determining ultimate survivors of a channel access attempt among the surviving nodes by identifying the surviving nodes of each of the plurality of signaling phases among the contending nodes; and authorizing the ultimate survivors of the access attempt to transmit packets.

* * * * *